May 31, 1960 W. E. BURNS ET AL 2,939,116
TAPE CODE TRANSLATOR
Filed April 2, 1956 35 Sheets-Sheet 2

INVENTORS
WILLIAM E. BURNS
EDWARD H. NUTTER

BY Murray Nones

ATTORNEY

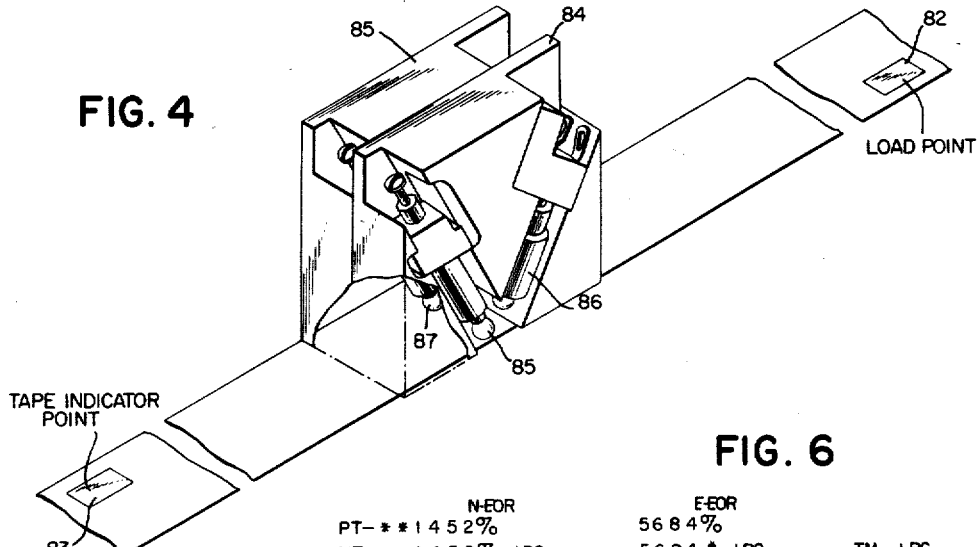

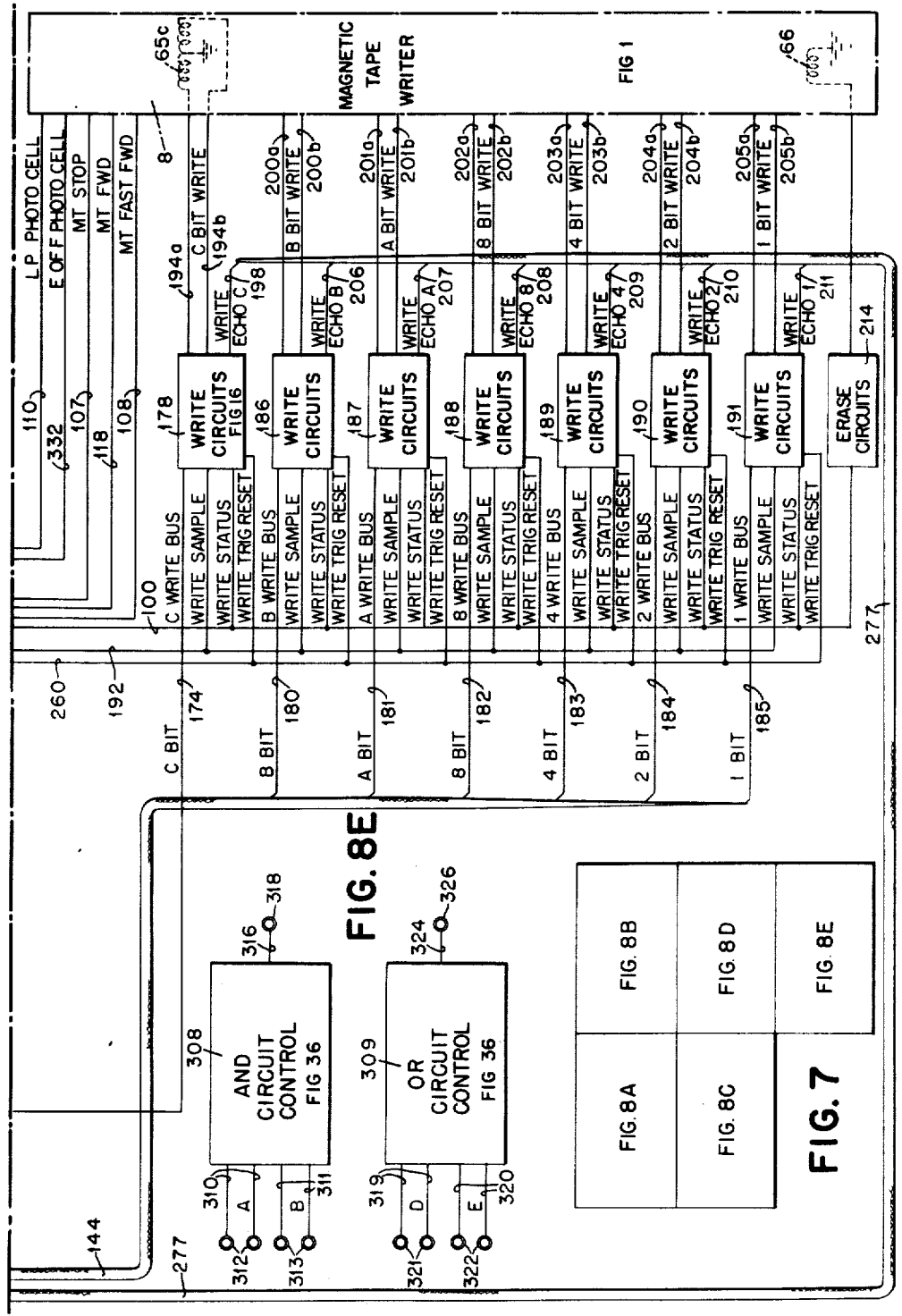

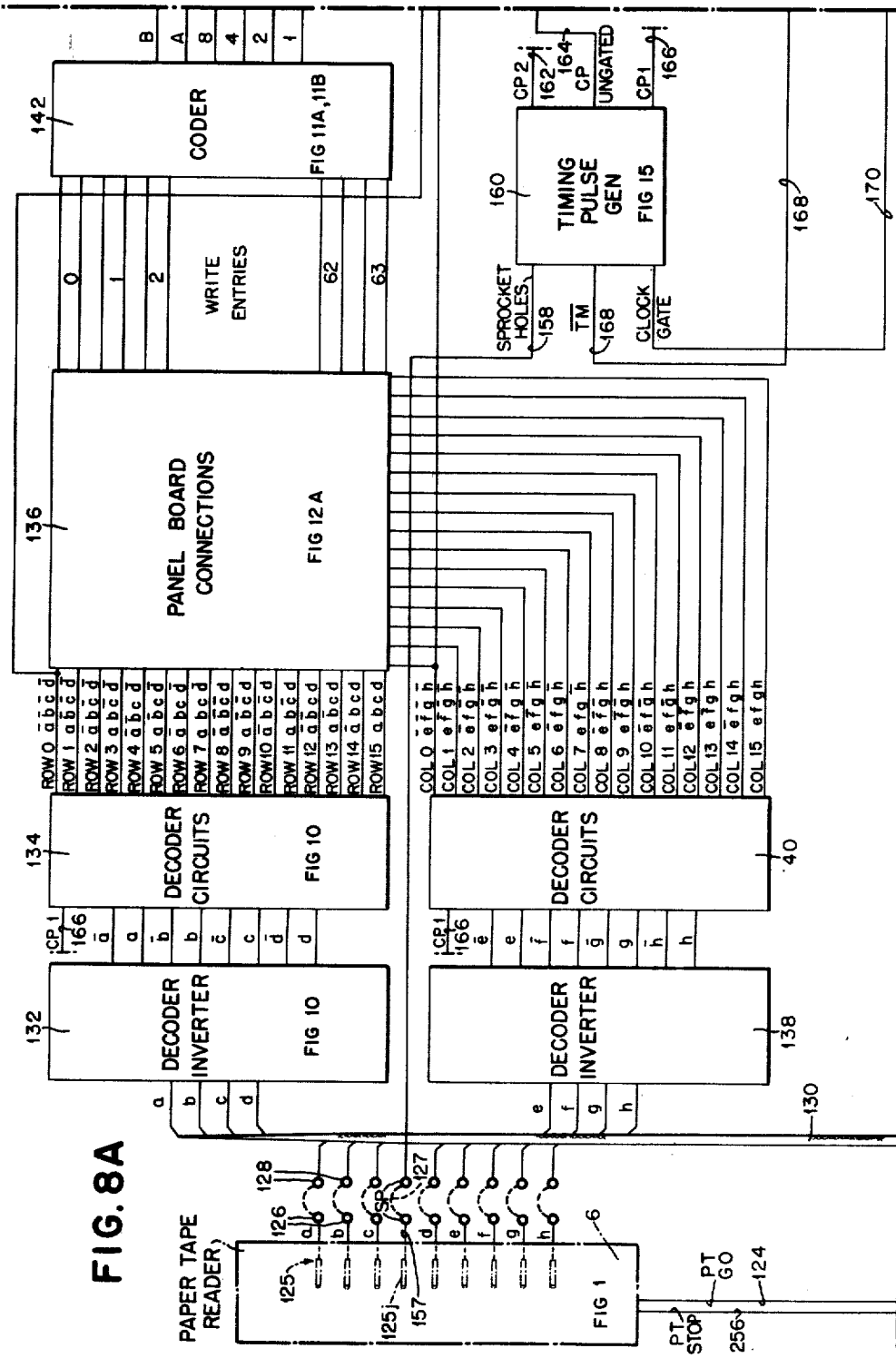

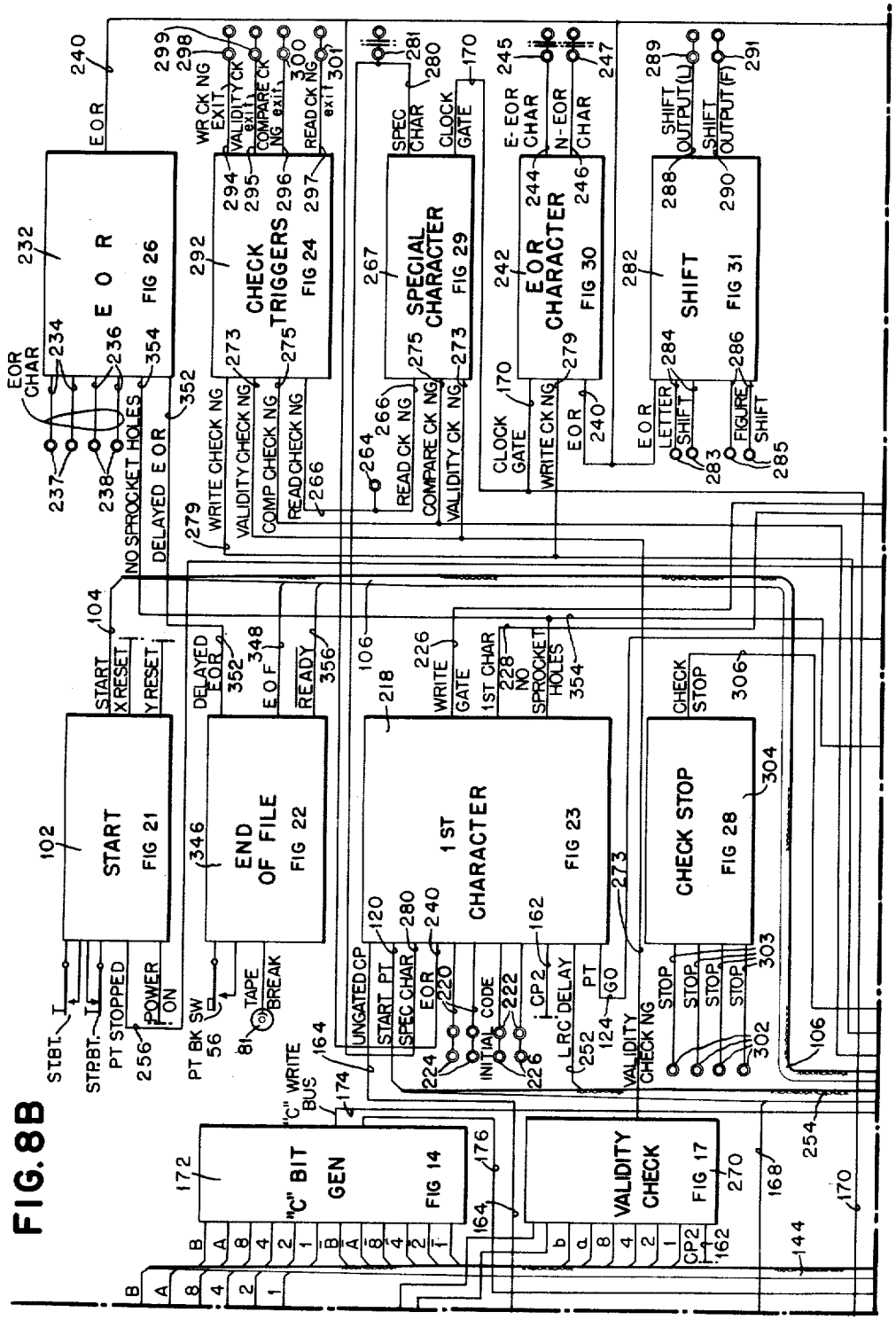

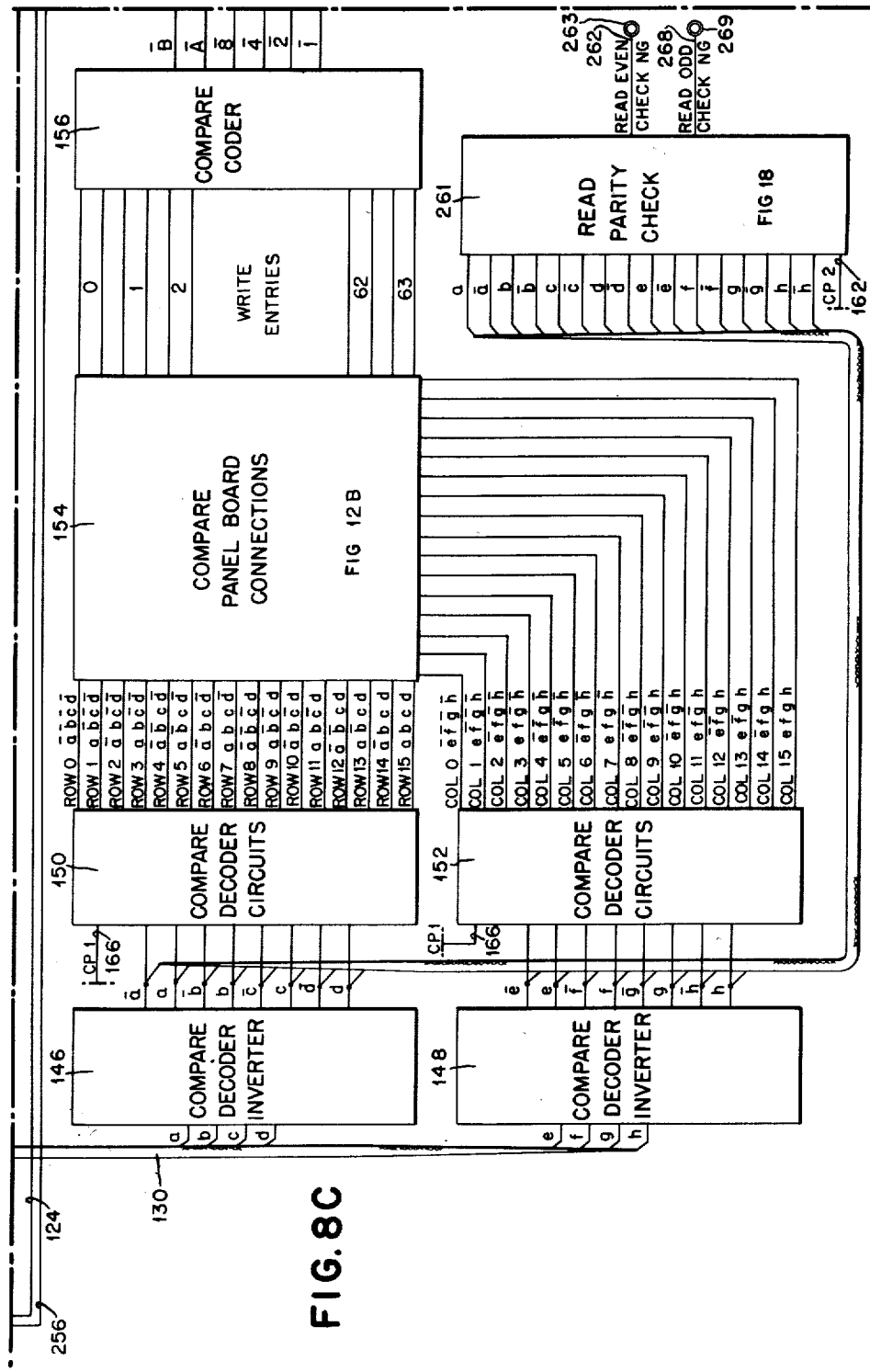

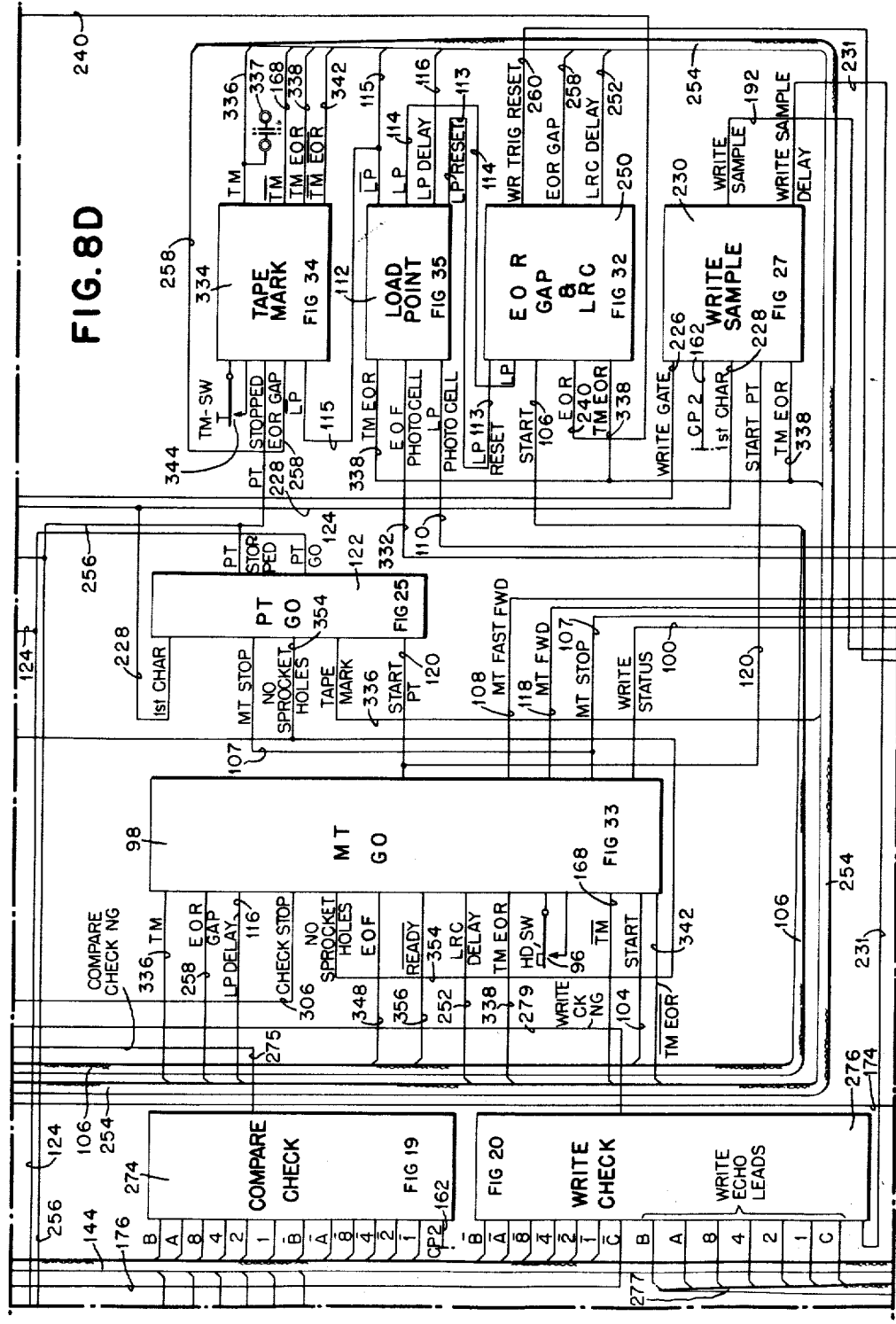

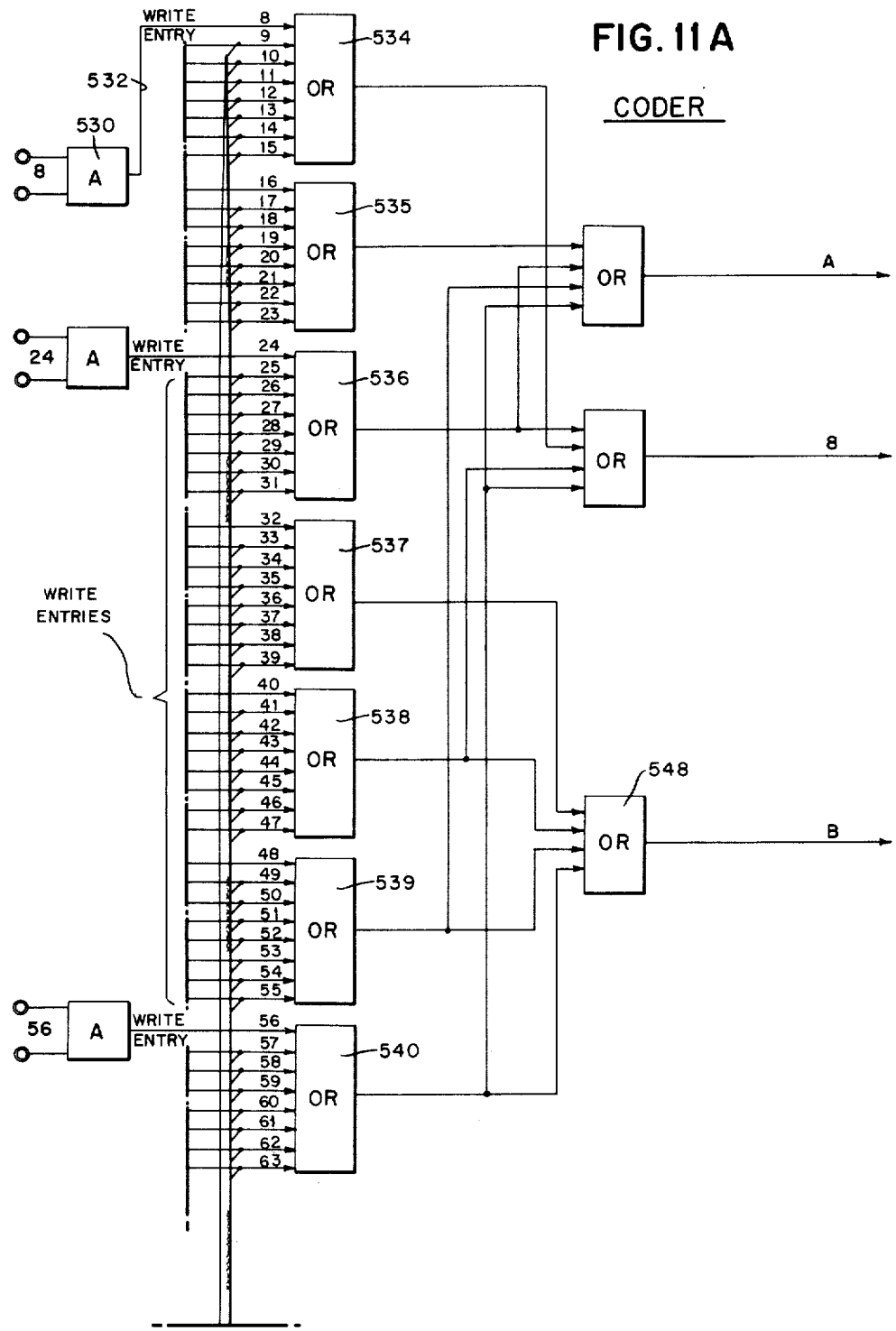

May 31, 1960 W. E. BURNS ET AL 2,939,116
TAPE CODE TRANSLATOR
Filed April 2, 1956 35 Sheets-Sheet 13

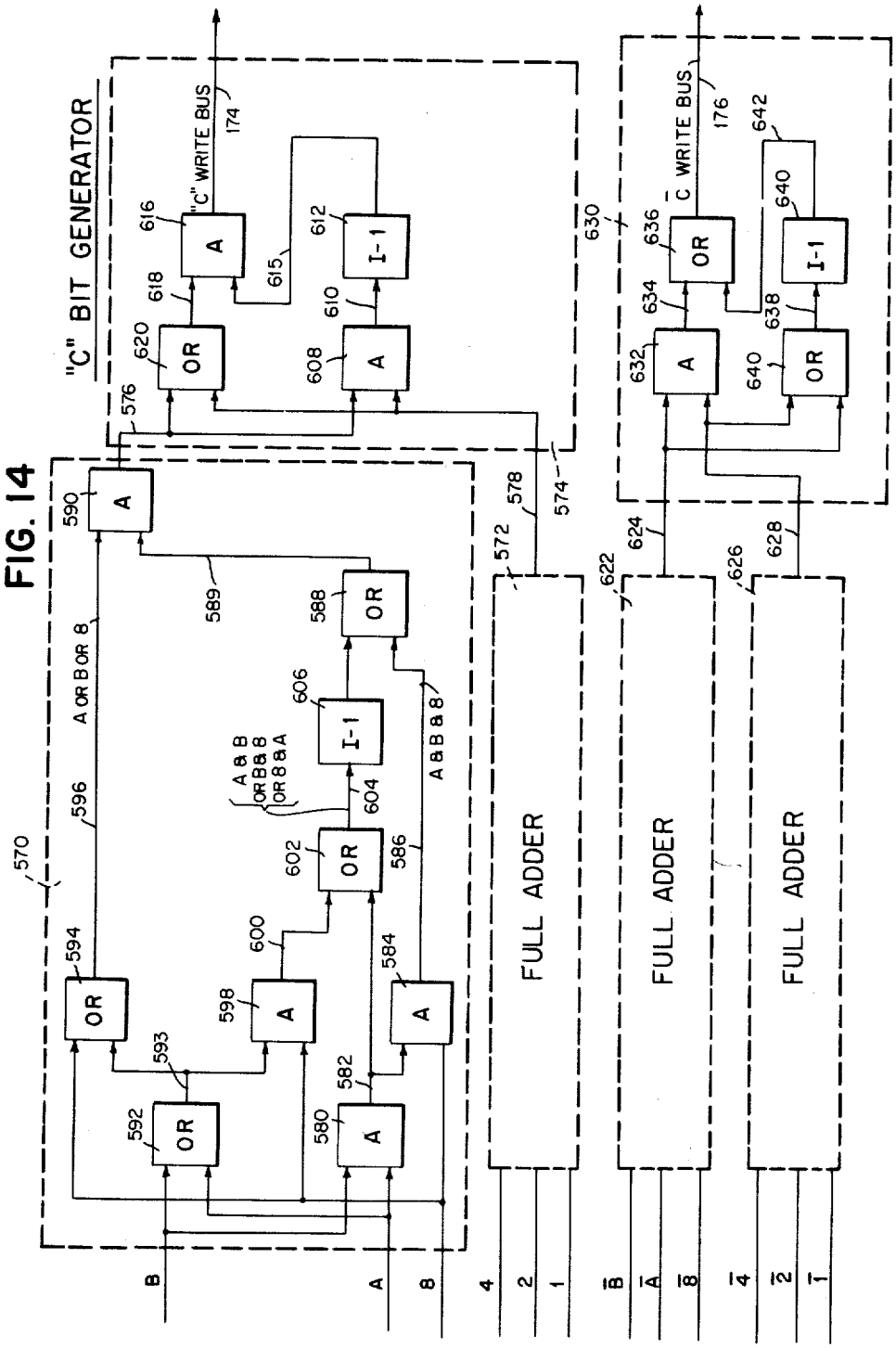

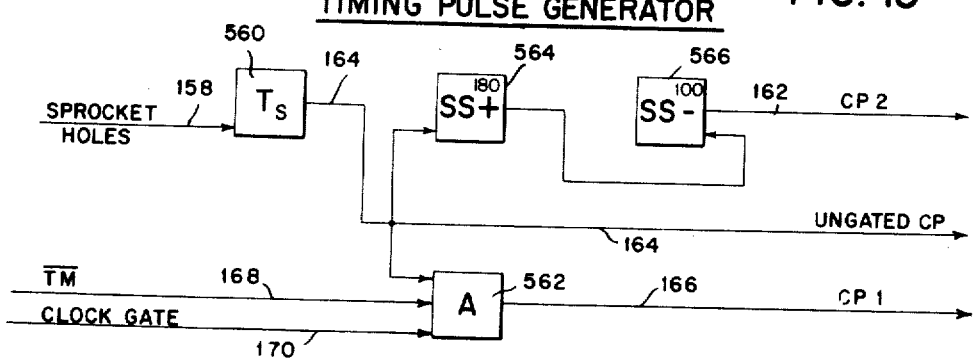
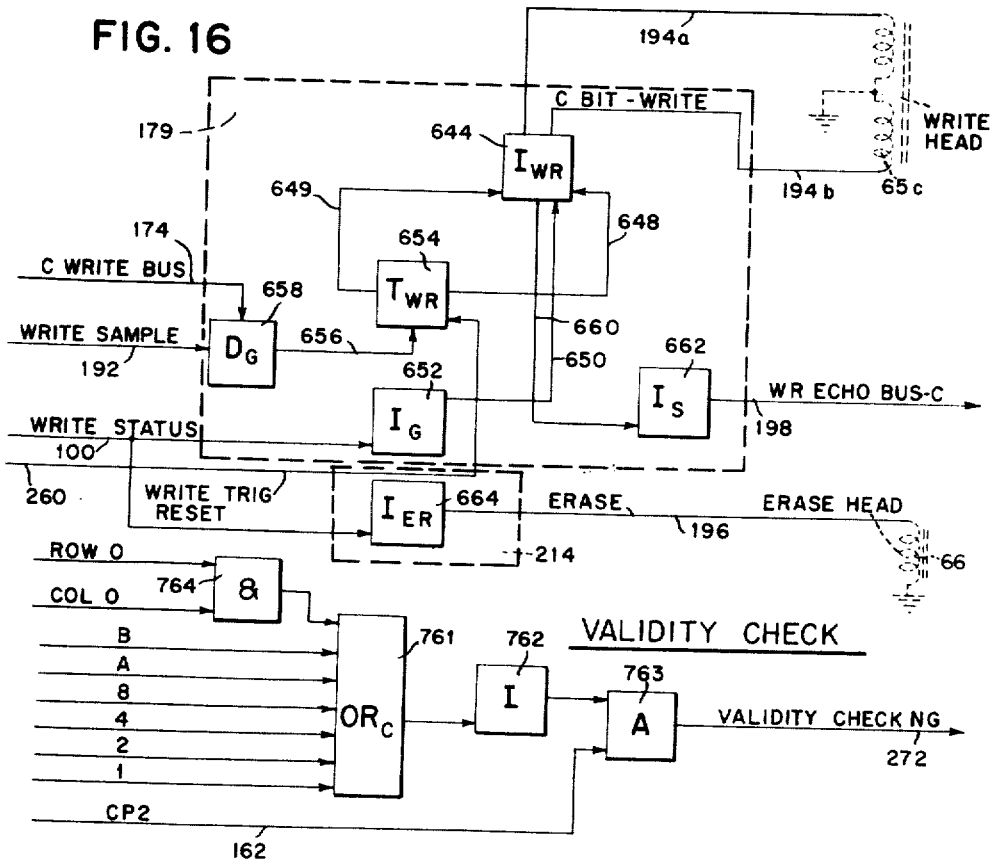

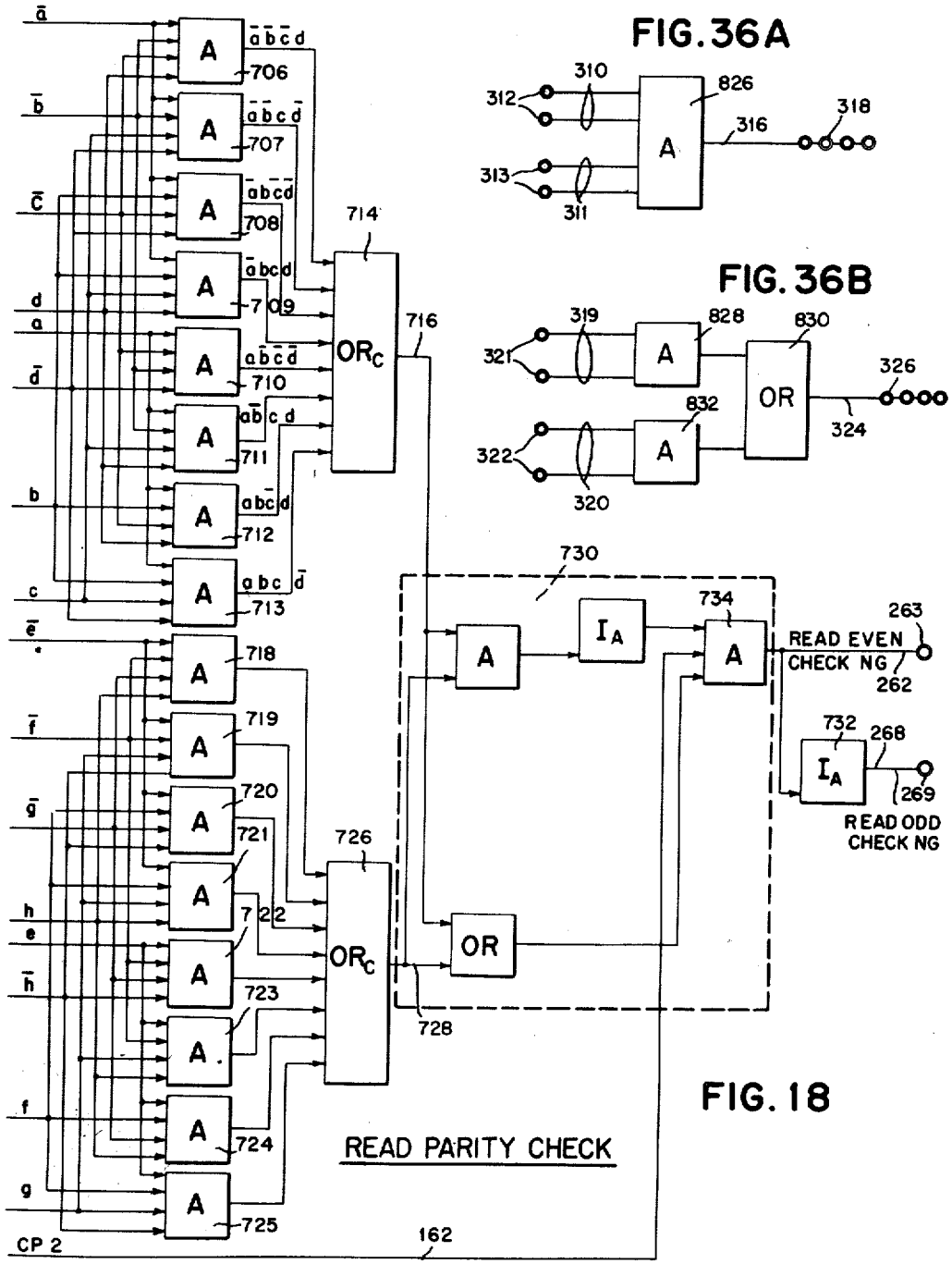
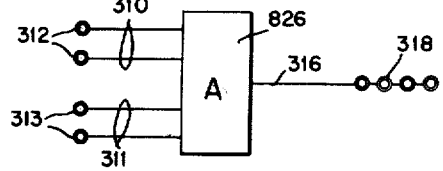
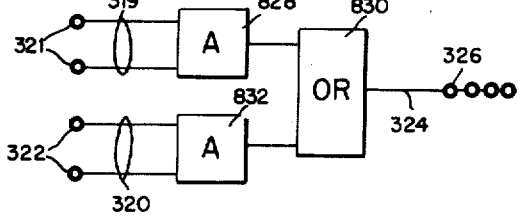

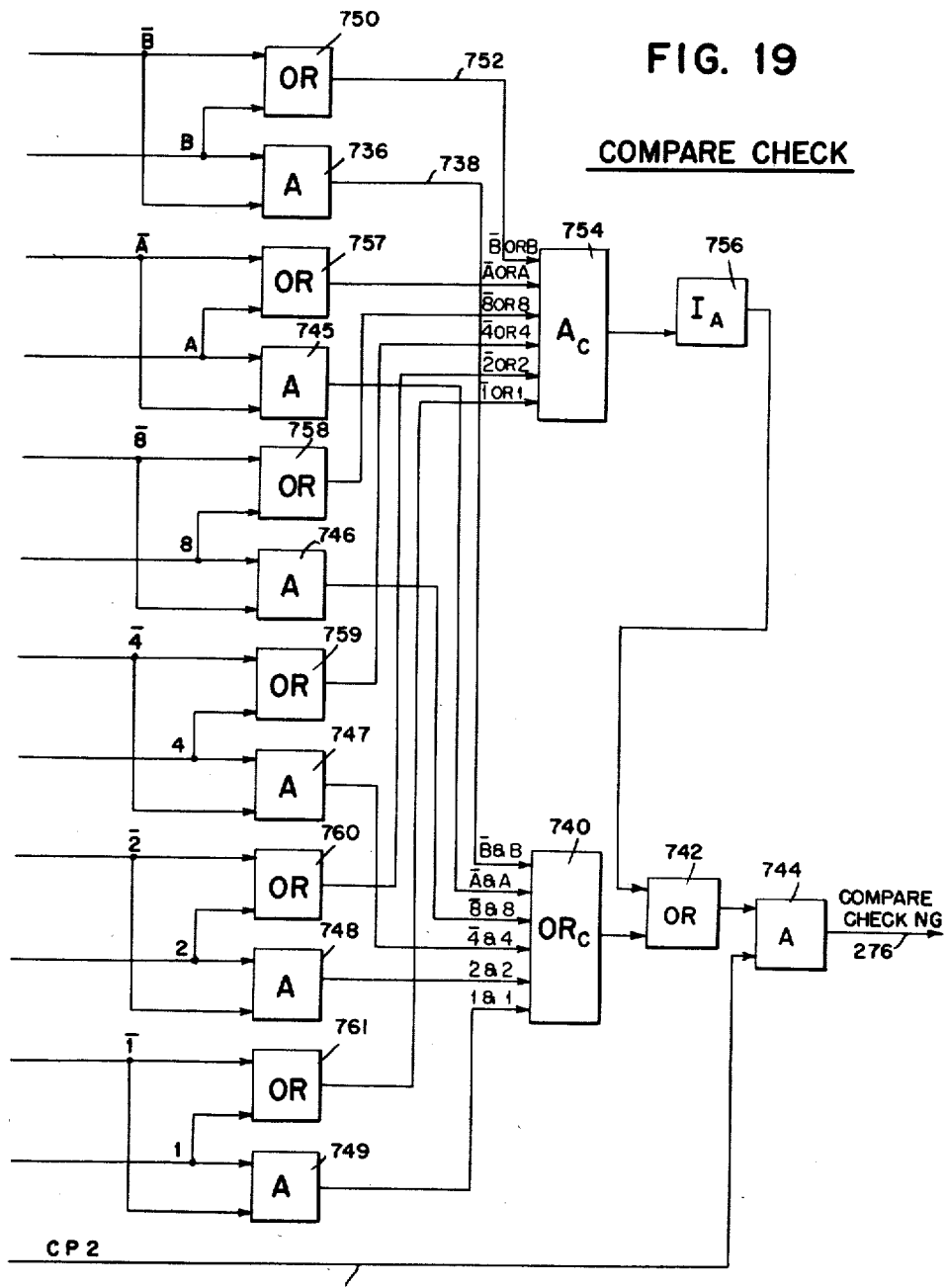

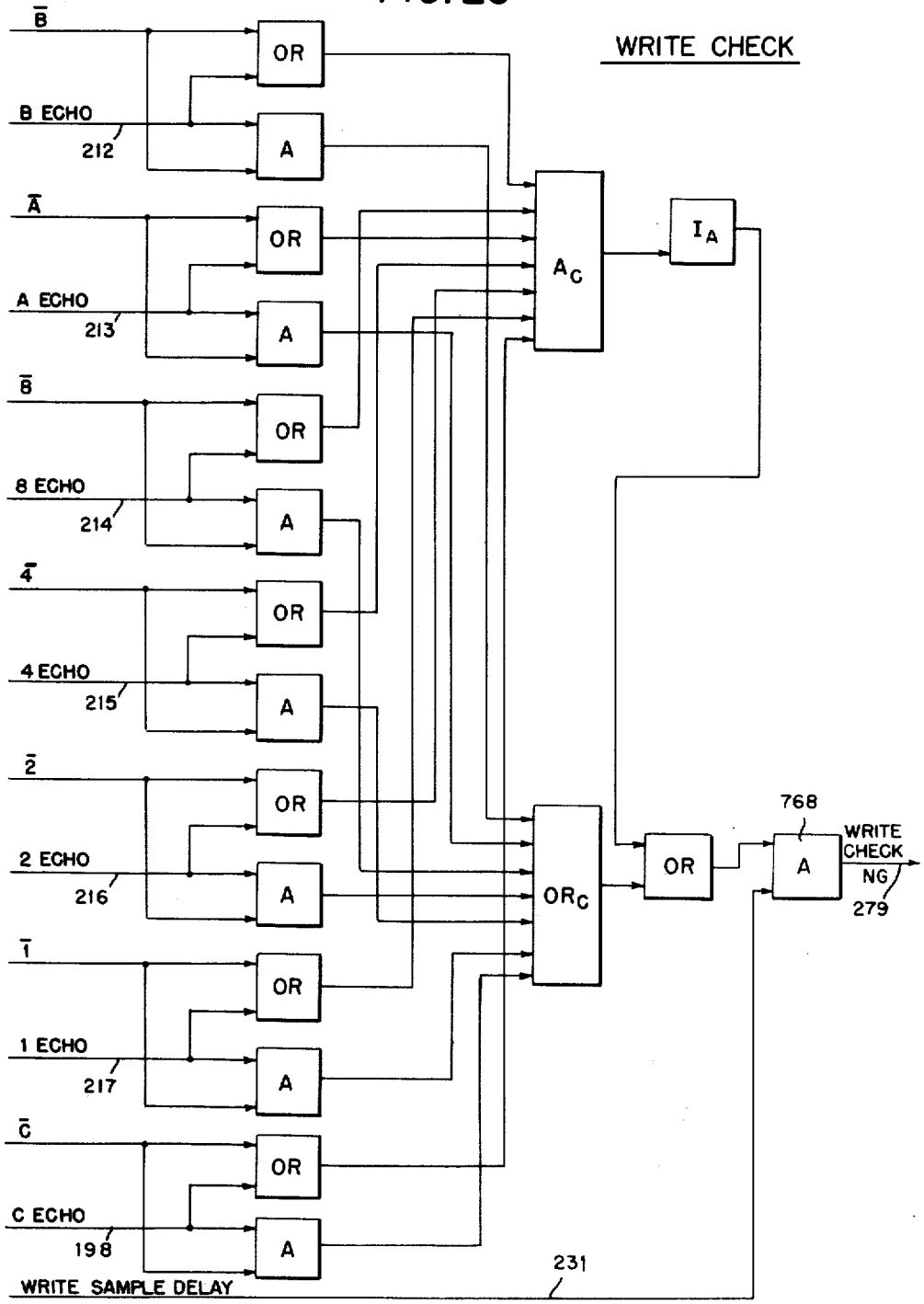

May 31, 1960  W. E. BURNS ET AL  2,939,116
TAPE CODE TRANSLATOR
Filed April 2, 1956  35 Sheets-Sheet 22
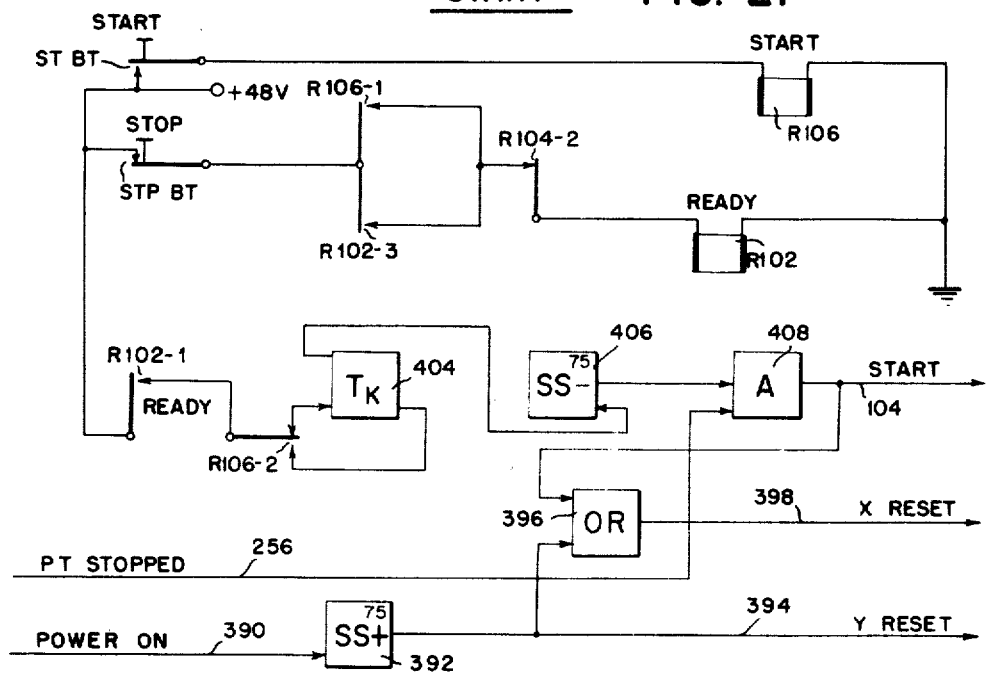
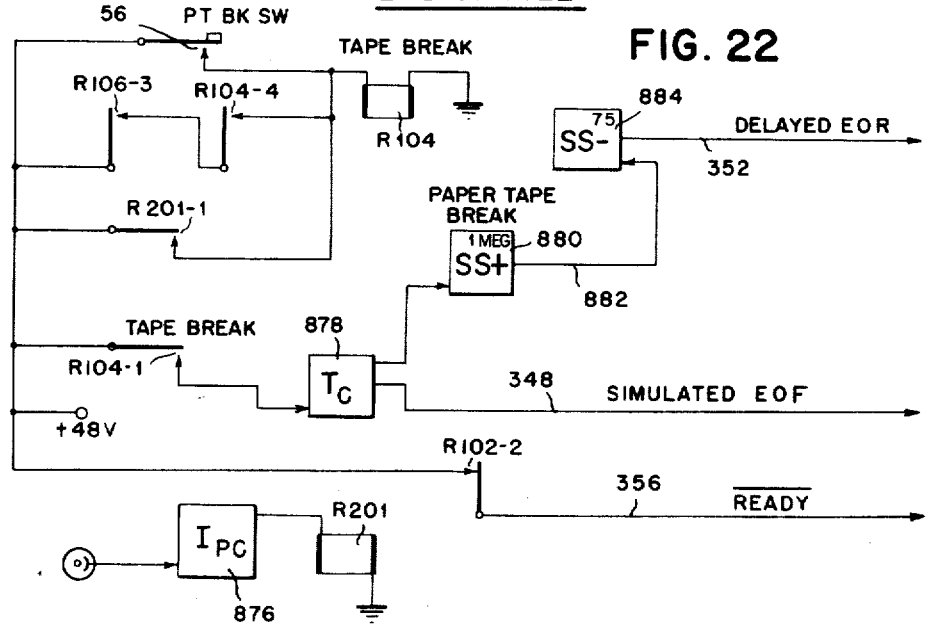

May 31, 1960 W. E. BURNS ET AL 2,939,116
TAPE CODE TRANSLATOR
Filed April 2, 1956 35 Sheets-Sheet 23

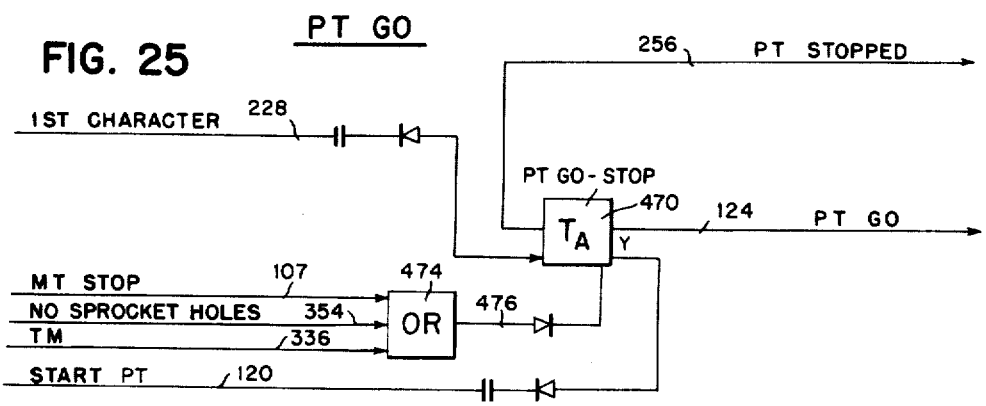
FIG. 25
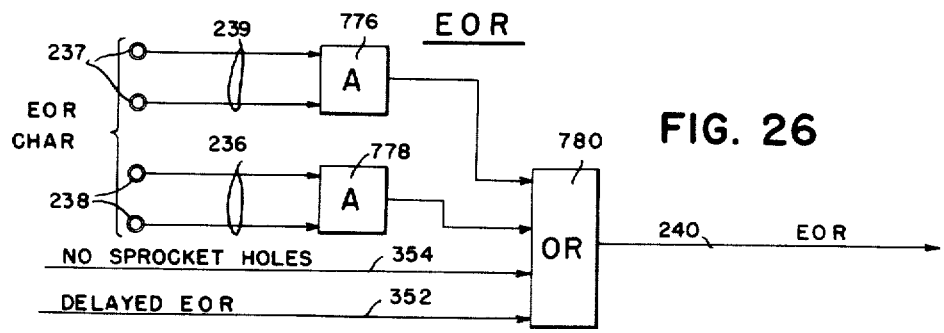
FIG. 26
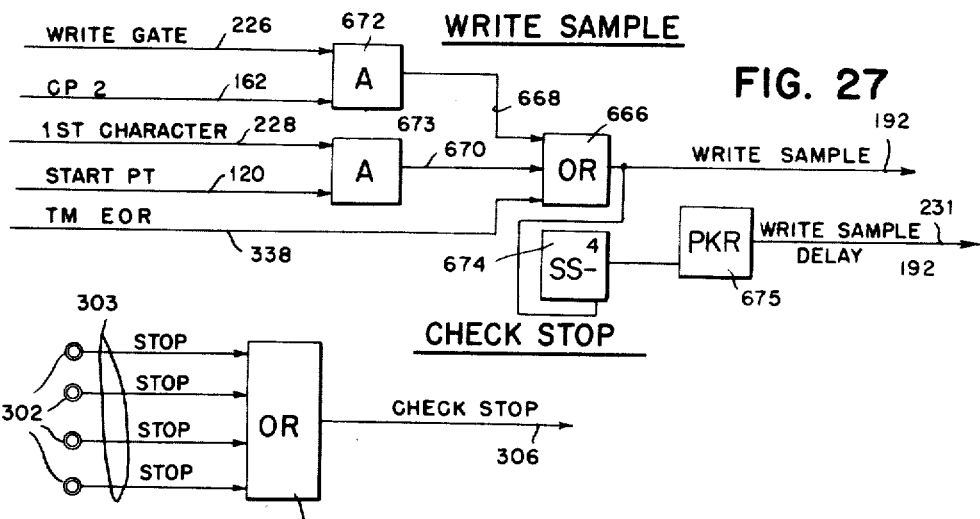
FIG. 27
FIG. 28

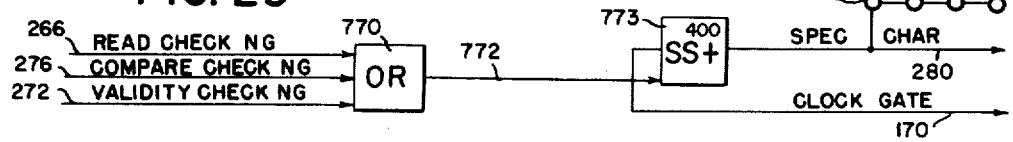
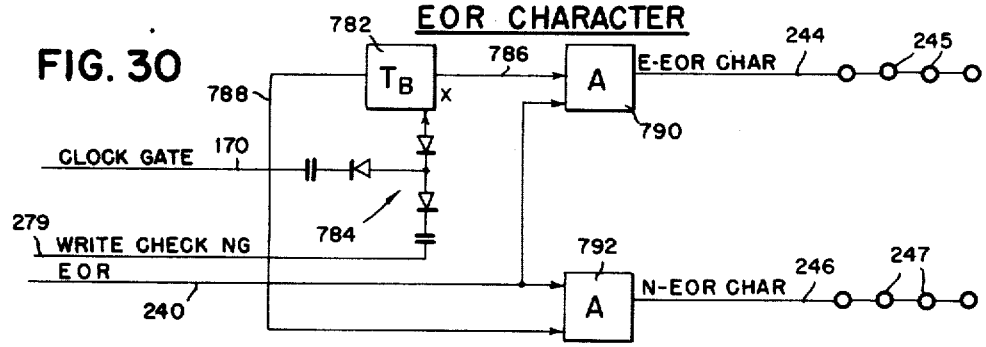
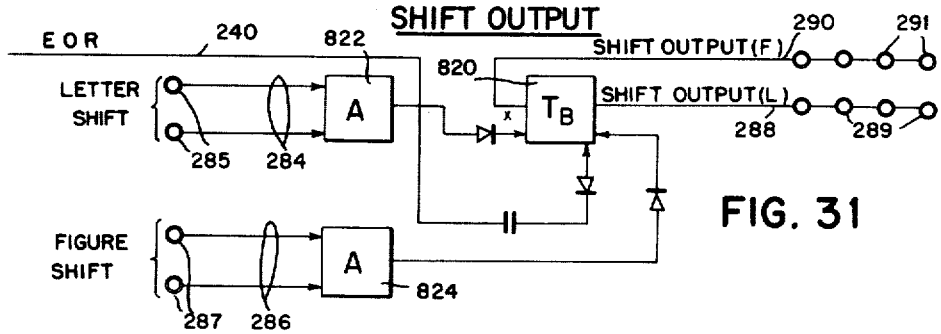
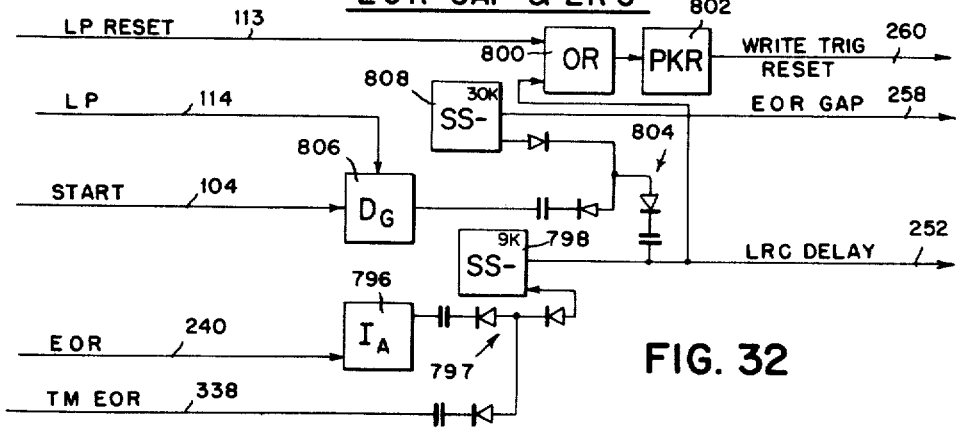

May 31, 1960     W. E. BURNS ET AL     2,939,116
TAPE CODE TRANSLATOR

Filed April 2, 1956                                                          35 Sheets-Sheet 26

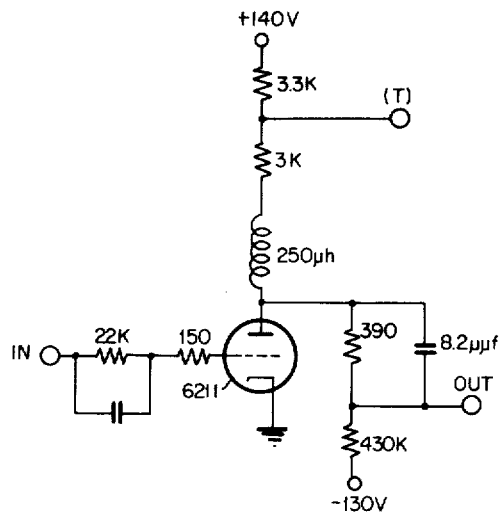
FIG. 42
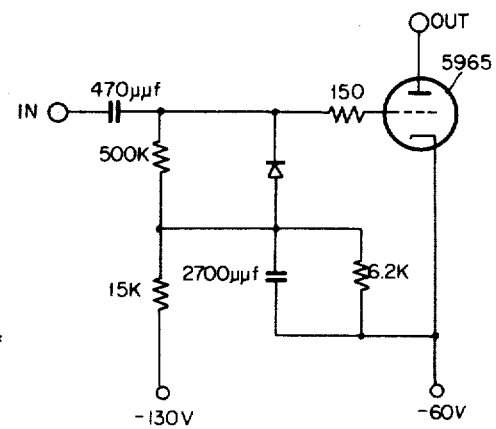
FIG. 43
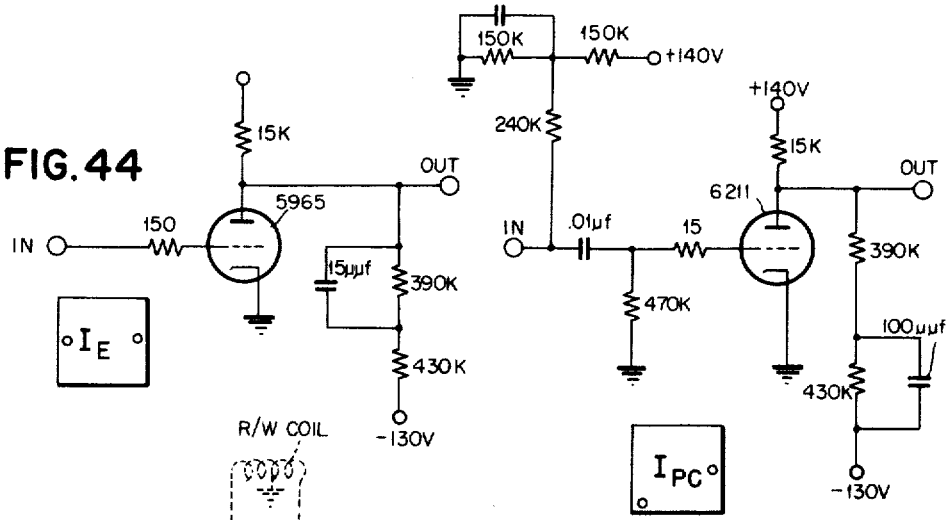
FIG. 44
FIG. 45
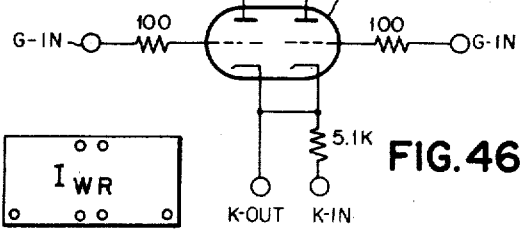
FIG. 46

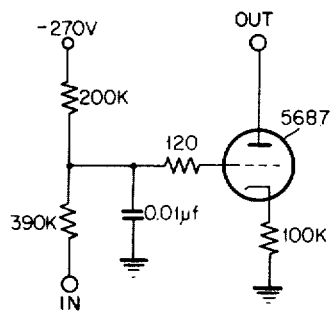
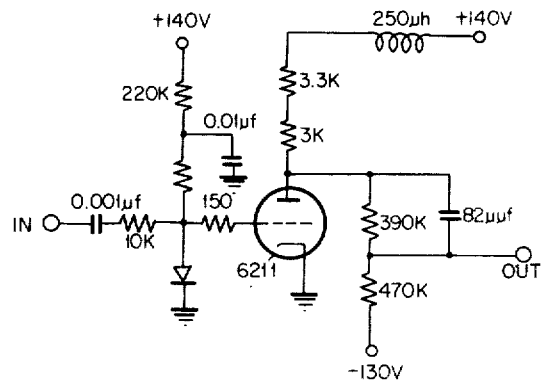
FIG. 47
FIG. 48
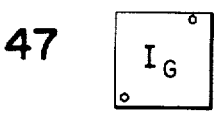
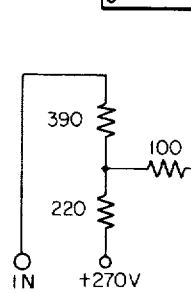
FIG. 49
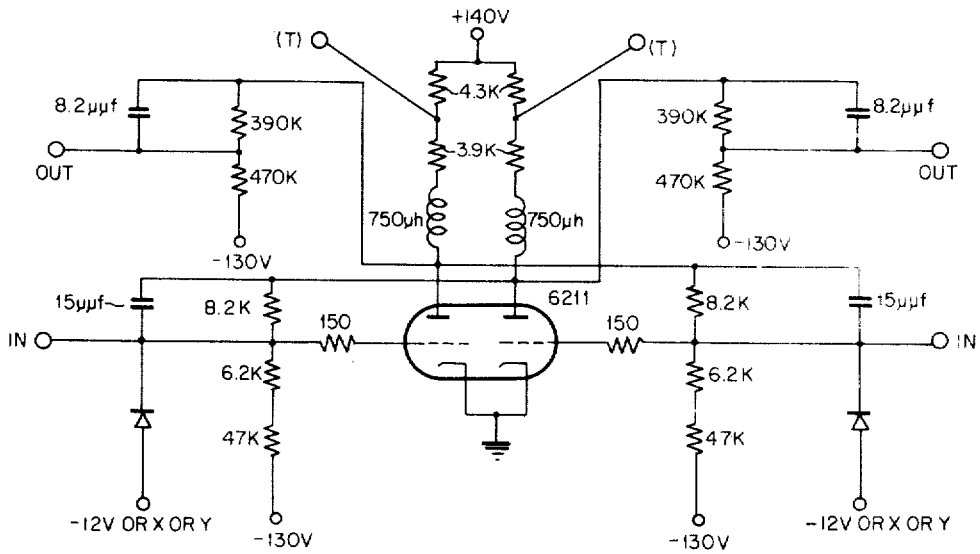
FIG. 50

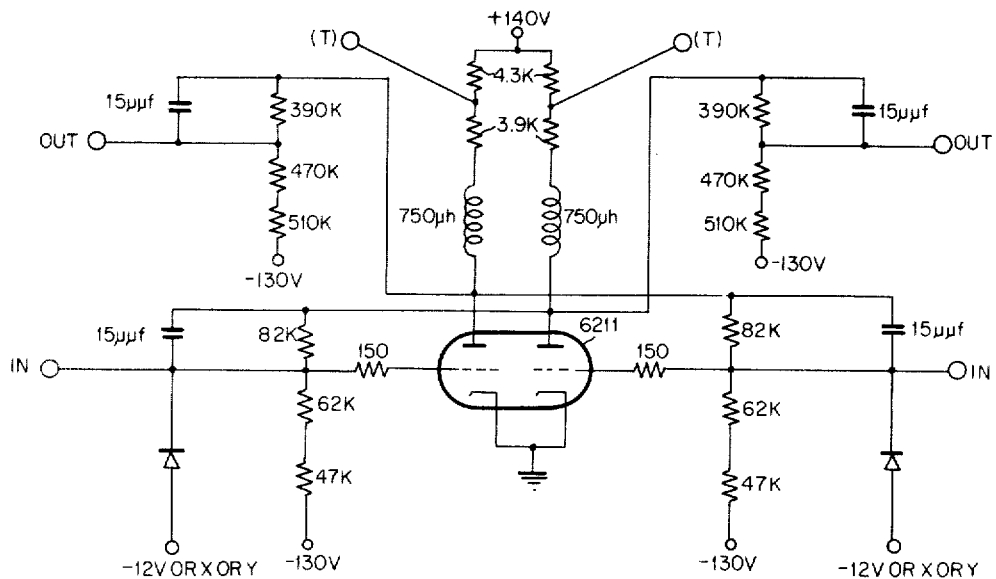

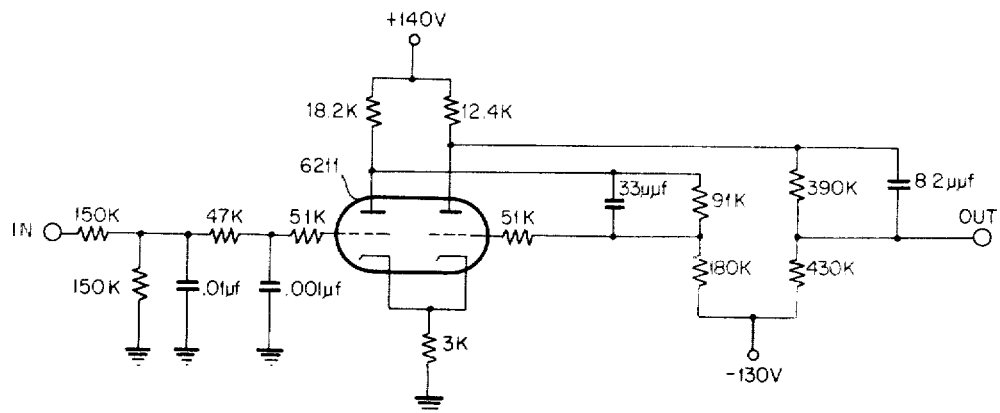

FIG. 59
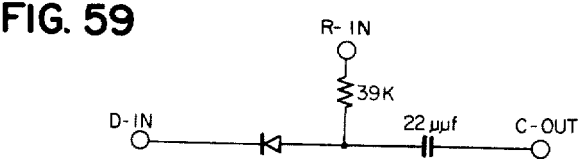
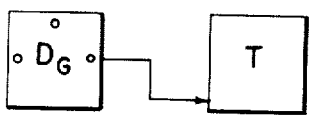
FIG. 60
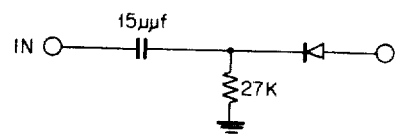
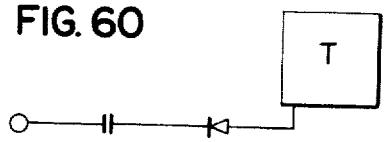
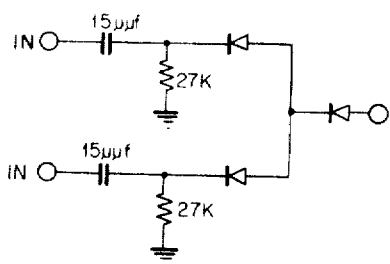
FIG. 61
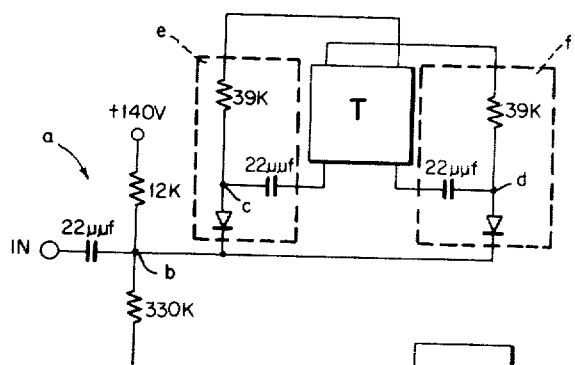
FIG. 62

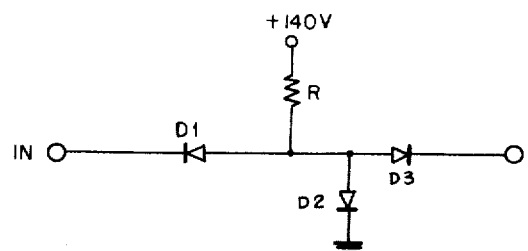
FIG. 63
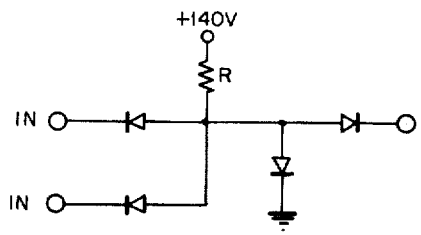
FIG. 64
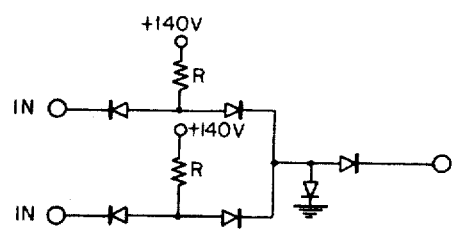
FIG. 65
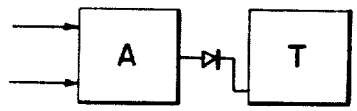
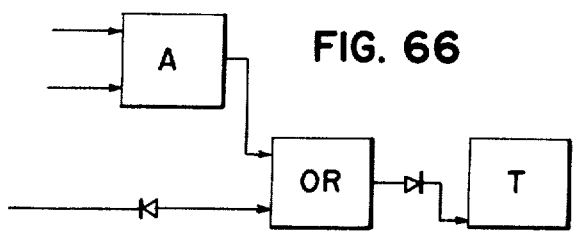
FIG. 66

United States Patent Office 2,939,116
Patented May 31, 1960

2,939,116

TAPE CODE TRANSLATOR

William E. Burns, San Jose, Calif., and Edward H. Nutter, Wappingers Falls, N.Y., assignors to International Business Machines Corporation, New York, N.Y., a corporation of New York Filed Apr. 2, 1956, Ser. No. 575,595

33 Claims. (Cl. 340—174)

This invention relates to apparatus for transferring data from one medium to a second medium and more specifically to apparatus whereby information on one medium may be translated, checked, and transmitted with special check characters to another medium.

The primary object of the invention is to provide means for translating the information on one medium and transmitting said information to another medium.

Another object of the invention is to provide settable means for translating a variety of tape codes into a fixed tape code.

Still another object is to provide a pair of translate circuits and means for comparing their outputs for a difference, the difference indicating a translate error.

A further object is to provide a plurality of means for checking the code translations.

A still further object is to provide means for checking the validity of a translated character.

Another object is to provide means for compare checking the echo of the coded bits placed on the second medium with the output of the translate means.

Still another object is to provide means for recognizing initial code characters on a paper tape and only selectively placing said characters on the second medium after a first meaningful character is sensed.

A further object is to provide means for writing a special character indicative of an error on tape in place of an erroneously translated character.

A still further object is to provide means for storing an error indication until the end of a tape record.

Another object is to provide means for selectively writing a normal end of record indication or an error end of record indication on the second medium.

Still another object of this invention is to provide perforations of a relatively smaller size but aligned with said coded perforations on a paper tape and to provide means utilizing the smaller perforations to initiate a signal generator for gating the translation of the coded perforations.

A further object is to provide means for providing end of record gaps between records on said second medium.

A still further object is to provide circuits for independently controlling the feeding of the two mediums to enable end of record gaps to be provided on the second medium even though there are no gaps on the first medium.

Another object is to provide means for obtaining different rates of feed for the second medium to obtain the end of record gap in the least possible time.

Still another object is to provide means for reading an $n$ channel tape and recognized a control character thereon which provides a signal input that simulates a bit in an extra channel on said tape.

A further object is to provide means for permitting a continued operation of the translation means until an end of record indication, if it appears before a fixed time elapses.

A still further object of the invention is to provide means for stopping the machine only if an error appears in the translation of certain preselected characters.

Other objects of the invention will be pointed out in the following description and claims and illustrated in the accompanying drawings, which disclose, by way of example, the principle of the invention and the best mode, which has been contemplated, of applying that principle.

In the drawings:

Fig. 2 is a detail, showing an Eight Channel Paper Tape containing coded alphabetic and numeric symbols and their corresponding hub designations.

Fig. 3 is a detail, similar to Fig. 2 for a Five Channel Paper Tape.

Fig. 4 is a view showing the position of the lights and the photocells in the Magnetic Tape Head, and a diagrammatic view of the Magnetic Tape indicating the Load Point and Tape Indicator Point.

Fig. 5 is a detail of a Magnetic Tape containing coded alphabetic and numeric symbols and their corresponding Write Entry hubs.

Fig. 6 is a detail of a Magnetic Tape having two records, one of which contains an error.

Fig. 7 is a diagram showing the manner in which Figs. 8A to 8E are to be arranged to constitute a complete view.

Figs. 8A to 8E, when arranged in the order indicated in Fig. 7, comprise a Paper Tape to Magnetic Tape Converter in functional block form.

Figure 9A:
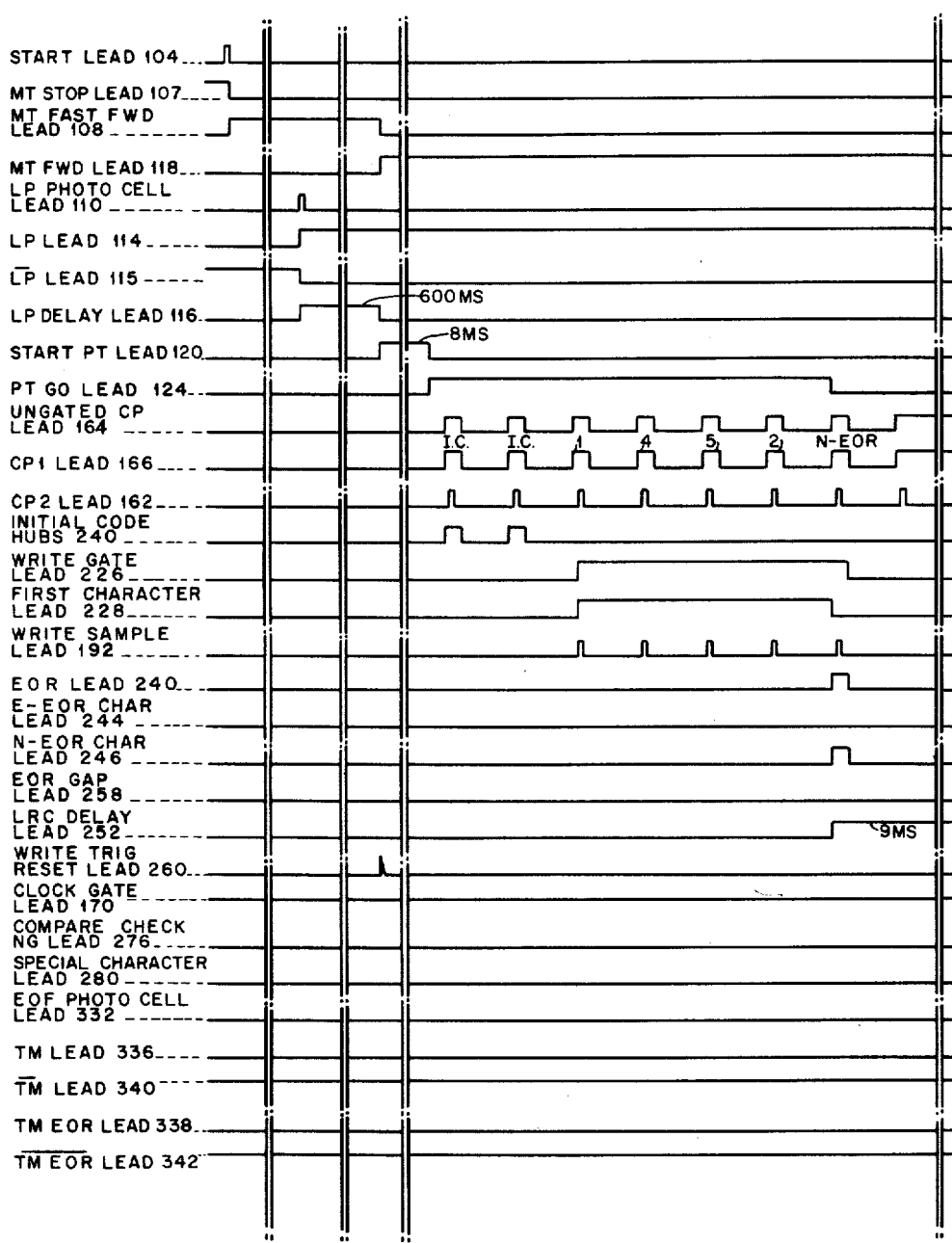
Figure 9B:
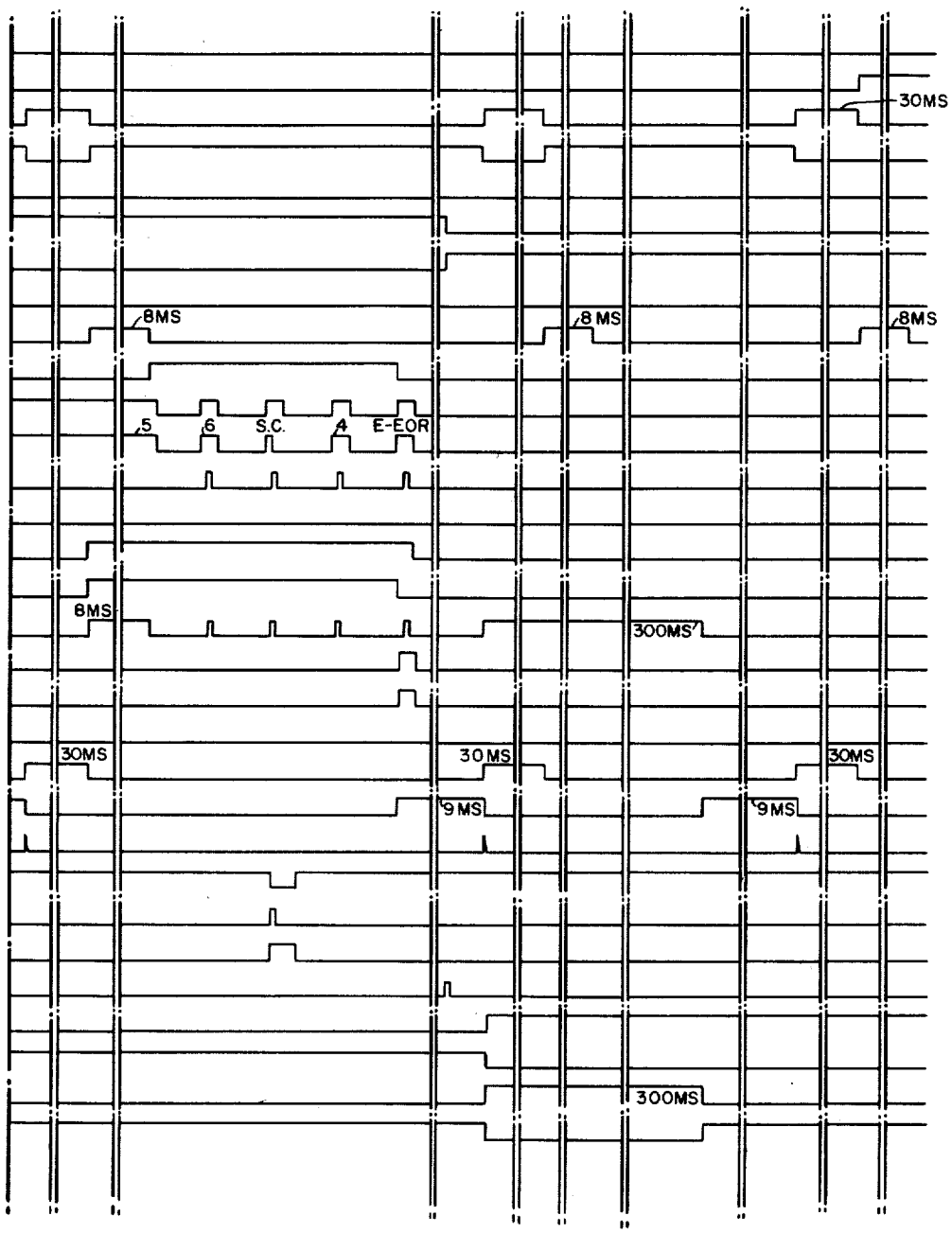

Figs. 9A and 9B, arranged side by side, in that order, are a Timing Diagram showing the starting of the Tape Feeds, and Error and No Error Writing on the Magnetic Tape.

Figure 10:
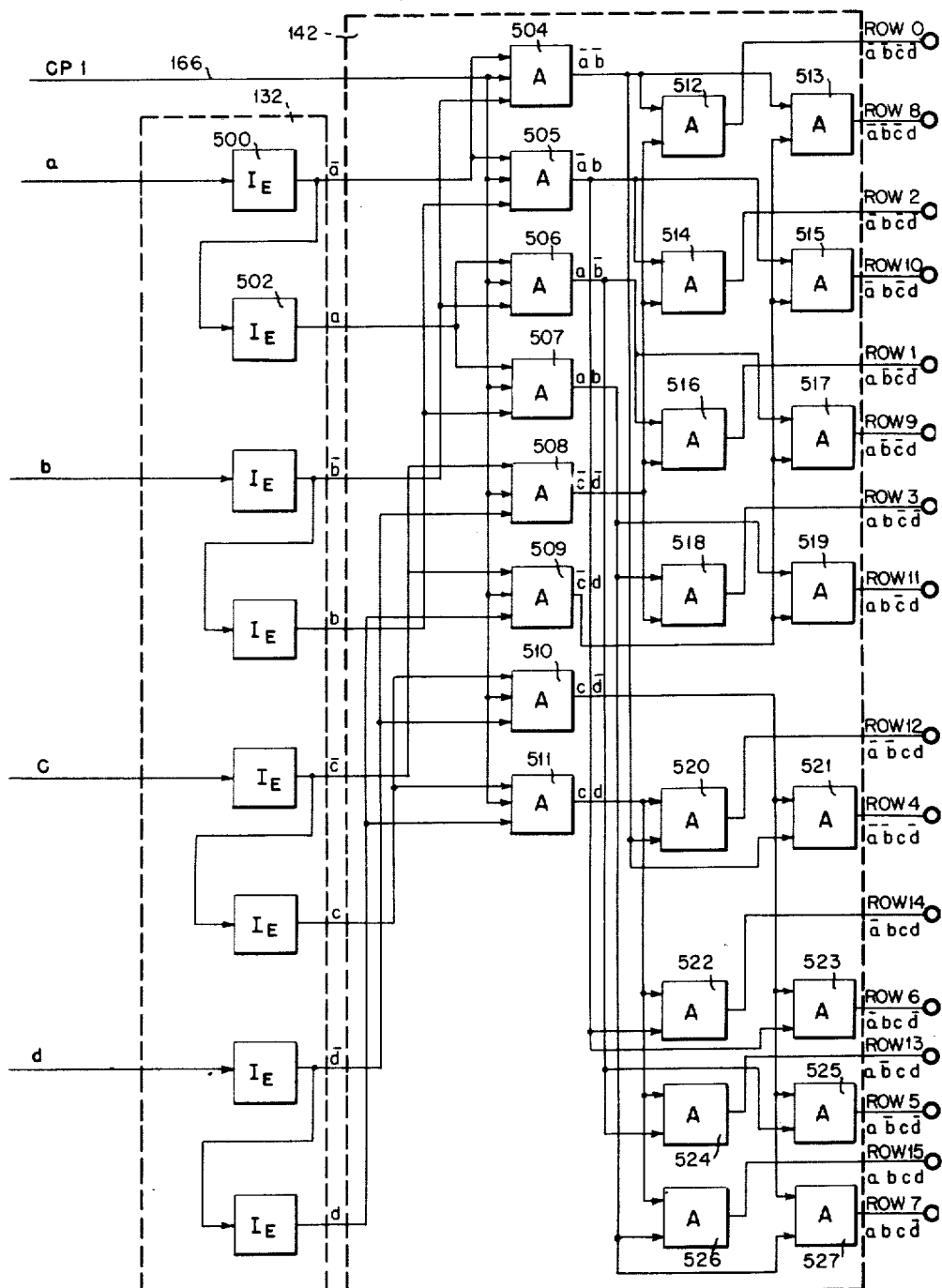

Fig. 10 is a logical block circuit diagram of the Decoder Inverter and Decoder Circuits functional blocks of Fig. 8A.

Figure 11B:
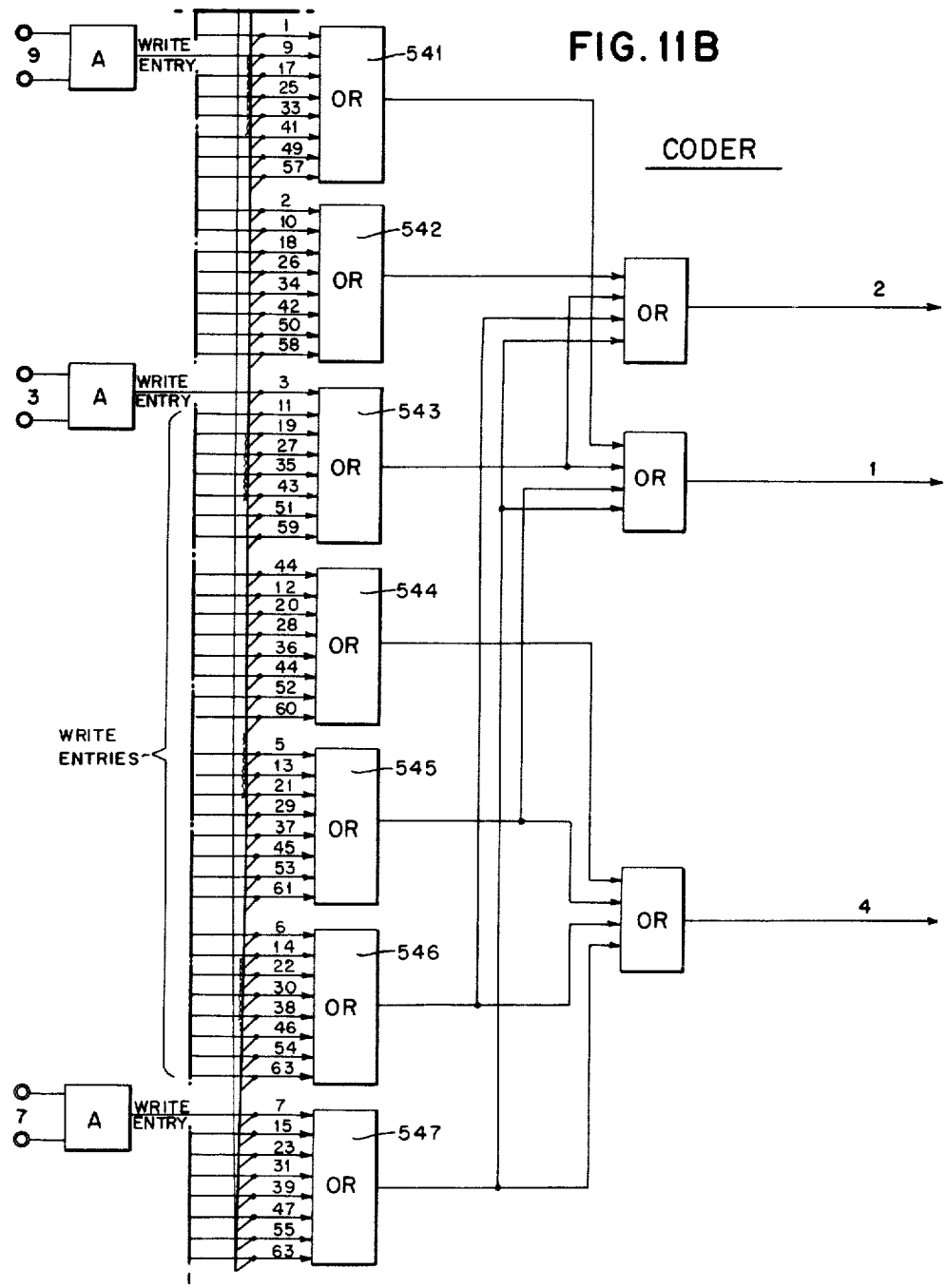

Figs. 11A and 11B, arranged one above the other with Fig. 11A over Fig. 11B, comprise a logical block circuit diagram of the Coder Circuits functional block of Fig. 8A.

Figure 12A:
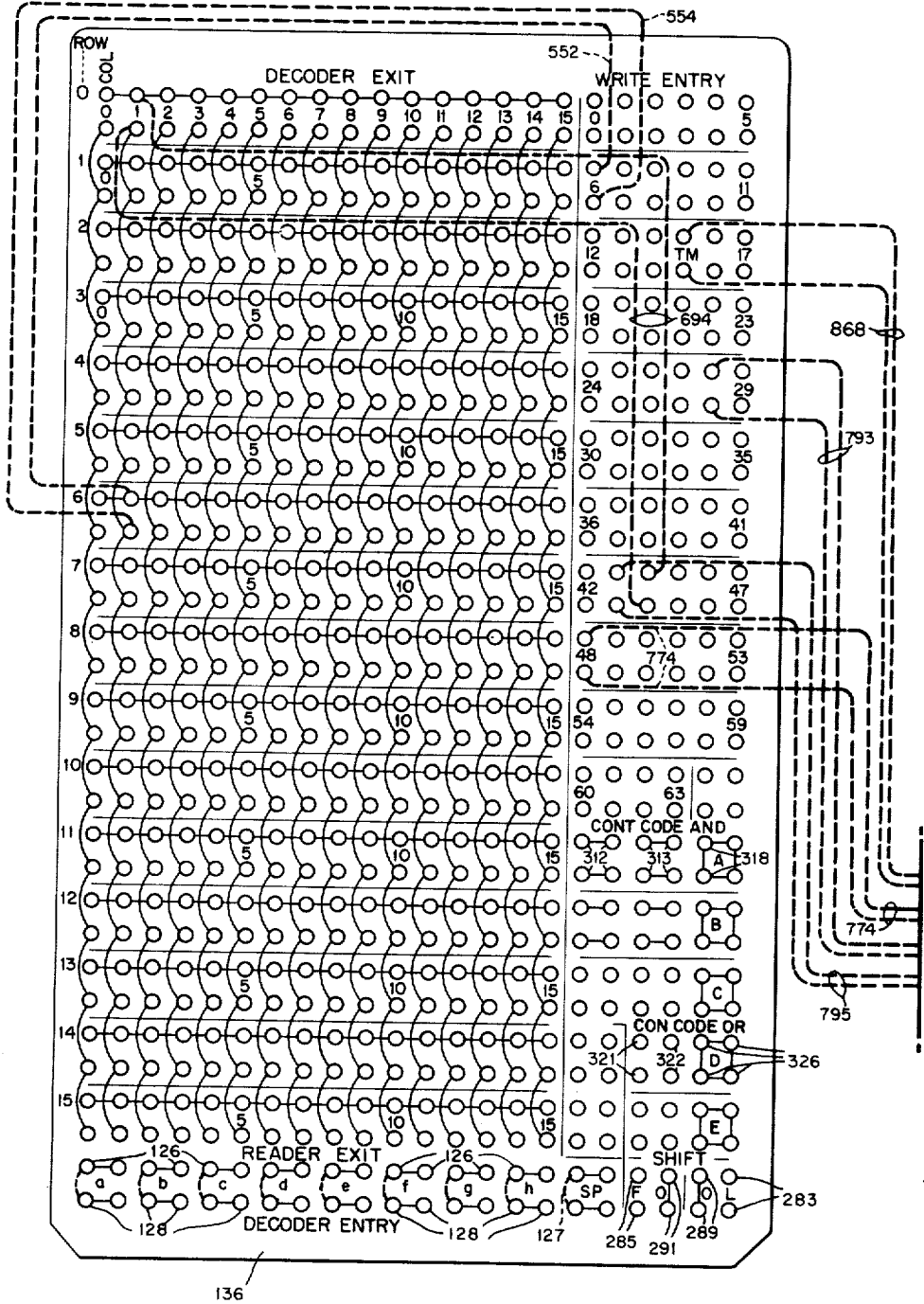

Fig. 12A illustrates the Panel Board of Fig. 8A comprising hubs used for connections between the Decoder Circuits and the Coder circuits and other miscellaneous circuits.

Figure 12B:
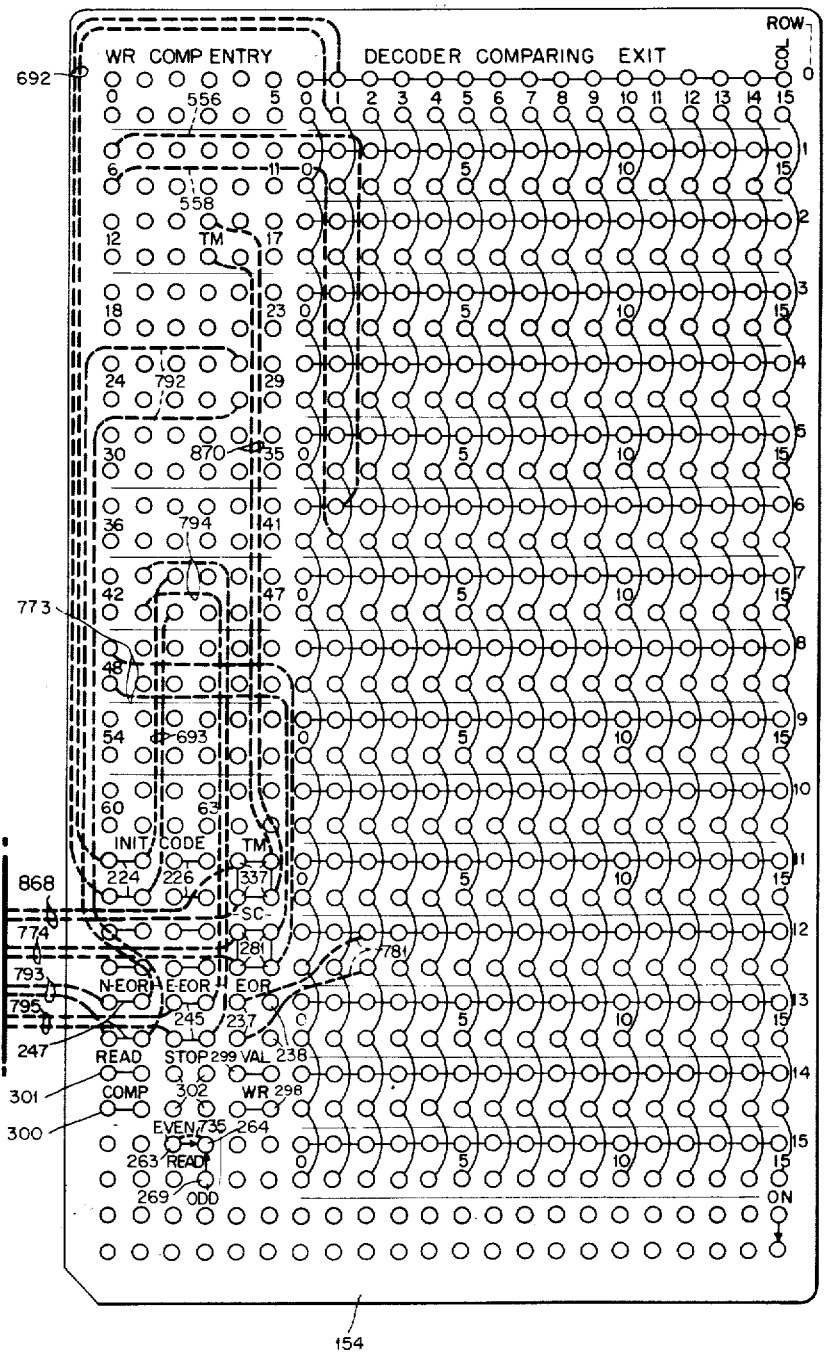

Fig. 12B illustrates the Panel Board of Fig. 8C, comprising hubs used for connecting between the Compare Decoder Circuits and the Compare Coder Circuits and other miscellaneous circuits.

Figure 13:
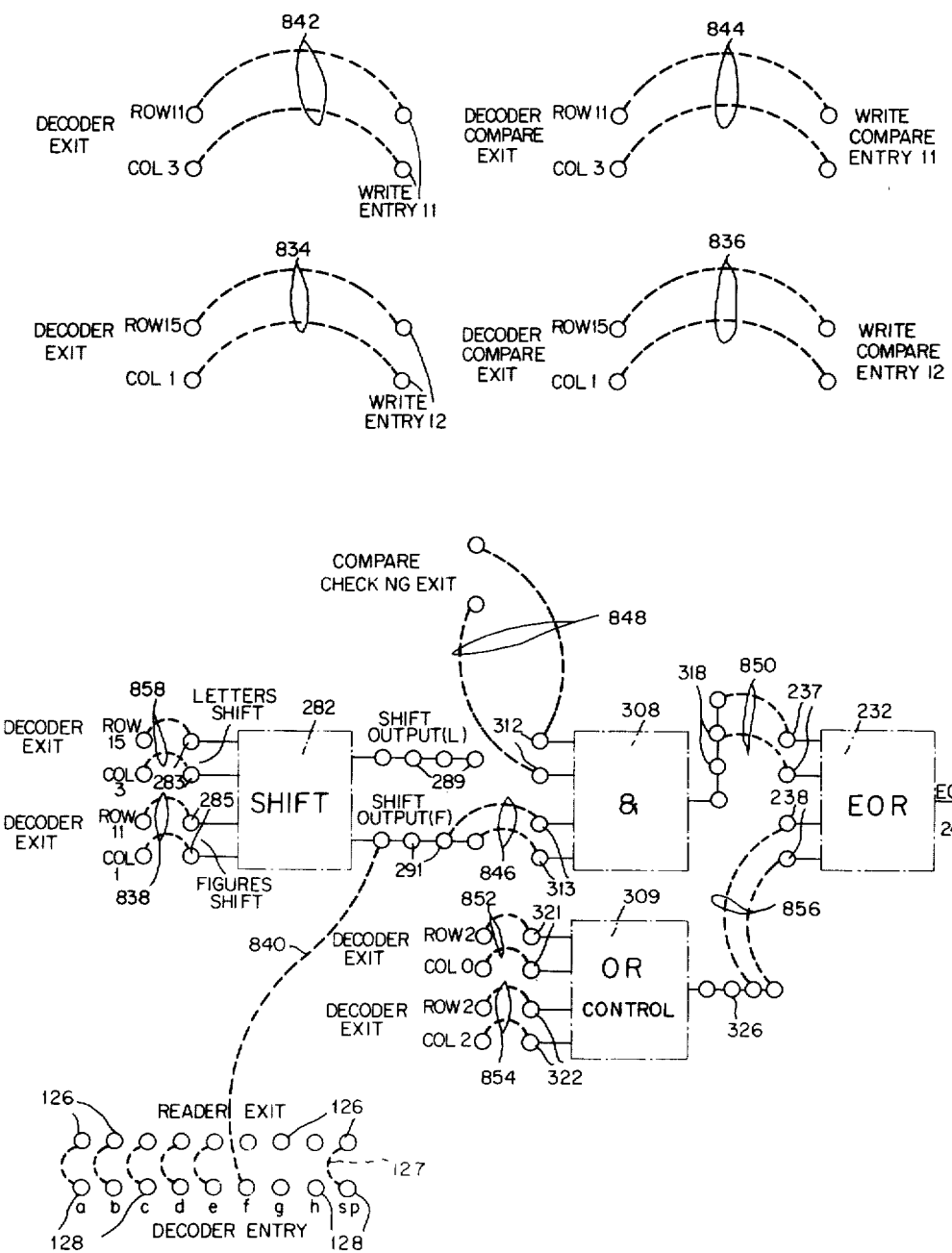

Fig. 13 is a schematic diagram showing the partial Panel Board connections necessary to read five channel paper tape code and to provide a stopping of the machine only if there is an error in a figure character.

Fig. 14 is a logical block circuit diagram of a "C" Bit Generator functional block of Fig. 8B.

Fig. 15 is a logical block circuit diagram of the Timing Pulse Generator functional block of Fig. 8A.

Fig. 16 is a logical block circuit diagram of the Write Circuits functional block of Fig. 8E.

Fig. 17 is a logical block circuit diagram of the Validity Check functional block of Fig. 8B.

Fig. 18 is a logical block circuit diagram of the Read Check functional block of Fig. 8C.

Fig. 19 is a logical block circuit diagram of the Compare Check functional block of Fig. 8D.

Fig. 20 is a logical block circuit diagram of the Write Check functional block of Fig. 8D.

Fig. 21 is a logical block circuit diagram of the Start functional block of Fig. 8B.

Fig. 22 is a logical block circuit diagram of the End of File functional block of Fig. 8B.

Figure 23:
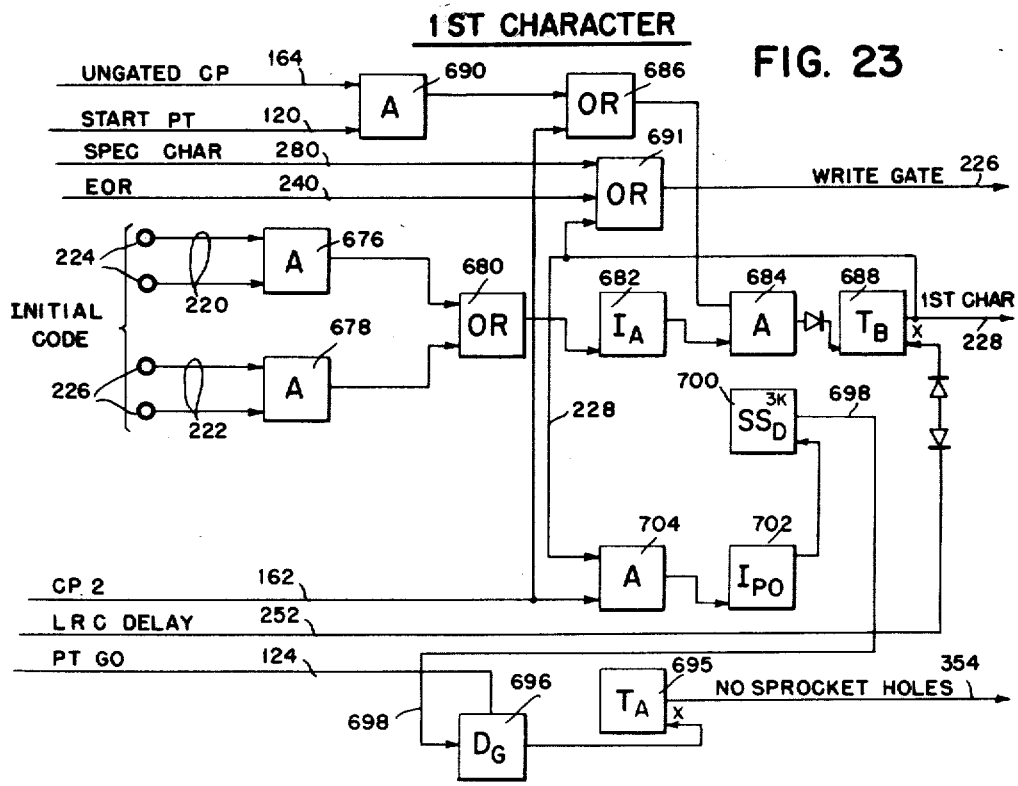

Fig. 23 is a logical block circuit diagram of the First Character functional block of Fig. 8B.

Figure 24:
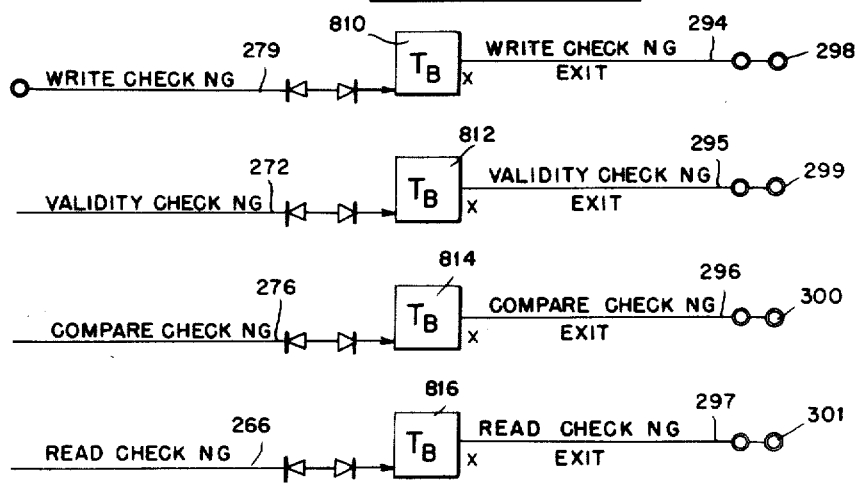

Fig. 24 is a logical block circuit diagram of the Check Triggers functional block of Fig. 8B.

Fig. 25 is a logical block circuit diagram of the Paper Tape GO functional block of Fig. 8D.

Fig. 26 is a logical block circuit diagram of the End of Record functional block of Fig. 8B.

Fig. 27 is a logical block circuit diagram of the Write Sample functional block of Fig. 8D.

Fig. 28 is a logical block circuit diagram of the Check Stop functional block of Fig. 8B.

Fig. 29 is a logical block circuit diagram of the Special Character functional block of Fig. 8B.

Fig. 30 is a logical block circuit diagram of the End of Record Character functional block of Fig. 8B.

Fig. 31 is a logical block circuit diagram of the Shift Output functional block of Fig. 8B.

Fig. 32 is a logical block circuit diagram of the End of Record Gap and Longitudinal Redundancy Check functional block of Fig. 8D.

Figure 33:
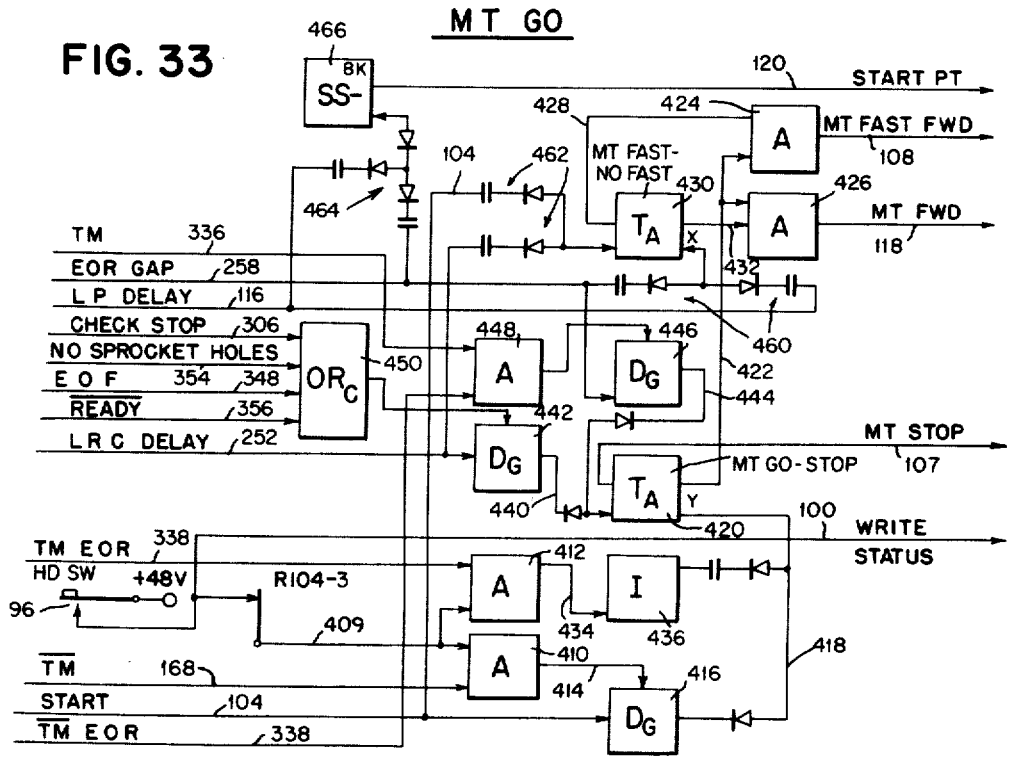

Fig. 33 is a logical block circuit diagram of the Magnetic Tape GO functional block of Fig. 8D.

Figure 34:
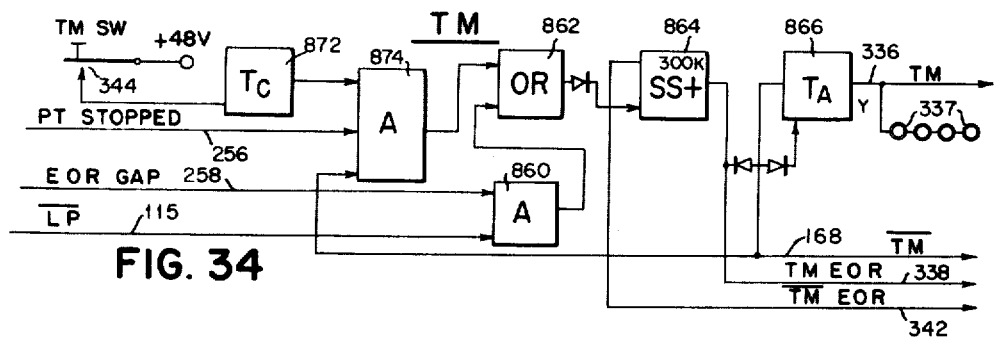

Fig. 34 is a logical block circuit diagram of the Tape Mark functional block of Fig. 8D.

Figure 35:
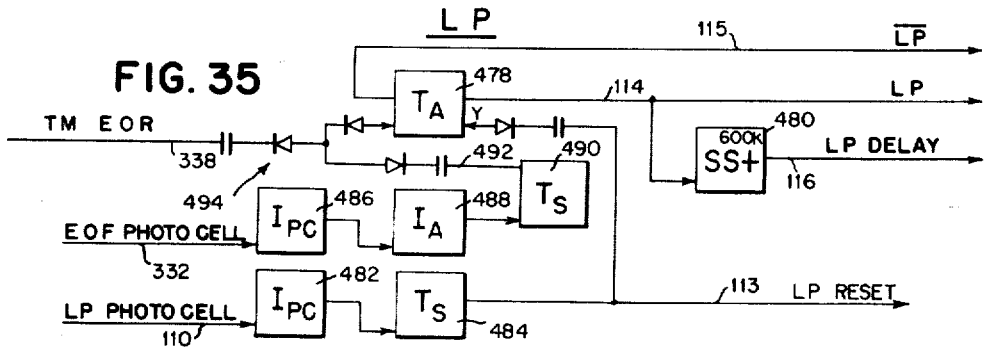

Fig. 35 is a logical block circuit diagram of the Load Point functional block of Fig. 8D.

Fig. 36A is a logical block circuit diagram of the AND circuit control functional block of Fig. 8E.

Fig. 36B is a logical block circuit diagram of the OR circuit control functional block of Fig. 8E.

Figure 37:
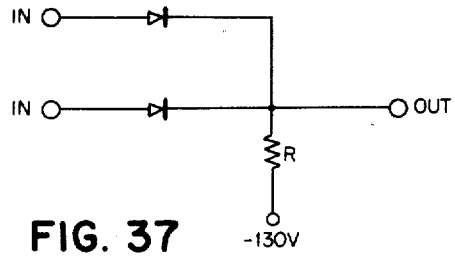
Figure 38:
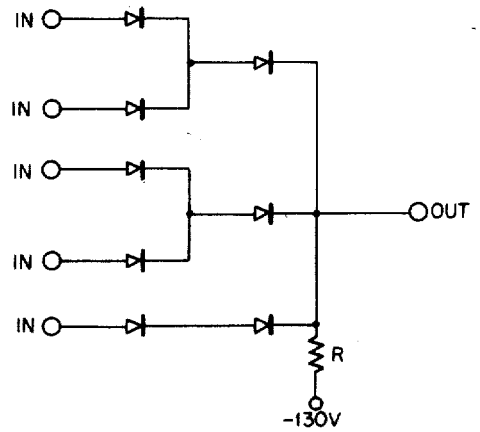

Figs. 37 and 38 are detail circuit diagrams and respective logical block representations of OR circuits employed in the invention.

Figure 39:
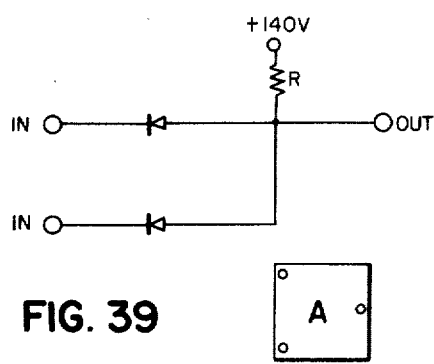
Figure 40:
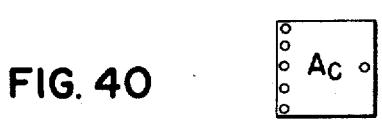

Figs. 39 and 40 are detail circuit diagrams and logical block representations of AND circuits employed in the invention.

Figure 41:
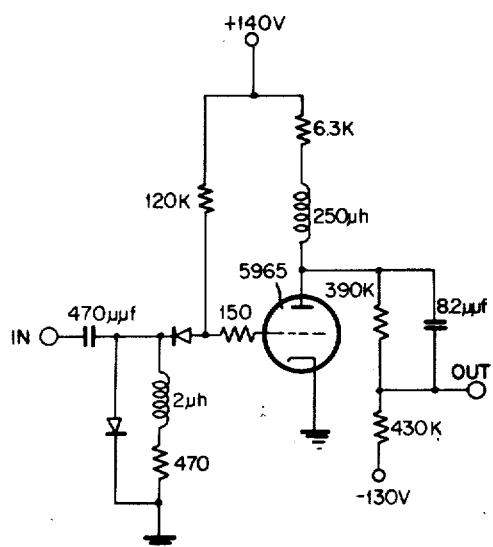

Fig. 41 is a detailed circuit diagram and corresponding block representation of a peaker employed in the invention.

Figs. 42 through 49 are detail circuit diagrams and respective logical block representations of Inverters employed in the invention.

Figs. 50 through 55 are detail circuit diagrams and respective logical block representations of Electronic Triggers employed in the invention.

Figure 56:
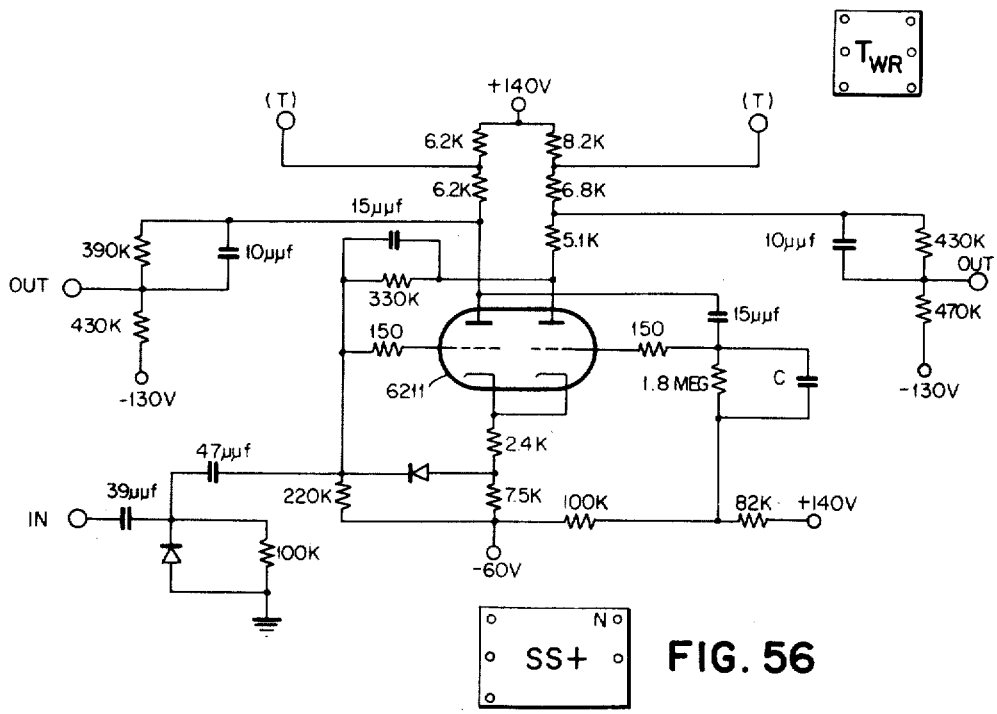
Figure 57:
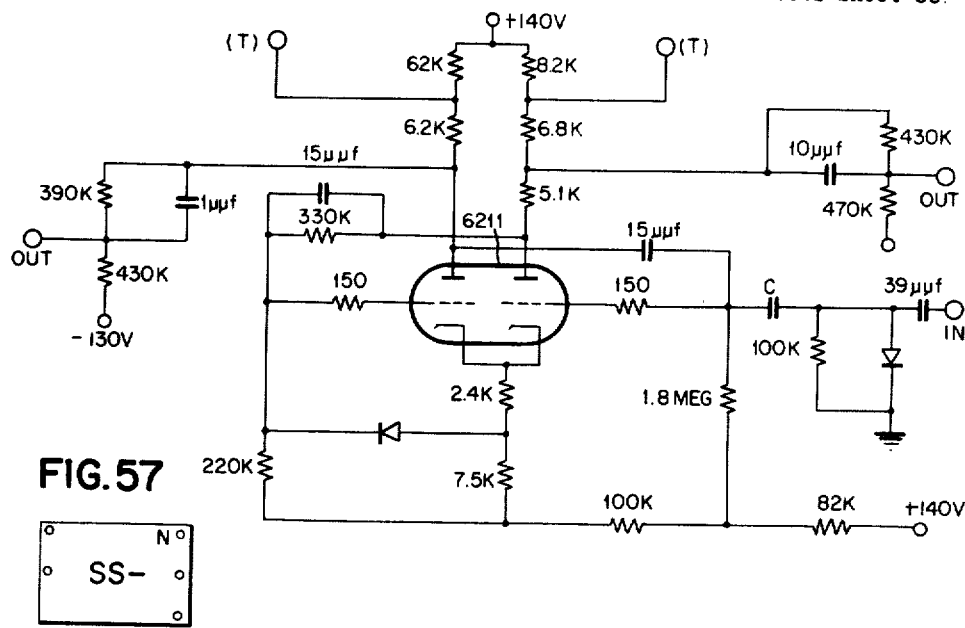
Figure 58:
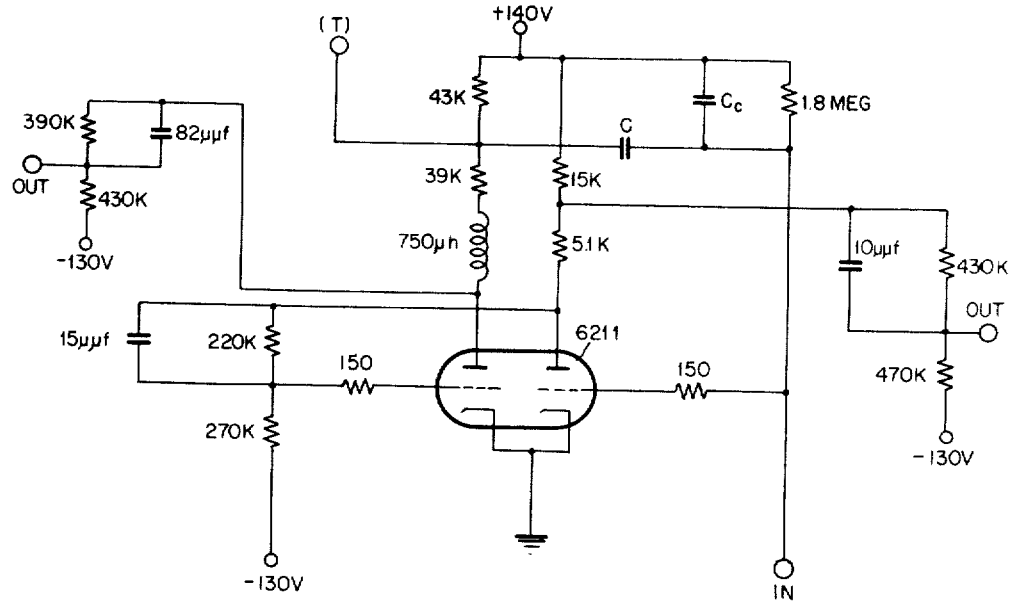

Figs. 56 through 58 are detail circuit diagrams and respective logical block representations of Single Shot Multivibrators employed in the invention.

Figs. 59 through 66 are detail circuit diagrams and respective logical block representations of Trigger Inputs employed in the invention.

GENERAL DESCRIPTION

Figures 2, 3:
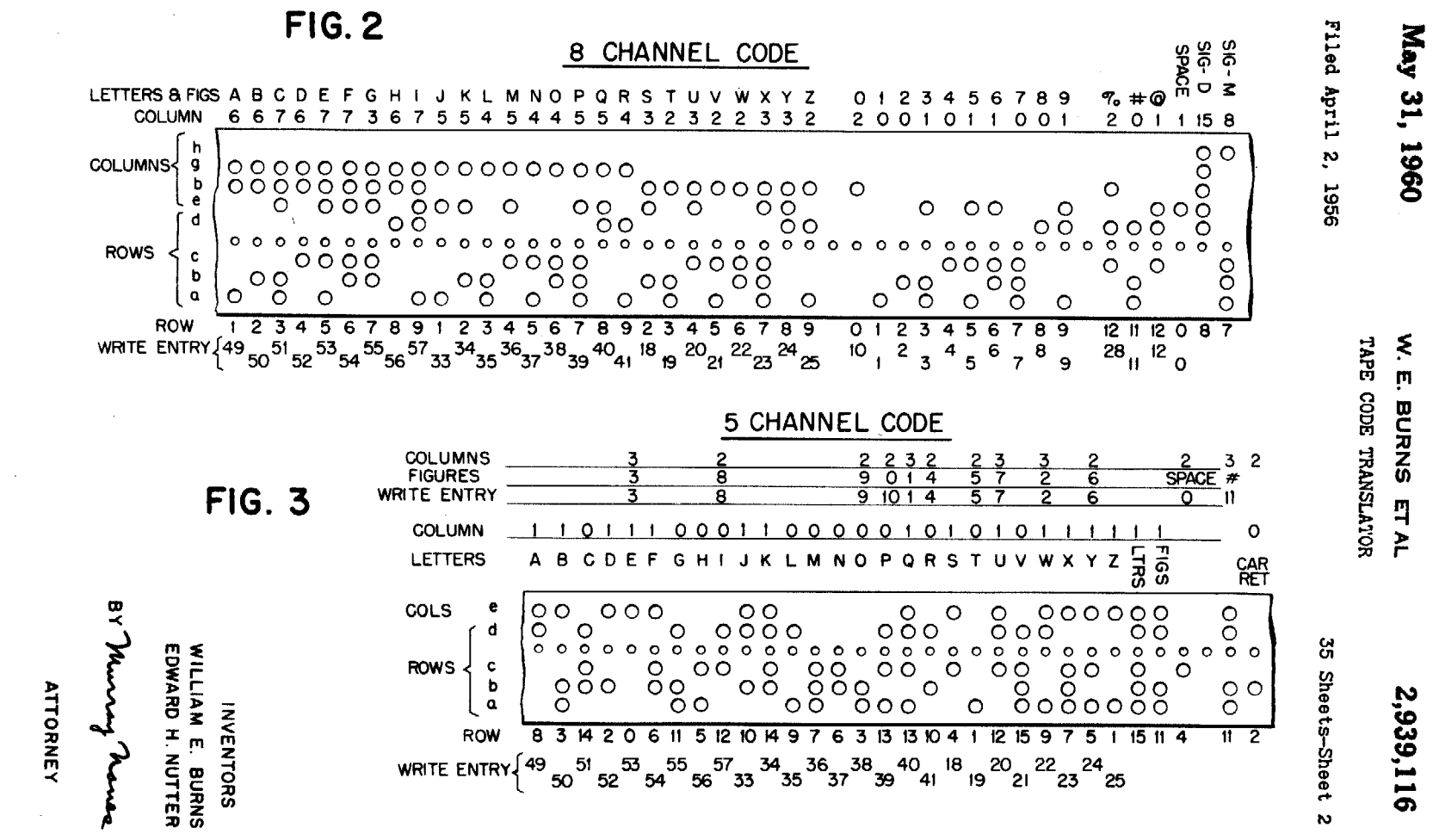

The present invention provides apparatus whereby the information punched on paper tape may be recorded on magnetic tape. In the paper tape systems, any of the standard punched paper tape widths of 5, 6, 7 or 8 channels may be employed, making use of codes to represent the various symbols. Figs. 2 and 3 indicate two of the many punched tape codes in common use. Holes are perforated across the width of the tape. The smaller holes on the paper tape are known as sprocket holes and are used for feeding and alignment when the tape is punched and for generating timing pulses in the translator. The larger holes are used either singly or in combination to represent characters or functions. The arrangement of the holes for the representation of numerical characters, alphabetic characters, and functions are shown in an eight channel tape of Fig. 2, the channels of which have been arbitrarily labeled channels $a$ through $h$. For reasons to be made clear hereinafter, the channel $a$ through $d$ are known as the Row channels, and channels $e$ through $h$ are known as the Column (Col.) channels. Channels $a$, $b$, $c$, and $d$ are arbitrarily assigned values of 1, 2, 4, and 8 respectively. Therefore, by adding the arbitrary values of the holes in channels $a$ through $d$, 16 Row values from 0 to 15 are obtained. Similarly, channels $e$, $f$, $g$, and $h$ arbitrarily correspond in value to numbers 1, 2, 4, and 8, and these latter channels may represent any 16 Column numbers from 0 to 15. Hence, any character or function may be represented by a Row and a Column designation. For instance, the letter A in Fig. 2 is represented by Row 1, Column 6. Since there are sixteen Rows and sixteen Columns, the number of different characters and functions which can be represented by an eight channel code is 16 times 16, or 256.

A five channel code is shown in Fig. 3, in which channel $e$ represents the only Column value. There are, therefore, only two Column numbers, 0 and 1 in a five channel code. Since there are 16 Rows and 2 Columns, the number of different characters and functions which can be represented by a five channel code is ordinarily 16 times 2, or 32. In order to enable the transmission of more than thirty-two different characters and symbols, the same code combinations, for example, are employed for designating alphabetical and numerical data; thus, it is necessary, for intermixed alphabetical and numerical data, to employ key signals for identifying the data designating code combinations or signals as alphabetical or numerical. Characters represent letters if they are preceded by a LTRS character (Row 15, Col. 1) and digits or if they are preceded by a Figs. character (Row 11, Col. 1).

The sensing of the FIGS code will act in a manner to be described hereinafter to add an effective simulated hole in a channel $f$ of the code. Thus, in the five channel code a digit 3 and letter E are both normally a punch in channel $e$ only, and thus represented by Row 0, Col. 1. If a FIGS code precedes a punch in channel $e$, circuits are operated to produce a simulated hole in channel $f$, to add two to the Col. number and make a 3 designation, Row 0, Col. 3.

In present commercial electronic data processing machines, it is common practice to record information on magnetic tape. Reference to Fig. 5 shows that the recording on the tape is of the multiple channel variety, and usually employing seven channels of recording per width of tape.

Since the paper tape codes are usually wholly different from the seven bit code used on magnetic tape systems, wherever it is desired to prepare magnetic tape in accordance with the data contained on a paper tape, it is necessary to provide suitable translating means.

Characters are manifested or recorded in the binary system of notation. In the binary notation, only two digits are employed, i.e., 0 and 1. The decimal digit 0 is represented by a binary digit 0, and the decimal digit 1 is represented by a binary digit 1. These binary digits are referred to as bits. The digital position or orders in a binary number, reading from right to left, corresponding in value to $2^0$, $2^1$, $2^2$, $2^3$, $2^4$, $2^5$, etc., or decimal digits 1, 2, 4, 8, 16, 32, etc., respectively. For example a binary number 1001 represents the decimal digit 9, which is determined by the addition of the decimal digits 1 and 8, indicated by a binary 1, in the extreme right and the extreme left binary positions, respectively. Hence, by using binary bits or pulses in groups of four, any decimal digit from 0 to 9 inclusive, may be written in the pure binary notation. Thus, in a tape seven channels wide, a seven bit code may be used in which the first four bits are used for numeric representation, the fifth and sixth bits for zoning (to expand the code to include alphabetic and special characters), and the seventh bit for checking errors. The zoning portion comprises the fifth and sixth bits, called A and B bits (Fig. 5) which may be used, in combination with the numeric portion to expand the code to include alphabetic and special characters. The seventh bit called the C bit, is used for checking purposes.

In Fig. 5 is shown the first six bits (1, 2, 4, 8, A and B) of the magnetic tape code and the symbols represented thereby. By using six bits, sixty-four different combinations known as Write Entries (for reasons to be made clear hereinafter) are obtained.

Seven bits across the tape comprise a character, a group of characters comprise a record, and each tape may contain many records. The seventh bit or C bit is inserted to make the sum of all the one binary digits even for an even parity check. For example, the decimal number 7 may be expanded in the magnetic tape code as 1000111. There are only three bits required to generate a decimal number 7 and the sum of these three bits will be odd. Thus, it is necessary to insert a fourth digit in the C or parity bit position to make the total sum even for the even parity check used. Of course, an odd parity may be used if desired. However, for the purposes of illustration, in the description of this invention, an even parity check will be employed.

As one example of what may be performed by the subject machine, Fig. 6 indicates a magnetic tape having two four character records. Above the magnetic tape is a row of characters to the right of the symbol PT (for paper tape). These are the symbols that are written in coded form on a paper tape, the translation of which written on magnetic tape is shown. The first two characters on the paper tape are asterisks (*), which may have been preselected as a meaningless initial code character written at the beginning of records. Any character may be used as an initial code character and the machine recognizes the initial code character as such before a record starts and does not write it on the magnetic tape. The first non-initial code character, a 1 in this example, is written on the magnetic tape, followed by 4, 5, and 2. A % has been preselected as a normal end of record character (N-EOR). The presence of this character, indicates not only the end of the record, but the fact that no error was made in transferring the information in the record from paper tape to magnetic tape.

Immediately following the N-EOR character is a short gap followed by a Longitudinal Redundancy Check (LRC) character, which is produced by selectively adding a 1 bit to each channel, to make the sum of all 1 bits in each channel even. This LRC character is used for checking in computers in a way which is of no importance to the invention and will not be described. Due to the nature of the tremendously high speed of the tape feeds in the magnetic tape readers used in electronic computers, gaps are found between records to provide for the time it takes to stop and to bring the tape up to speed. Since the magnetic tapes written by this machine are to be used on the electronic computers, the gaps between records (about ¾ of an inch) are provided and are called end of record gaps (EOR gaps). The EOR gap follows the LRC character and during the EOR gap, the magnetic tape is speeded up and the paper tape is stopped. After the EOR gap, the paper tape is started again and the magnetic tape is slowed down. If there is no initial code character, as in the example of Fig. 6, the characters in this second record are immediately transferred to the magnetic tape.

In the transfer of the character, each character is fed through a parallel pair of translate circuits, the outputs of which are compare checked. There are three other types of translate checking circuits which will be described hereinafter. If there is a checking error, the character in error will be blocked, and a special character will be written in its place. In the example of Fig. 6, the third character on the paper tape, which is an 8, is assumed to be translated incorrectly, an & will be written as the special character in its place. The presence of the error in the record is then stored and at the end of the record, an Error End of Record character (E-EOR) is written in place of the N-EOR character to signify an error somewhere in the record. The character shown as the E-EOR character in Fig. 6 is a $.

At the end of the information, or at the end of the magnetic tape, a character known as a tape mark (TM) is written on the magnetic tape to signify that fact, and this character too is followed by an LRC character.

STRUCTURAL DESCRIPTION

Figure 1:
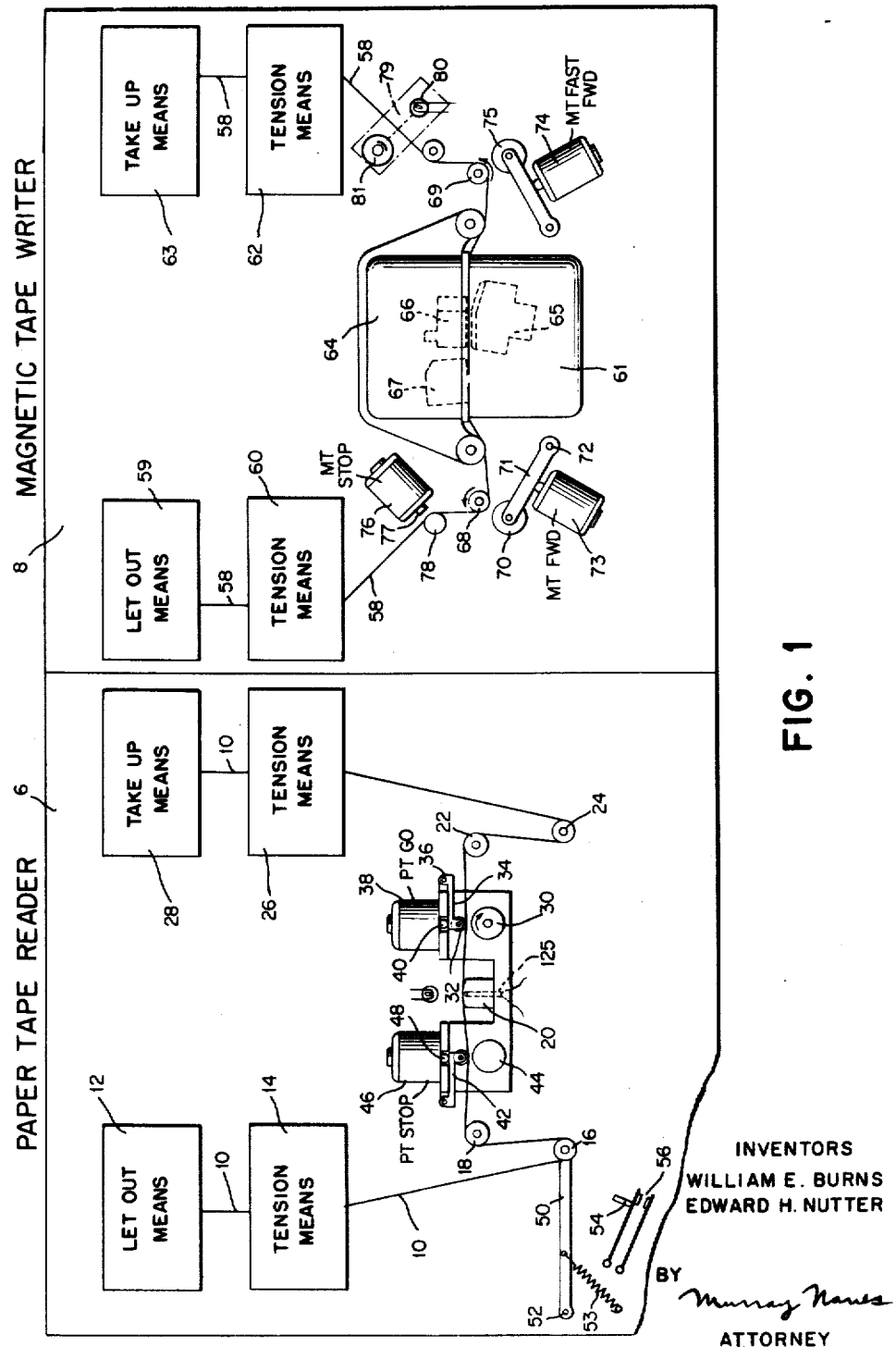
Fig. 1 is a front elevational view, partly diagrammatic, of the Paper Tape and Magnetic Tape feeds.

A general understanding of the physical arrangement of the machine may be obtained by reference to Fig. 1 of the drawings, in which is shown a Paper Tape Reader 6 and a Magnetic Tape Writer 8. In the Paper Tape reader 6, paper tape 10 from a let out means 12 is driven through a tensioning means 14, past idlers 16 and 18, a paper tape sense unit 20, idlers 22 and 24, and a tensioning means 26 to take up means 28 by a constantly rotating tape Drive capstan 30. The let out, take up and tensioning means may be of any type well known in the art and since they are not necessary for an understanding of the invention, they will not be further described. The tape Drive capstan 30 may be deemed to be constantly rotated in a clockwise direction by a motor (not shown) operating at a speed so that the periphery of the capstan is moving at 50 inches per second. In connection with the Drive capstan 30, there is provided a paper tape moving idler pulley 32 which is mounted on a lever 34 pivotally mounted on the machine frame at pin 36. Cooperating with the lever 34 is a paper tape Go solenoid 38 which has a plunger 40. The energization of the paper tape Go solenoid 38 depresses the plunger 40 imparting a counterclockwise movement to the lever 34 to cause a downward movement of the idler pulley 32 into engagement with the rotating capstan 30 to produce a forward feeding of said paper tape 10. A tape moving idler pulley 42 is associated with a non-rotating Stop capstan 44 and is rotatably mounted on the lever 42. The lever 42 is pivotally mounted on the frame and cooperates with the plunger of a paper tape stop solenoid 46. The energization of the paper tape solenoid 46 effects a downward movement of a plunger 48 against the urging of a spring (not shown) causing the idler pulley 42 to move downward into engagement with the non-rotary stop capstan 44 to stop the feeding of paper tape.

The idler pulley 24 is rotatably mounted on the Reader frame and idler pulley 16 is rotatably mounted on the end of an arm 50 which is pivotally mounted to the frame at pin 52. The tensioning means 14 will cause the paper tape 10 to hold the arm 50 in a relatively counterclockwise position against the urging of a light spring 53. However, when the end of the tape is reached, the arm 50 is then free to rotate in a clockwise direction to engage a pin 54 and thereby effect a closing of Paper Tape Break contacts 56.

In the Magnetic Tape Writer 8, magnetic tape 58 is fed from a let out means 59, through a tensioning means 60, a magnetic tape sense unit 61, and a tensioning means 62, to a take up means 63.

The magnetic tape sense unit 61 has a head cover 64 and contains Read/Write Heads 65, Erase Heads 66 and a photosensing device 67. The magnetic tape 58 moves past a pair of constantly rotating tape Drive capstans 68 and 69, both of which are rotated in counterclockwise directions. A motor (not shown) rotates Drive capstan 69 at a speed so that the periphery of the capstan is moving at twenty inches per second; while the Drive capstan 68 rotates by another motor (not shown), which causes the periphery of the capstan to move at 2½ inches per second. Cooperating with drive capstan 68 is an idler pulley 70 mounted on an arm 71 pivotally mounted on the machine frame at pin 72. A magnetic tape forward solenoid 73 is operable when energized to act against the arm 71 and thereby raise the idler 70 into contact with the drive capstan 68 thereby producing a forward feeding of the magnetic tape 58. MT fast forward solenoid 74 operates in the same way to effect a raising of an idler 75 into contact with the drive capstan 69 to produce a fast forward feeding of the magnetic tape. A magnetic tape is stopped by energizing an MT stop solenoid 76 which produces a downward movement of its plunger 77 into contact with a stop idler 78 that is fixed to the frame. The magnetic tape also moves past a photosensing unit 79 containing a light 80 and a magnetic tape break photocell 81. If the machine runs out of magnetic tape, or the tape breaks, the light 80 will shine on the photocell 81 to effect the stopping of the tape feeds.

In order to sense the beginning and end of the magnetic tape, the tape is provided with an aluminum strip fastened close to each end (see Fig. 4) which is sensed to indicate the start point and end point of the tape. The start point is hereinafter referred to as the Load Point, and the end point as the Tape Indicator Point. A Load Point (LP) aluminum strip 82 and the Tape Indicator (TI) aluminum strip 83 are sensed, in a manner to be described hereinafter, by photocells in the head cover.

The photosensitive device 67 (Figs. 1 and 4) is located within the head cover 64 (Fig. 1) so as to enable it to detect the LP aluminum strip 82 (Fig. 4) and TI aluminum strip 83. Device 67 comprises two blocks, 84 and 85 each having two diagonal grooves cut so as to meet at an opening at the bottom of the blocks. A Load Point photocell 86 in a groove of block 84 receives light reflected off the surface of the magnetic tape through the opening from a Load Point light bulb 85 in another groove. The second block 85 includes similar mechanisms but used for detecting the Tape Indicator point, comprising a light bulb 87 and a photocell 88 (not shown in Fig. 4).

The Load Point and Tape Indicator photocells 86 and 88 respectively, are photocell devices of the well known type, wherein a change in intensity on the photocell changes the electrical conductivity thereof. The tape used in the machine is made of cellulose acetate which is a poor reflector of light in the range of the spectrum in which the photocell is sensitive. The photocells used may be considered variable resistance devices because when the light shining on a photocell is reflected off the tape, the photocell has a high resistance, but when the light shines directly into the photocell or is reflected off the aluminum strips, the photocell resistance is low. When an aluminum strip passes under the photocells, the amount of light received by the photocell reflected off the aluminum strip will increase enough to operate circuits to be described hereinafter.

FUNCTIONAL DESCRIPTION—START OF OPERATION

The functional block diagrams of Figs. 8A to 8E, inclusive, will now be described in conjunction with the timing chart of Fig. 9. The details within the functional blocks will be described hereinafter.

Before either of the tapes can be started, the magnetic tape head cover 64 must be down, at which time a head cover switch 96 (Fig. 8D) is closed completing a circuit in a Magnetic Tape Go (MT Go) functional block 98, which acts to produce a positive output voltage on a Write Status lead 100. This Write Status voltage is a necessary condition for Writing on the magnetic tape as will be presently described.

At the start of operation, the magnetic tape is to be fed at a fast forward speed until the Load Point is reached, at which time the magnetic tape is to be fed at normal speed and the paper tape feed is to be started. Thus, pressing the start button St. Bt. (Fig. 8B) completes a circuit in a Start functional block 102 that produces a positive pulse on a Start lead 104 (see timing chart Fig. 9) which is fed via a cable 106 to the MT Go functional block 98 (Fig. 8D) where it acts to remove the positive voltage condition on an MT Stop lead 107 (see Fig. 9) and produce a positive shift on MT Fast Fwd lead 108. This Fast Fwd positive shift on lead 108 is fed to the Magnetic Tape Writer 8 (Fig. 8E) to energize the Fast Forward magnet 74 (Fig. 1) and cause the magnetic tape to move at its fast forward speed, as described hereinbefore. The magnetic tape will move until the Load Point aluminum strip is sensed, at which time a positive signal is produced on LP photocell lead 110 (Fig. 8E) from the LP photocell (see timing chart Fig. 9). Lead 110 is connected to the input of a Load Point functional block 112 (Fig. 8D) in which the positive LP photocell signal generates a positive pulse on an LP Reset lead 113 and a positive shift on LP lead 114 and LP delay lead 116 (see Fig. 9). The LP delay lead 116 is fed to the MT Go functional block 106. After 600 milliseconds, the LP delay lead 116 goes negative (see Fig. 9) and acts within the MT Go functional block 98 to remove the positive condition on MT Fast Fwd lead 108 and cause a positive shift on a MT Fwd lead 118 (see Fig. 9) which is fed to the Magnetic Tape Writer 8 where it causes the magnetic tape to move at its normal forward speed. This 600 millisecond delay is required in the computers which utilize the magnetic tape, and the reasons therefore need not be described to understand the invention.

The negative shift of the LP delay lead 116 also acts within the MT Go functional block 98 to produce a positive shift on the Start PT lead 120 (Fig. 9). Start PT lead 120 is fed to a PT Go functional block 122 (Fig. 8D). Since it physically takes more time for the magnetic tape to slow down than for the paper tape to start, an eight millisecond delay is provided within the MT Go block 122 before the paper tape is started. After eight milliseconds the Start PT lead 120 goes negative (see Fig. 9) and this negative shift is fed to the PT Go functional block 122 where it produces a positive shift on a PT Go lead 124 (Fig. 9). PT Go lead 124 is fed to the Paper Tape Reader 6 (Fig. 8A) and the positive shift thereon energizes the PT Go magnet 38 (Fig. 1) and causes the paper tape to start feeding as previously described.

FUNCTIONAL DESCRIPTION—TRANSLATING

The paper tape sense unit 20 (Fig. 1) contains nine photocells 125 (Fig. 8A) which are connected via leads $a$ to $h$ and SP to hubs 126. Assuming eight channel paper tape is being read, the eight channel leads $a$ to $h$ are plug wired via hubs 128 to a cable 130. The output leads $a$ to $h$ of cable 130 are fed to the translating circuits of Fig. 8A and the Compare translating circuits of Fig. 8C, where the paper tape code is converted to the magnetic tape code.

Leads $a$, $b$, $c$, and $d$ from cable 130 are fed to a Decoder Inverter functional block 132, the outputs of which are the leads $a$, $b$, $c$, $d$ and the leads $\bar{a}$, $\bar{b}$, $\bar{c}$, $\bar{d}$, all eight of which are fed to Decoder circuits functional block 134. A designation having a bar over it stands for the negative value of the designation, i.e., $\bar{b}$ stands for not $b$. Thus, if lead $b$ has a positive voltage thereon, lead $\bar{b}$ is negative and vice versa. The eight input leads $a$, $b$, $c$, $d$, $\bar{a}$, $\bar{b}$, $\bar{c}$, and $\bar{d}$ are combined in a Decoder circuit functional block 134 and emerge as leads corresponding to all the sixteen different combinations of four leads from $\bar{a}$, $\bar{b}$, $\bar{c}$, $\bar{d}$, to $a$, $b$, $c$, $d$ (see Fig. 8A), each of which is connected to different Rows of hubs in the plug board 136. For instance, the leads $\bar{a}$, $\bar{b}$, $c$, $d$ will be positive if leads $\bar{a}$, $\bar{b}$, $c$, and $d$ are positive. Similarly, leads $e$, $f$, $g$, and $h$ from cable 130 are fed via Decoder Inverters block 138 and Decoder circuits 140 from which they emerge as leads corresponding to all sixteen different combinations from $\bar{e}$, $\bar{f}$, $\bar{g}$, $\bar{h}$, to $e$, $f$, $g$, $h$, each of which is connected to different columns of hubs in the panelboard 136.

There are 64 double hubs on the panelboard 136 labeled Write Entries leads 0 to 63. The Write Entry leads are connected in circuitry within the Coder functional block 142 so as to produce all the 64 different combinations of the magnetic tape coding six bits $b$, $a$, 8, 4, 2, and 1, previously described, on leads $b$, $a$, 8, 4, 2, 1 from the output of the Coder functional block 142. These six leads are fed into a cable 144 (Figs. 8B, 8D, and 8E) for use by a parity or "C" bit generator and check circuits, and eventually to Magnetic Tape Write circuits. It is now apparent that any of the paper tape codes can be translated to the magnetic tape code by plug wiring the Row and Column hubs of each character to the pair of Write Entry hubs corresponding to the combination in the magnetic tape code of that character.

To provide for greater accuracy, two translate circuits are provided, the results of each being checked against the other before writing on the magnetic tape. Fig. 8C indicates that the Compare translate circuits functional blocks are similar to the translate circuits of Fig. 8A. For instance, Compare Decoder Inverters blocks 146 and 148 are equivalent to the Decoder Inverters blocks 132 and 138, the Compare Decoder circuits blocks 150 and 152 are equivalent to the Decoder circuit blocks 134 and 140, and Compare Plugboard 154 is equivalent to Plugboard 136. The only difference is in Compare Coder circuits block 156 where the output leads are $\bar{b}$, $\bar{a}$, $\bar{8}$, $\bar{4}$, $\bar{2}$, and $\bar{1}$ instead of $b$, $a$, 8, 4, 2, and 1.

Timing pulses for the machine are derived from the sprocket holes punched in the paper tape. These sprocket holes are smaller than the coded perforations and the center of each sprocket hole is aligned with a line through the center of the coded perforation of a character. Each sprocket hole in the moving paper tape, is sensed by a photodiode 125$j$ (Fig. 8A) which produces a signal that is fed via lead SP, one of the 126 hubs, a plug wire 127, one of the 128 hubs, and a sprocket holes lead 158 to the Timing Pulse Generator functional block 160 where it starts the production of positive pulses on CP2, ungated CP, and CP1 leads 162, 164, and 166 respectively.

Each of these CP pulses is thus initiated when all the perforations of a paper tape character are under the photodiodes. The ungated CP pulses are approximately 500 microseconds long and occur simultaneously with the CP1 pulses (see Fig. 9). However, the CP1 pulses are gated within the Timing Pulse Generator functional block 160 (Fig. 18A) by the $\overline{TM}$ and clock gate leads, 168 and 170 respectively, for reasons to be more fully described hereinafter. The CP2 pulses always start 180 microseconds after the start of the ungated CP pulses and last for 100 microseconds (see Fig. 9). The CP1 lead 166 is connected to the Decoder Circuits 134 and 138 and the Compare Decoder circuits 150 and 152, and the CP1 pulses thereon act to activate the translation circuits of Figs. 8A and 8C to simultaneously produce outputs on the leads in cable 144 of Figs. 8B, 8D, and 8E.

FUNCTIONAL DESCRIPTION GENERATING C BIT AND WRITING

The leads B, A, 8, 4, 2, and 1 in the cable 144 are connected to a "C" Bit Generator block 172 which acts to make the total bits even, as previously described, by adding a "C" bit if the sum of the bits in a character are odd. If a "C" bit is to be added, "C" write bus lead 174 goes positive, but if no "C" bit is to be added, a "C" write bus lead 176 goes positive. "C" write bus lead 174 is connected to the Write Circuits functional block 178 (Fig. 8E).

The leads B, A, 8, 4, 2, and 1 in the cable 144 are also connected via write bus leads 180 through 185 inclusive, respectively (Fig. 8E) to Write Circuits functional block 186 through 191 respectively. Each Write circuit functional block has three input leads; one of the Write Bus leads 174, and 180 through 185, the Write Status lead 100, and a Write Sample lead 192. Write Circuits functional block 178 has three output leads; a pair of C bit Write leads 194$a$ and 194$b$, each connected to an end of a Write Coil 65C of one of the Write Heads 65 in the Magnetic Tape Writer 109, and a Write Echo C bit lead 198. The Write circuits 186 through 191 are connected to pairs of bit write leads 200$a$ and 200$b$ through 205$a$ and 205$b$ respectively, and Write Echo leads 206 through 211 respectively. The Write leads 200$a$ and 200$b$ to 205$a$ and 205$b$ are connected to the Write coils of their respective bits in the Magnetic Tape Writer 109. A positive pulse on the Write Bus leads causes a Writing of the respective bits. Ordinarily, the machine is operated so that the magnetic tape is continuously being erased just before the bits are written thereon. This is accomplished by having the Write Status lead 100 connected to an Erase Circuit 214, the output of which is the Erase coil 66. Since the Write Status lead 100 is positive when the machine is started, the Erase Circuit 214 will act to cause a continual erase of the tape of all seven channels prior to the arrival of the portion being erased, at the Write heads.

With a positive condition on the Write Status lead 100, each bit appearing on the Write Bus leads 174 and 180 through 185 will cause respective bit write leads 194$a$ 194$b$, and 200$a$ and 200$b$ through 205$a$ and 205$b$ respectively, to write on the magnetic tape when the Write Sample lead 192 shifts negative from a positve potential. The Write Sample lead 192 does not go positive until it is determined that the character read from the paper tape is not an initial code character.

In Fig. 8B, a First Character functional block 218 is connected via four pairs of input leads, only two pairs of which, 220 and 222, are shown, to Initial Code hubs 224 and 226 respectively, which are actually on the Panelboard 154. Each pair of Initial Code hubs 224 and 226 is wired to the Row and Column hubs of a character to be used as an Initial Code character. Four pair of hubs are in the preferred embodiment of the invention, but it is obvious that any number of Initial Code characters contemplated may be provided. Since each of the Decoder circuits 134 and 140 is gated by a CP1 pulse, if an Initial Code character is being read from the paper tape, the corresponding pair of Initial Code lines will go positive during the same time a CP1 pulse is positive, as indicated in Fig. 9, whereon the Initial Code input lead 220 is shown to go positive for the first two characters sensed, thereby indicating that these first two characters are Initial Code characters. When the third character is sensed, it is not an Initial Code character and the Initial Code lead 220 does not go positive. Therefore, a CP2 pulse on the CP2 lead connected to the First Character functional block 218 is now permitted to make a Write Gate lead 226 and a First character lead 228 go positive.

The Write Gate lead 226 is connected to a Write Sample functional block 230 which also has a CP2 input lead 162. The coincidence of a positive shift on the Write Gate lead 226 and CP2 lead 162 produces a positive Write Sample pulse (see Fig. 9) on the Write Sample lead 192 which has been described hereinbefore as being connected to the Write Circuits. The negative shift of the Write Sample pulse then causes the first character to be written on the Magnetic Tape. Fig. 9 shows the Write Sample pulse being produced for the four characters making up the record in the example described. It is evident that any number of characters may comprise a record.

The Write Sample functinal block 230 has as an output lead, Write Sample Delay lead 231 which provides a short duration positive pulse that starts four microseconds after the Write Sample pulse and is used in the checking circuits.

FUNCTIONAL DESCRIPTION—END OF RECORD

To indicate an end of record, a special end of record character is usually used on the paper tape. This paper tape end of record character is sensed by an EOR (End of Record) functional block 232 which is connected via two pairs of input leads 234 and 236 to EOR Character hubs 237 and 238 respectively, which are on the Compare Panelboard 154. There is usually one EOR Character on the paper tape, but the additional pair of EOR Character hubs provides for the possibility of more than one EOR character. Each pair of EOR character hubs 237 and 238 is wired to the Decoder Exit Row and Column hubs of a character to be used as an EOR Character.

When the EOR character is sensed, an EOR Character lead 240 goes positive during CP1 time, and this positive signal is transmitted from the EOR functional block 232 to its output EOR lead 240 (Fig. 9). EOR lead 240 is connected to the input of an EOR character functional block 242 which has two outputs, an Error End of Record Character (E-EOR Ch.) lead 244 and a Normal End of Record Character (N-EOR Ch.) leads 246. The EOR character functional block 242 is normally effective to permit an EOR pulse on EOR lead 240 to positively shift N-EOR Ch. lead 246, unless there is an error in the record. When there is an error, the EOR pulse positively shifts the E-EOR Ch. lead 244, as will be more fully described hereinafter. The N-EOR Ch. lead 246 is connected to four terminals 247 on panelboard 154, only two of which are shown in Fig. 8B. The terminals 247 are plug wired to the Write Entry hubs in the plug board for a character selected as a normal EOR character. The EOR lead 240 is also connected to an EOR Gap and LRC functional block 250 (Fig. 8D) which has as an output the LRC delay lead 252. The positive shift on the EOR lead 240 produces a positive shift on the LRC delay lead 252 which is connected via a cable 254 to the First Character functional block 218. The positive shift on LRC delay lead 252 causes the First Character lead 228 to go negative, but the Write Gate lead 226 remains positive due to the positive condition of EOR lead 240, for reasons to be made clearer hereinafter. The Write Gate lead 226 and the CP2 lead 162 act on the Write Sample functional block 230 to cause the Write Sample pulse to shift negative and cause the N-EOR character to be written on the Magnetic tape. The First Character lead 228 is connected to the PT Go functional block 122 and the negative shift thereon causes the PT Go functional block 122 to produce a negative shift on PT Go lead 120 and a positive shift on a PT Stopped lead 256 which effects a stopping of the paper tape.

The end of the EOR pulse on lead 240 allows the First Character functional block 218 to produce a negative shift on the Write Gate lead 226. The paper tape is moving at a high speed and it is possible that it may move just far enough so that the next hole is sensed by the photocells 125 and produce CP pulses, as shown in Fig. 9. The reason this paper tape character is not written on the magnetic tape at this time is that the Write Gate and First Character leads 226 and 228 respectively are negative and no Write Sample pulse is developed. The LRC delay lead 252 is positive for 9 milliseconds, after which it goes negative and causes the EOR Gap and LRC functional block 250 to produce a positive shift on an EOR gap lead 258 and a sharp positive pulse on Write Trigger Reset lead 260, the latter being fed to all the Write Circuits 178 and 186 to 191 inclusive. As will be described hereinafter, the Write Trigger Reset pulse acts to add bits in the form of a longitudinal redundancy character (LRC) so that the number of bits in each channel are even. The negative shift of the LRC delay signal will also cause the Magnetic Tape motion control to change the Magnetic Tape speed from Forward to Fast Forward speed during the EOR gap, during which the magnetic tape will move approximately three quarters of an inch. This is accomplished at the MT Go functional block 98 where the negative shift on LRC delay lead 252 causes a positive shift of the MT Fast Fwd. lead 108 and a negative shift of the MT Fwd. lead 118. The length of the EOR gap is thirty milliseconds, after which time the EOR gap lead 258 goes negative to start the reading of another record.

As previously stated, the second record of the example has its first character directly under the photocells and it will be assumed that it is not an Initial Code character. The negative shift of the EOR gap lead is applied to the MT Go lead to cause the Magnetic Tape to be fed in Forward speed and to start the Paper Tape in a manner described hereinbefore. The Start PT lead 120 goes positive at this time, as previously described, and this positive shift is applied to the First Character functional block 218 where because of the positive status of Ungated CP lead 164, the Write Gate lead 226 and the First Character lead 228 go positive to cause the writing of the character being sensed from the paper tape in the manner hereinbefore described.

FUNCTIONAL DESCRIPTION—ERRORS AND CHECKING

Four different error checking circuits are provided in the machine. The first is a Read Parity Check which is only used where the Paper Tape code contains a parity bit. In Fig. 8C, a Read Parity Check functional block 261 is shown with its input leads connected to the leads $a$, $b$, $c$, $d$ and $\bar{a}$, $\bar{b}$, $\bar{c}$, $\bar{d}$ of Compare Decoder Inverters 146 and the leads $e$, $f$, $g$, $h$ and $\bar{e}$, $\bar{f}$, $\bar{g}$, and $\bar{h}$ of Compare Decoder Inverters 148. The Read Parity Check block 261 may check both odd or even parity. If the paper tape code has an even parity, the Even Read Check NG (no good) lead 262 is plug wired via a hub 263 to a hub 264 of a Read Check NG lead 266 (Fig. 8B) of the Special Character block 267 while if the paper tape code has an odd parity, the Odd Read Check NG lead 268 is plug wired via the hub 269 to the Read Check NG hub 264. The Read Parity Check block 261 operates to produce a positive shift on Read Even Check NG hub 263 if an odd number of bits in a character are sensed in an even parity check, and a positive shift on Read Odd Check NG hub 269 if an even number of bits are sensed in an odd partiy check.

The second error checking circuit is a Validity Checker that indicates if a valid character is generated. By definition, an invalid character is one which has no meaning (i.e., is not provided for) in the magnetic tape code and has therefore not been plug wired on the panelboard 136. If the machine operator, due to an oversight, fails to plug wire some character on the panelboard, the sensing by the paper tape of this character will also cause a validity error indication. This second error checking circuit is in a Validity Check functional block 270 (Fig. 8B) which contains as input leads the $b$, $a$, 8, 4, 2, and 1 leads from cable 144, CP2 lead 162, and the Row 0 Col. 0 leads from outputs of the Decoder Circuits 134 and 140. The Validity Check functional block 270 operates in a manner to be described hereinafter to produce a positive shift at CP2 time on a Validity Check NG lead 272 if the character sensed is an invalid character. Validity Check NG lead 272 is also connected to the Special Character functional block 267.

The third error checking circuit compares the output of the Coder block 142 (Fig. 8A) with the output of the Compare Coder block 156. CP2 lead 162 and the output leads $b$, $a$, 8, 4, 2, and 1 of Coder 142, and output leads $\bar{b}$, $\bar{a}$, $\bar{8}$, $\bar{4}$, $\bar{2}$, and $\bar{1}$ from compare Coder 156 are fed to Compare Check functional block 274 (Fig.

8D). Since the output of head *b* should always be of opposite polarity to that on lead $\bar{b}$, and the output of lead *a*, 8, 4, 2 or 1 of opposite polarity to its equivalent lead $\bar{a}$, $\bar{8}$, $\bar{4}$, $\bar{2}$ or $\bar{1}$, if any equivalent pair of leads is not of opposite polarity, a compare check error is indicated. The Compare Check functional block 274 therefore operates to produce a positive output pulse at CP2 time on a Compare Check NG lead 275 to indicate the Compare error. Compare Check NG lead 275 is also connected to the Special Character functional block 267.

The fourth error checking circuit compares the Write Echo outputs of the Write Circuits (effectively an indication of what has been written on the magnetic tape) with the output leads from Compare Coder 156 and produces an output pulse if they do not compare. The Write Echo leads 198 and 212 through 216 (Fig. 8E) are connected via a cable 277 to a Write Check functional block 276, the output of which is a Write Check NG lead 279 that is connected to the EOR Character functional block 242.

If there is a Write error, a signal will appear on the Write Check NG lead 279, when the Write Sample delay lead 231 goes positive. It can be remembered that the Write Sample delay pulse comes four microseconds after the Write Sample pulse and the CP2 pulse, and the four microseconds delay is used to insure that the information on the Write Echo leads are all present at the Write Check functional block 276 when the check is made.

As previously stated, the third character of the second record of Fig. 6 and Fig. 9 is assumed to be in error, let it be assumed, more specifically, a compare error. A positive shift will thus appear on the Compart Check NG lead 276 and be applied to the Special Character functional block 267. The function of the Special Character block 267 is to write a Special Error Character on the magnetic tape and prevent the erroneous information from being written thereon. The Compare Check NG lead 276 goes positive at the beginning of CP2 time of the third character as shown in Fig. 9 and produces voltage shifts on the output leads of the Special Character block 267. The clock gate lead 170 goes negative and a Special Character lead 280 goes positive for 400 microseconds (Fig. 9) and this latter positive shift is available at four Special Character hubs 281. The hubs 280 are connected to the Write Entry hubs on the Panelboards 136 and 154 for any character desired as a special error character. An & is the special error character used in the example of Fig. 6. To prevent the erroneous character (as distinguished from the special error character) from being written, the CP1 pulse is shortened so that the Decoder circuits 134 and 140 and the Compare Decoder Circutis 150 and 152 will not place the erroneous character on the output leads of the Coder 142 and Compare Coder 156 at the time the Write Sample pulse is developed every CP2 time (see Fig. 9). This is accomplished by applying the clock gate pulse on clock gate lead 170 to the Timing Pulse Generator 160 (Fig. 8A) where it cuts the CP1 pulse short, as indicated in Fig. 9. The Clock Gate lead 170 is also connected to the EOR Character functional block 242, and the negative clock gate pulse acts to place a positive potential on the E–EOR Character lead 244 and a negative potential on the N–EOR Character lead 246. Now when the EOR Character is to be written, the EOR pulse on EOR lead 240 acts on EOR character functional block 242 to cause the Error End of Record Character (a $ in the example of Fig. 6) to be written on the tape.

It can be observed from Fig. 8B, that the Write clock NG lead 279 is not connected to the Special Character functional block 267, but is connected to the EOR character functional block 242. This is true because, by the nature of the Write Check, a character is written on the tape at the same time the error is detected and thus it is impossible to write a Special Character on the tape at this time. However, the positive shift of the Write Check NG lead 279 at the EOR character functional block 242 shifts the E–EOR Character lead 244 positive, and causes an E–EOR Character to be written at the end of the record.

FUNCTIONAL DESCRIPTION—MISCELLANEOUS CIRCUITS

In order to be able to translate five channel paper tape code, the Shift functional block 282 of Fig. 8B is provided with an input EOR lead 240, a pair of Letter Shift input hubs 283 connected via a pair of leads 284 and a pair of Figure Shift input hubs 285 connected via a pair of leads 286. As outputs, Shift functional block 282 has a Shift Output Letters lead 288 connected to hubs 289, and a Shift output Figures lead 290 connected to hubs 291. The Letters Shift hubs 283 and the Figures Shift hubs 295 are each plug wired to the Row and Column hubs on the Panel Boards of the characters to be used as the Letters Shift Character and Figures Shift Character. The Shift Output Figures hub 291 is normally plug wired to the Decoder Input hub 128 (Fig. 8A) connected to lead *f*, as previously described, to produce a simulated bit in the channel *f* if hub 291 goes positive. Shift Output Figures hub 291 will go positive if a Figures Shift Character appears, to make Figures Shift hubs 285 go positive. A Letters Shift Character appearing at Letter Shift hubs 283 will then make the Shift Output Figures hub 291 negative and stop the simulated bits in channel *f*. The Shift functional block may be utilized in other manners to be described hereinafter.

It is possible to operate the machine to perform a variety of functions. For instance, it is possible to stop the machine as soon as an error is sensed. This is accomplished by utilization of a Check Triggers functional block 292 to the input of which the four Check NG leads 279, 272, 276, and 266 are connected. The output of the Check Triggers block 292 are four Check NG leads 294, 295, 296, and 297 which are shifted positive by a positive shift of the respective Check NG leads 279, 272, 276, and 266. When it is desired that one of the Error Check circuits act to stop the machine, the respective Check NG Exit leads 294, 295, 296 or 297 are connected via hubs 298, 299, 300, and 301 respectively to one of the Stop hubs 302 connected via Stop leads 302 of a Check Stop functional block 304. Thus any input hub 302 to the Check Stop functional block 304 going positive, produces a positive shift on a check stop lead 306 which is connected to the MT Go block 98 (Fig. 8D) to initiate a stopping of both tape drives.

In Fig. 8E are shown an AND circuit Control funtional block 308 and an OR circuit Control functional block 309 which allows for greater flexibility of operation. AND Circuit Control 308 has two pair of input leads 310 and 311 connected to hubs 312 and 313 respectively, and an output lead 316 connected to hubs 318. AND Circuit Control 308 operates to produce an output voltage condition only when both pair of leads 310 and 311 are positive.

OR Circuit Control 309 has two pair of input leads, 319 and 320 and an output lead 324 connected to hubs 326, and operates to produce an output when either or both pair of hubs 321 and 322 are positive. As an example of the operation of the OR Control Circuit 309, if it is desired that either one of two pair of paper tape characters be written as a single magnetic tape character, the Row and Column hubs of one of the characters on the plug board would be plug wired to hubs 321 of OR Circuit Control 309 and the Row and Column hubs of the other characters would be plug wired to hubs 322. Either one of these two characters appearing would produce an output at hubs 326 which are plug wired to the Write Entry hubs of the magnetic tape character desired. This is utilized very often in five channel pair tape where it may be desirable to have one magnetic tape character representative of the pair tape letter shift character or the paper tape figure shift character.

An example of the use of the AND Circuit Control might be in using five channel code where errors in letters are considered insignificant, but number errors are considered vital. In this case, it would be desirable to stop the machine only if there is a Figure shift. This is accomplished by connecting Shift Output Figures lead 291 to input hubs 312 of AND Circuit Control 308 and the Compare Check NG Exit lead 296 to the other input hubs 313. The output hubs 318 are then connected to the EOR hubs 302 (Fig. 8B) to simulate an end of record and stop the machine. This operation will be described in more detail herinafter in conjunction with a description of Fig. 13.

FUNCTIONAL DESCRIPTION—END OF OPERATION

Following the E-EOR Character, it is assumed by way of example (in Fig. 9), that the Tape Indicator aluminum strip is sensed during the 9 millisecond LCR delay. The sensing of the Tape Indicator aluminum strip produces a positive pulse on an EOF photocell lead 332 (see Fig. 9) The EOF photocell lead 332 is connected to the Load Point functional block 112 (Fig. 8D) and the positive pulse thereon produces a negative shift on LP lead 114 and a positive shift on $\overline{LP}$ lead 115. The $\overline{LP}$ lead 115 is connected to a Tape Mark functional block 334. The positive shift on the $\overline{LP}$ lead has no effect until the EOR Gap lead 258, which is also connected to the input of Tape Mark functional block 334, goes positive, at which time a positive output is produced on a TM lead 336, TM hubs 337, and a TM EOR lead 338, and a negative output is produced on a $\overline{TM}$ lead 340 and a $\overline{TM\ EOR}$ lead 342. The positive shift on the TM EOR lead 338 is fed to the Write Sample functional block 239 where it causes the Write Sample Lead 192 to shift positively. At the end of three hundred milliseconds when the TM EOR lead 338 goes negative, the Write Sample lead 192 goes negative to write a tape mark indication of the end of file on the magnetic tape. The actual character written as the tape mark is determined by the character plug wired from the TM hubs 337 to the Write Entry hubs of both the Coder and Compare Coder. The tape mark character of the example is obtained by plug wiring to the Write Entry 15 and the Write Compare entry 15 (see Fig. 6).

The negative shift of the TM EOR lead also starts the 9 millisecond LRC delay pulse on lead 252 at the EOR Gap and LRC functional block 250. At the time of the negative shift of the LRC delay lead 252, the EOR Gap and LRC block 250 causes a positive shift on the Write Trigger Reset lead 260 and thereby the machine places an LRC character on the magnetic tape in the same manner as after an end of record character.

If either the TM lead 336 or $\overline{TM\ EOR}$ lead 342 is negative, the EOR Gap lead 258 going negative or the LRC delay lead 252 going negative acts within the MT GO functional block 98 to cause the MT Stop lead 107 to go positive and effect a stopping of the magnetic tape.

A tape mark (TM) represents the end of information written on the tape, and it may be desired to place a tape mark on the tape before sensing the tape indicator aluminum strip. This may be accomplished by manually closing the TM switch 344 (Fig. 8D) which completes a circuit in the Tape Mark functional block 334. If the PT stopped lead 256 is positive, and a Tape Mark has not yet been written, a positive output is produced from the Tape Mark functional block 334 on TM EOR lead 338 starting the same chain of events leading to a writ-ing of a Tape Mark, as just described in conjunction with the sensing of the tape indicator aluminum strip.

There may be times when it is necessary to stop the feeding of the tapes other than at the end of the information, such as the breaking of either tape, the absence of sprocket holes in the paper tape, or the running out of the paper tape. In Fig. 8B, the End of File functional block 346 has as inputs the PT Break switch 56, previously described as being closed when the machine runs out of paper tape or the paper tape breaks, and the magnetic tape break photocell 81, previously described as activated if the magnetic tape breaks.

As a feature of the machine, if the paper tape or magnetic tape breaks, it may be possible that the break is located at a position which would allow the record to be finished if the machine would continue to feed the tape for a short time. For instance, from Fig. 1 it can be observed that if the paper tape breaks at some position on the tape to the left of the idler 18, the end of record might be between the break and the photodiodes 125. Thus if there is a tape break, instead of stopping the tape feeds immediately, the machine allows the tapes to continue to feed until an end of record indication. If there is no end of record indication within one second, the tape feeds are stopped.

The closing of the BT Break switch 56 or the activation of the magnetic tape break photocell 81 complete circuits within the End of File functional block 346 which immediately produces an end of file (EOF) pulse on an EOR lead 348. The EOF pulse is fed to the MT Go functional block 98 where it acts to stop the Magnetic Tape, and in turn, the paper tape upon the negative shift of the LRC delay lead 252. After one second, if the LRC delay lead 252 does not go negative, a 75 microsecond positive pulse is produced from within the End of File functional block 346 on a Delay EOR lead 352 which is connected to the EOR functional block 232. The positive Delayed EOR pulse acts within functional block 232 to cause an EOR pulse and produce a standard End of Record operation even if the record has not ended. Then the LRC delay lead 252 going negative will stop the Magnetic tape and the Paper tape.

If there are no sprocket hole pulses being fed on lead 158 to the Timing Pulse Generator 160, no CP2 pulse will be fed via CP2 lead 162 to First Character functional block 218. There is circuitry within the First Character functional block 218 which, after a failure of CP2 pulses for 3 milliseconds, produces a positive pulse on a No Sprocket Holes lead 354 which is connected to the EOR block 232, the MT Go block 98 and the PT Go block 122. Thus, a no sprocket hole pulse on lead 354 will stop the magnetic and paper tapes and write an EOR character.

The machine can be manually stopped by pressing the Stop Button STP Bt. (Fig. 8B) which acts to deenergize a relay within the Start functional block 102, as will be more fully described hereinafter, that closes a pair of contacts in the End of File functional block 346 to put a positive potential on a $\overline{Ready}$ lead 356 which is fed via cable 106 to the MT Go block 98. A positive potential on the $\overline{Ready}$ lead 356 will act within the MT Go block 98 to permit the next negative shift on the LRC delay lead 252 to stop the Magnetic tape and, in turn, the Paper tape.

LOGICAL BLOCK SYMBOLS

In order to explain the operation of the functional blocks, the are shown in Figs. 10 to 36 as comprised of logical blocks. The contents of the different logical blocks being utilized are illustrated in Figs. 37 to 66. Before describing the functional blocks in terms of the logical blocks, the details of the different logical blocks will be described. For convenient reference, all positive and negative supply sources are identified by a number corresponding to their potential, for example, a supply terminal labeled 140V, indicates a 140 volt supply source. Further, the terminals in the schematic diagrams which correspond to the same terminals in the corresponding block symbol diagrams are identified by their equivalent position. Also, hereinafter, where the terms positive and/ or negative potentials or shift of potential are used, the terms refer to relative values, rather than values with respect to ground.

Throughout the description of the functional blocks, very little reference has been given with respect to passive logical blocks in the various circuits which one skilled in the art will readily recognize require a passive logical block. Passive logical blocks such as cathode followers, pulse amplifiers, level setters and the like, must obviously be included between various of the component circuits. However, the characteristics of these passive elements will largely be determined not only by the load component circuits but also by the length of conductors coupling a given logical block to its load logical blocks. For example, the various relays illustrated herein require sufficient current to be supplied to the windings of these relays for a length of time sufficient for the relay contacts to close. Furthermore, the various logical circuits may respond to different D.C. voltage levels and/or pulse levels. These voltage and current requirements may be met by the use of conventional circuits such as the level setters, cathode followers, current drivers and the like. It will be obvious that in a specific design of an equipment constructed in accordance with the principles of this invention, the designer may use these variables in any way that he finds desirable.

OR CIRCUIT—OR

Referring first to Fig. 37, there is illustrated a block symbol of a standard positive OR circuit and also the details of the circuit within the block.

A positive OR circuit functions to isolate two or more positive input signals from each other and to produce a positive output signal in response to a positive input signal at any or all of the input terminals thereof.

A standard positive OR circuit is composed of at least two diodes, the anodes of which are connected to the input terminals IN, while the cathodes of which are connected to the output terminal OUT and via a common resistor R to a −130 volt source. While only two input terminals have been shown in Fig. 37, it is to be understood that a positive OR circuit may have any number of input terminals so long as a diode is provided between each input terminal and the output terminal.

The standard positive OR circuit is hereinafter represented by a block symbol containing the alphabetic characters OR. The ohmic value of the common resistor R may vary depending upon circuit requirements, and may easily be determined by anyone skilled in the art, as stated hereinbefore.

Referring to Fig. 38, there is illustrated a cascaded OR circuit $OR_C$, and also the details of the circuit within the block. The operation of this circuit is identical to the standard OR circuit. In a cascaded OR circuit, to reduce the loading on the circuits which drive the OR circuits an additional diode is provided for each pair of input terminals. The anode of each additional diode is connected between the commonly connected cathodes of each pair of diodes and the output terminal. It is to be understood that a cascaded OR circuit may have inputs which exceed or which are less than those shown. If an odd number of inputs are required, an input terminal is connected via two diodes to the output terminal.

AND CIRCUIT—A

Referring to Fig. 39, there is illustrated a block symbol of a standard positive AND circuit and also the details of the circuit within the block.

A positive AND circuit functions to produce a positive output signal only when there is a coincidence of positive signals at all of the input terminals thereof.

It should be noted at this point that the positive input signals are not necessarily applied simultaneously to the input terminals of the positive AND circuit. Hence, in instances where positive signals are applied to all but one of the input terminals thereof, the circuit is said to be conditioned so that when a positive signal is applied to the remaining input terminal there is a coincidence of positive input signals causing the production of a positive output signal in a manner as previously described.

A standard positive AND circuit is composed of at least two diodes, the cathodes of which are connected to the input terminals IN, while the anodes of which are connected to the output terminal OUT via a common resistor R to a +140 volt source.

The standard positive AND circuit is hereinafter represented by a block symbol containing the alphabetic character A. The ohmic value of the common resistor R in an AND circuit may vary depending upon circuit requirements.

Referring now to Fig. 40, there is illustrated a block symbol of a cascaded AND circuit and also the details of the circuit within the block.

The cascaded AND circuit has the same logical operation as the conventional AND circuit previously described. The particular arrangement of diodes in the cascaded AND circuit is used for the same considerations described in conjunction with the cascaded OR circuit $OR_C$ previously described.

It is to be understood that a cascaded AND circuit may have inputs which exceed or which are less than those shown.

The cascaded AND circuit is hereinafter represented by a block symbol containing the alphabetic characters $A_C$. The ohmic value of the common resistor R may vary depending upon circuit requirements.

INVERTER—I

Referring now to Fig. 42, there is illustrated a block symbol of a standard inverter and also the details of the circuit within the block.

An inverter functions to produce an output signal having substantially the same wave shape as the input signal but of opposite polarity and with no appreciable time difference between the input signal and the output signal.

A standard inverter, which may comprise a 6211 tube, as indicated in Fig. 42, has its plate connected via a series circuit, comprising a 250 microhenry inductor, a 3K ohm resistor and a 3.3K ohm resistor, to a +140 volt source. A tapped output terminal (T) is connected to the junction of the 3K ohm and the 3.3K ohm resistors. The plate is also connected via a voltage divider network, comprising a 390K ohm resistor and a 430K ohm resistor, to a −130 volt source. Additionally, a compensating 8.2 micro-microfarad capacitor is connected in parallel with the 390K ohm resistor. The triode also includes a grid coupled via a 150 ohm resistor and a current limiting 22K ohm resistor, having a compensating 47 micro-microfarad capacitor connected in parallel therewith, to the input terminal IN and a cathode connected directly to ground. An output terminal OUT is tapped from the junction of the 3K ohm resistor and the 3.3K ohm resistor in the plate circuit.

The standard inverter is hereinafter represented by a block symbol containing the alphabetic character I and alphabetic subscript A, i.e., $I_A$.

Inverters $I_E$, $I_{PC}$, $I_S$ and $I_{ER}$ shown in Figs. 44, 45, 48, and 49 respectively, operate in basically the same manner as the standard inverter $I_A$. The changes in these inverters are obvious from the respective figures and are well understood in the art. Consequently, no detailed description of the operation of these inverters is believed necessary.

Inverters $I_{PO}$ and $I_G$ of Figs. 43 and 47 operate in a similar manner to the standard inverter $I_A$, but the plate resistor and positive voltage necessary for the operation of these inverters are found in the circuit of the logical blocks to which these inverters are connected.

Inverters $I_{WR}$ of Fig. 46, which is a special inverter used for reading and writing on magnetic tape, may comprise two triodes of a 5687 tube. The grid of the left-hand is connected via a 100 ohm resistor to a left-hand input terminal G-IN, while the grid of the right-hand triode is similarly connected. The cathodes are commonly connected to an output terminal K-OUT and also via a 5.1K ohm resistor to an input terminal K-IN. Each plate is connected directly to its own output terminal P-OUT, each of which is ordinarily connected to different ends of a Read/Write Coil, the center tap of which is grounded. The terminal K-IN is connected to a logical block which provides an output voltage which varies from ground potential to some negative potential. The triodes therefore, can only conduct when terminal K-IN is conditioned negative. The terminals G-IN are connected to another logical unit which causes one of the terminals to go positive while the other is negative and vice versa. Thus, one of the terminals P-IN will be negative while the other is ground. There will be conduction through one-half the Read/Write Coil, at any one time, and the conduction through the coil halves will be in opposite directions.

PEAKER—PKR

Referring now to Fig. 41, there is illustrated the block diagram of a standard peaker and also the details of the circuit within the block.

A peaker functions to produce a positive output pulse having a very short duration but sharp leading and trailing edges.

A standard peaker may employ a 5965 type tube having a plate connected via a series circuit, comprising a 250 microhenry inductor and a 6.3K ohm resistor connected to +140 v. The plate is also connected via a 390K ohm resistor and a 430K ohm resistor to −130 volts. The 390K ohm resistor is shunted by a 8.2 micro-microfarad condenser and the junction of the 390K ohm resistor and the 430K ohm resistor is connected to an output terminal OUT. The grid of the triode is connected via a 150 ohm resistor and a 120K ohm resistor to +140 v. The junction of the 150 ohm resistor and 120K ohm resistor is connected to the anode of a diode, the cathode of which is connected via a 470 micro-microfarad condenser to an input terminal IN. The junction of the cathode of the diode and the 470 micro-microfarad condenser are connected via a two micro-henry inductance and a 470K ohm resistor to ground and also to the anode of a diode, the cathode of which is connected to ground. Additionally, the triode includes a cathode which is directly connected to ground.

The peaker is hereinafter represented by a block symbol containing the alphabetic characters PKR.

The pulse forming peaker PKR responds to a negative shift of potential to produce a positive output signal. Additionally, positive shifts of potential at the input are clamped out by the diode to ground.

TRIGGER—T

Referring now to Fig. 50, there is illustrated a block symbol of a standard electronic trigger and also the details of the circuit within the block.

A trigger, commonly known as the Eccles-Jordan trigger, functions as a storage or control device inasmuch as it is a bistable device, that is, one that remains in either one of two stable states until it is forced or triggered by an input signal to assume the other state, each subsequent input signal being effective to turn the trigger to the opposite state.

The trigger may comprise a cross coupled dual triode, that is, the plate of the right-hand tube is resistively coupled via a voltage divider network to the grid of the left-hand tube, while the plate of the left-hand tube is resistively coupled via a voltage divider network to the grid of the right-hand tube. Therefore, any changes in potential at the plates of the dual triode are coupled to the grids of the opposite tubes. One stable state of the trigger is termed the OFF state and exists when the right-hand tube is in a conductive state while the left-hand tube is in a nonconductive state. In this state, the plate of the right-hand tube is at a relatively negative potential while the plate of the left-hand tube is at a relatively positive potential. If a negative pulse or negative shift of potential is applied to the grid of the right-hand tube, the right-hand tube is forced or triggered to a non-conductive state with a resulting positive shift of potential occurring at the plate thereof which is coupled via the voltage divider cross coupling to the grid of the left-hand tube so that the left-hand tube is triggered to a conductive state with a resulting negative shift of potential occurring at the plate thereof. This is the other stable state of the trigger and is termed the ON state. Some triggers may be set to the ON state by applying a positive pulse or positive shift of potential to the grid of the non-conducting left-hand tube. This causes the left-hand tube to be triggered to a conductive state with a resulting negative shift of potential occurring at the plate thereof, which is coupled via the voltage divider cross coupling to the grid of the conducting right-hand tube so that the right-hand tube is triggered to a non-conductive state. In a similar manner, when a trigger is in the ON state it may be triggered to the OFF state by the application of a negative pulse or a negative shift of potential at the grid of the left-hand tube or a positive pulse or a positive shift of potential at the grid of the right-hand tube. Outputs are tapped from the plate circuit resistance of both tubes and from other voltage divider networks connected to the plates of the dual triode. Consequently, upon setting the trigger to the ON state, positive shifts of potential occur at the outputs associated with the right-hand tube while negative shifts of potential occur at the outputs associated with the left-hand tube and vice versa when the trigger is placed in the OFF state.

A standard trigger may comprise a dual triode of the 6211 type having each plate connected via a voltage divider network comprising an 82K ohm resistor, a 62K ohm resistor and a 47K ohm resistor, to a −130 volt source. The junction of the 82K ohm resistor and the 62K ohm resistor in each voltage divider network is connected via a 150 ohm resistor to the respective grids of the dual triode. Additionally, a 15 micro-microfarad capacitor is connected in parallel with each of the 82K ohm resistors. A terminal IN is connected to each junction. Each plate of the dual triode is connected via a series circuit, comprising a 750 microhenry inductor, a 3.9K ohm resistor and a 4.3K ohm resistor, to a +140 volt source. The right-hand output terminal (T) is tapped from the junction of the 4.3K ohm resistor and the 3.9K ohm resistor associated with the right-hand tube, while the left-hand output terminal (T) is tapped from the junction of the 4.3K ohm resistor and the 3.9K ohm resistor associated with the left-hand tube. Each plate of the dual triode is also connected via a voltage network, comprising a 390K ohm and a 470K ohm resistor, to a −130 volt source. An 8.2 microfarad capacitor is connected in parallel with the 390K ohm resistor in each voltage divider network. Additionally, output terminals OUT are connected to the junction of the 390K ohm resistor and the 470K ohm resistor in each voltage divider network. Each grid is connected via the 150 ohm resistor to the cathode of a diode, the anode of which is connected to a terminal labelled −12V or X or Y. Each trigger having a pair of terminals so labeled is initially reset to either the ON or OFF condition by raising the potential of one of the pairs of terminals so labeled to 0 volts from −12 volts. The other terminal of this trigger is connected directly to a source of −12 volts. There are two sources of D.C. reset voltage, one of which is labeled X and the other Y. When the trigger is reset OFF by the X reset lead, an X is placed to the left of the trigger and when the trigger is reset ON by the X reset lead, an X is placed to the right of the trigger. A Y is similarly placed to show the condition of the trigger after resetting by the Y reset lead.

The standard trigger is hereinafter represented by a block symbol diagram containing alphabetic characters $T_A$.

Figure 51:
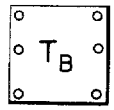
Figure 54:
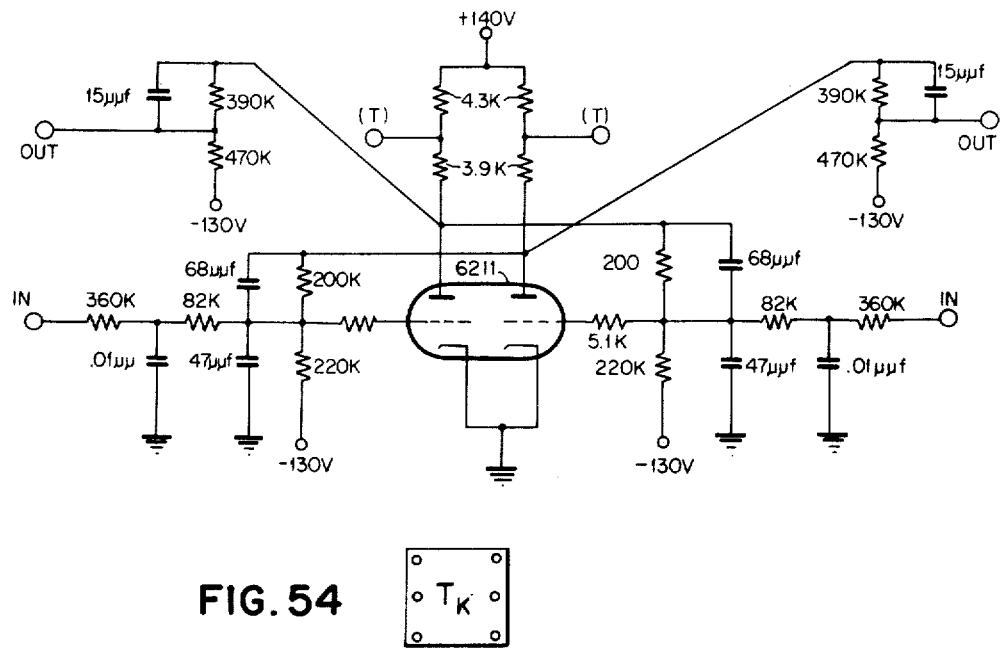
Figure 55:
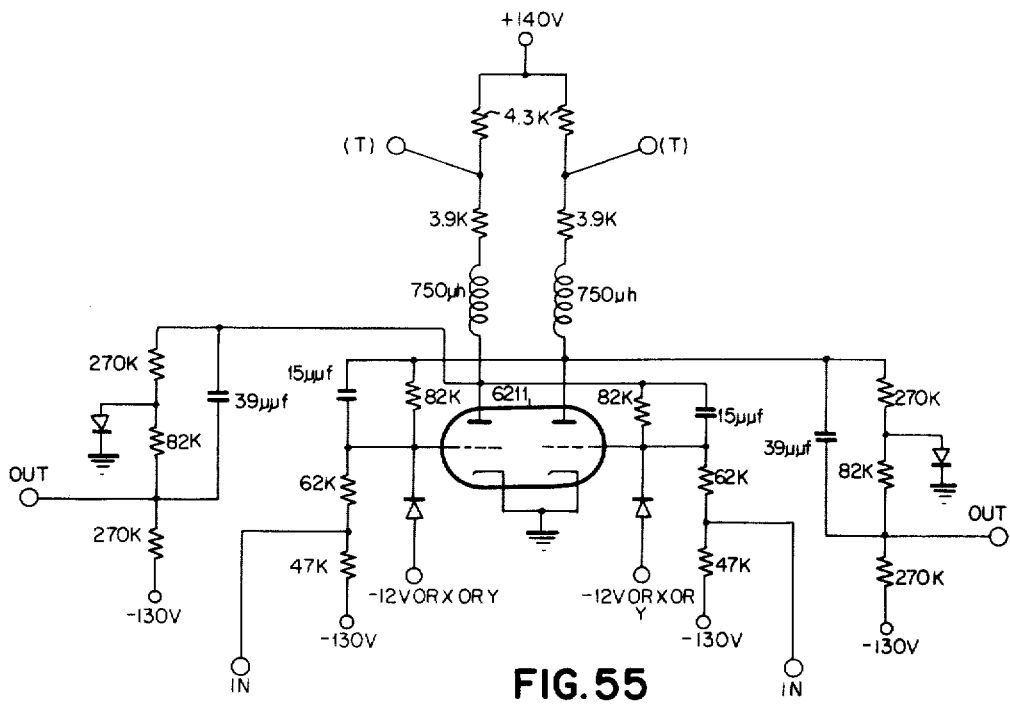

Triggers $T_B$, $T_K$ and $T_{WR}$ shown in Figs. 51, 54 and 55 respectively, operate basically in the same manner as the standard trigger $T_A$. The differences between these triggers and $T_A$ are obvious and consequently no detailed description thereof is believed necessary.

Figure 52:
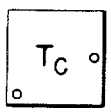

Referring now to Fig. 52, there is illustrated a block symbol of a standard contact operated trigger $T_C$ and also the details of the circuit within the block. The contact operated trigger $T_C$ resembles the standard trigger $T_A$ in that it is a bistable device, but differs therefrom in that the switching from one state to the other is always controlled by a shift in potential at the grid of the left-hand tube. When the potential at the grid of the left-hand tube reaches a particular value, switching action takes place and the trigger is set to the ON state, that is, with the left-hand tube in a conductive state and the right-hand tube in a non-conductive state so that the potential at the output of the trigger is switched to a relatively positive value. The contact operated trigger remains in this state until the mechanical device is deactuated whereupon a negative shift of potential is applied to the grid of the left-hand tube causing the trigger to be reset back to the OFF state.

Figure 53:
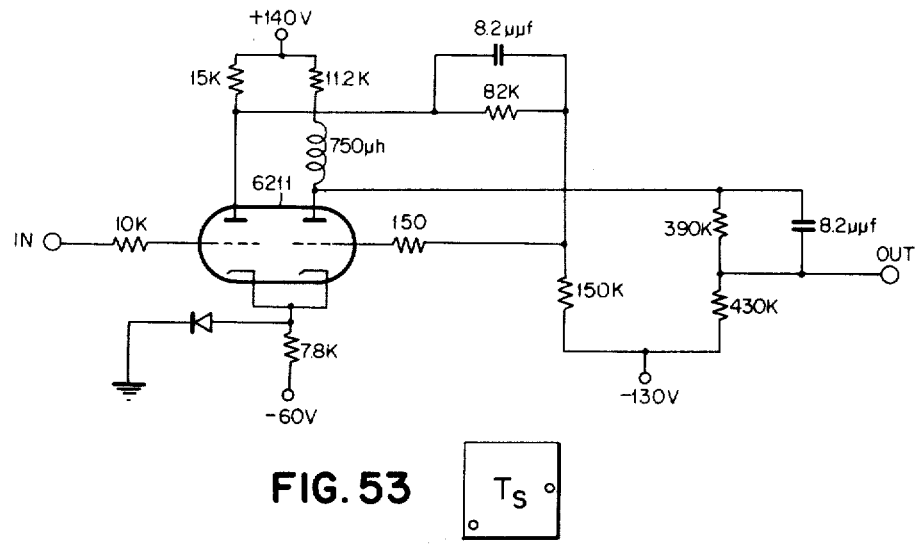

Referring now to Fig. 53, there is illustrated a block symbol of a Schmitt type trigger $T_S$ and also the details of the circuit within the block.

The Schmitt trigger functions as a control device and operates in a similar manner as the contact operated trigger $T_C$ except that it is not operated by a mechanical device. When a positive shift of potential is applied to the grid of the left-hand tube, the potential at the grid rises and when it reaches a certain level, switching action takes place and the trigger is set to the ON state bringing up the output to a relatively positive potential. When the potential at the grid of the left-hand tube drops down to a certain level, not necessarily the same level which turned it ON, switching action again takes place and the trigger is turned OFF bringing down the output to a relatively negative potential.

SINGLE SHOT MULTIVIBRATOR—SS

Referring now to Fig. 56, there is illustrated a block symbol of a standard single shot multivibrator and also details of the circuit within the block.

A single shot multivibrator functions to produce positive and/or negative rectangular wave shaped signals of predetermined time duration.

The single shot multivibrator resembles the standard trigger in that it may be triggered to the ON state by an input signal, but differs therefrom in that it automatically returns to the OFF state after a predetermined period of time without requiring a subsequent input signal.

The single shot multivibrator may comprise a cross coupled dual triode, that is, the plate of the right-hand tube is resistively coupled via a voltage divider network to the grid of the left-hand tube, while the plate of the left-hand tube is capacitivey coupled to the grid of the right-hand tube. Additionally, an RC network is connected to the grid of the right-hand tube which is used to control the time duration of the ON state of the single shot multivibrator and an input circuit is connected to the grid of the left-hand tube. The grids of the dual triode are so biased that the single shot multivibrator is normally in the OFF state, that is, with the left-hand tube in a non-conductive state and the right-hand tube in a conductive state. If a positive shift of potential is applied via the input circuit to the grid of the left-hand tube, switching action occurs, as in the standard trigger, and the single shot multivibrator is set to the ON state with a resulting negative shift of potential occurring at the plate of the left-hand tube and a positive shift of potential occurring at the plate of the right-hand tube. The single shot multivibrator remains in the ON state for a period of time dependent upon the time constant of the RC network associated with the grid of the right-hand tube. The capacitance of the RC network, connected to the grid of the right-hand tube, starts to charge through its associated resistance causing the potential at the grid of the right-hand tube to rise toward a relatively positive value. When the potential reaches a slightly positive value the right-hand tube begins to conduct once more and switching action takes place causing the single shot multivibrator to be reset to the OFF state. The time duration of the ON state of the single shot multivibrator can be varied by varying the values of the resistance and capacitance in the RC network connected to the grid of the right-hand tube. Outputs are tapped from the plate circuit resistance of both tubes and from other voltage divider networks connected to the plates of the dual triode. Consequently, as with the standard trigger, upon setting the single shot multivibrator to the ON state, positive shifts of potential occur at the outputs associated with the right-hand tube, while negative shifts of potential occur at the outputs associated with the left-hand tube and vice versa when the single shot multivibrator is reset back to the OFF state.

A standard single shot multivibrator may comprise a dual triode of the 6211 type. The plate of the left-hand tube is connected via a series circuit, comprising two 6.2K ohm resistors, to a +140 volt source and via a voltage divider network, comprising a 390K ohm resistor and a 430K ohm resistor, to a −130 volt source. An output terminal (T) is tapped from the junction of the two 6.2K ohm resistors. A 10 micro-microfarad capacitor is connected in parallel with the 390K ohm resistor and an output terminal OUT is connected to the junction of the voltage divider network. The plate of the left-hand tube is also cross coupled via a 15 micro-microfarad capacitor and a 150 ohm grid resistor to the grid of the right-hand tube. The plate of the right-hand tube is connected via a series circuit, comprising a 5.1K ohm resistor, a 6.8K ohm resistor and an 8.2K ohm resistor, to a +140 volt source. An output terminal (T) is tapped from the junction of the 8.2K ohm resistor and the 6.8K ohm resistor. The junction of the 6.8K ohm resistor and the 5.1K ohm resistor is connected via a voltage divider network, comprising a 430K ohm resistor and a 470K ohm resistor, to a −130 volt source. A 10 micro-microfarad capacitor is connected in parallel with the 430K ohm resistor and an output terminal OUT is connected to the junction of the voltage divider network. The plate of the right-hand tube is also cross coupled via a parallel network, comprising a 330K ohm resistor and a 15 micro-microfarad capacitor, and a 150 ohm grid resistor to the grid of the left-hand tube. The cathodes of the dual triode are interconnected and coupled via a series circuit, comprising a 2.4K ohm resistor and a 7.5K ohm resistor, to a −60 volt source. The grid resistor of the left-hand tube is connected via a 220K ohm resistor to the −60 volt source, while the grid resistor of the right-hand tube is connected via a parallel circuit, comprising a 1.8 megohm timing resistor and a capacitor C, to the junction of a voltage divider network, comprising a 100K ohm resistor connected to the −60 volt source and an 82K ohm resistor connected to a +140 volt source. The value of the timing capacitor C can be approximately determined by the formula $C=2.5(t-22)$ where C is in micro-microfarads and $t$ is in microseconds. The junction of the left-hand grid resistor and the 220K ohm resistor is connected via a diode to the junction of the 2.4K ohm resistor and the 7.5K ohm resistor in the cathode circuit and via a 47 micro-microfarad capacitor and a 39 micro-microfarad capacitor to the input terminal IN. The junction of the 39 micro-microfarad capacitor and the 47 micro-microfarad capacitor is connected via a parallel circuit comprising a diode and a 100K ohm resistor to ground. Although almost all of the elements in the circuit effect the timing to a greater or less extent, only the capacitor C associated with the grid of the right-hand tube is used to vary the timing.

The single shot multivibrator is hereinafter represented by a block symbol containing the alphabetic characters SS, and a sign designation to indicate the sign of the pulses which operate, i.e., SS+. Additionally, the time duration N of the output pulses, in microseconds, from the single shot multivibrator is indicated in the upper right-hand corner of the block. A K after the number indicates 1000, viz. 100K indicates 100,000 microseconds of 100 milliseconds. An M after the number indicates a million microseconds, viz. 1 Meg. indicates one second.

Single shot multivibrator SS—shown in Fig. 57, is similar in circuitry to the standard single shot multivibrator SS+ except that the capacitor C, associated with the grid of the right-hand tube, is not connected in parallel with the 1.8 megohm resistor but via an input circuit to an input terminal IN, with the result that the single shot multivibrator SS— may be triggered by negative input pulses.

Single shot multivibrator SS, shown in Fig. 58, is a hold over single shot multivibrator which is driven by a pull over inverter $I_{PO}$, heretofore described. Generally, a series of input pulses are applied to the hold over single shot multivibrator $SS_D$ having a pulse repetition rate which is greater than the time duration of the multivibrator. Thus, when the first pulse is applied thereto, the multivibrator is switched to the ON state and remains in such state as long as the series of pulses is applied thereto. When the input pulses cease, the capacitance C in the RC network, associated with the grid of the right-hand tube, starts to charge up until the right-hand tube conducts whereupon the multivibrator $SS_D$ is switched back to the OFF state. The value of C can be approximately determined by the formula $C = 0.9t - 30$ where C is in micro-microfarads and $t$ is in microseconds. The value of capacitor $C_C$, which is connected to capacitor C is approximately half the value of capacitor C but has a minimum value of 47 micro-microfarads.

STANDARD TRIGGER INPUTS

In order to increase the versatility of triggers, a variety of input circuits have been devised to be utilized with triggers. In general, an input circuit may be described as being either a positive D.C. input circuit, a negative shift input circuit or a self-gated binary input circuit.

A positive D.C. input circuit functions to pass a positive shift of potential to an input terminal of the trigger to which it is connected. Thus, if a positive D.C. input circuit is connected to the side of the trigger which is not conducting, the positive shift of potential will raise the potential at the grid of the tube on this side causing the tube to conduct and the trigger to shift from its present state to its opposite state. A positive D.C. input circuit may be connected to either or both input terminals of the trigger.

A negative shift input circuit functions to pass a negative shift of potential to an input terminal of the trigger to which it is connected. Thus, if a negative shift input circuit is connected to the side of the trigger which is conducting, the negative shift of potential will lower the potential at the grid of this tube on this side causing the tube to be cut off and the trigger to shift from its present state to its opposite state. A negative shift input circuit may be connected to either or both input terminals of the trigger.

A self-gated binary input circuit is connected to both input terminals of the trigger and functions to pass a negative shift of potential to that side of the trigger which is conducting, thereby shifting the trigger from one state to the other regardless of its previous state. For example, if the trigger is in the OFF state and is fed a pulse through a self-gated binary input circuit, the trigger will shift to the ON state. If another pulse is then applied to a self-gated binary input, the trigger will shift back to the OFF state.

Referring now to Fig. 59, there is illustrated a block symbol of a standard diode gate and also the details of the circuit within the block.

A diode gate, if properly conditioned, functions to produce a sharp negative output pulse or spike in response to a negative shift of potential.

The diode gate is composed of a diode, the cathode of which is connected to the input terminal thereof, while the anode of which is connected via a capacitor to the output terminal thereof and via a resistor R to a supply terminal thereof. The supply and input terminals are normally biased so that the diode is cut off and the output terminal is at a potential determined by the circuit to which it is connected. If a positive pulse is applied to the input terminal, the potential at the cathode is driven more positive, thereby maintaining the diode in a cut off condition. If a positive signal is applied to the supply terminal, the potential at the anode is raised to a more positive value causing the diode to conduct and the gate is said to be conditioned. Now, if a positive pulse is applied to the input terminal, the positive shift of potential at the leading edge of the pulse raises the potential at the cathode to a more positive potential than that existing at the anode and the diode is cut off. The potenial at the anode then rises exponentially to approximately that value existing at the input terminal, whereupon the diode again conducts and the potential at the anode stops rising and is maintained at the value existing at the input terminal. When the negative shift of potential at the trailing edge of the positive input pulse appears at the input terminal, it instantaneously appears at the anode of the diode as the resistance across a conducting diode is negligible. Further, since the potential across a capacitor cannot change instantaneously, the potential at the output terminal has the same instantaneous negative shift of potential and then rises rapidly to its quiescent state. Thus, it is apparent that if the diode gate is properly conditioned, it will generate a sharp negative pulse or spike in response to a negative shift in potential.

A negative diode gate is composed of a diode, the cathode of which is connected to the input terminal D–IN and the anode of which is connected via a 22-micro-microfarad capacitor to the output terminal C–OUT and via a 39K ohm resistor to the supply terminal R–IN.

The negative diode gate is hereinafter represented by a block symbol containing the alphabetic characters DG.

Referring now to Fig. 60, there is illustrated a block symbol of a negative shift input circuit and also the details of the circuit within the block.

A negative shift input circuit consists of a differentiating circuit and an isolating diode. If a positve shift of potential is applied to the differentiating circuit, a sharp positive pulse occurs at the output thereof which is applied to the cathode of the isolating diode and is of such a magnitude as to maintain the isolating diode cut off, thereby isolating the input terminal of the standard trigger T from positive shifts of potential. However, if a negative shift of potential is applied to the differentiating circuit, a sharp negative pulse, occurring at the output thereof, is applied to the cathode of the isolating diode. When the potential at the cathode drops to a value corresponding to that existing at the anode of the isolating diode, the isolating diode conducts and the potential at the input terminal of the trigger, which is connected to the anode of the isolating diode, then follows the drop in potential occurring at the cathode of the isolating diode. If the input circuit is connected to the non-conductive side of the trigger, the drop in potential has no effect thereon as the tube associated therewith is in a non-conductive state. However, if the input circuit is connected to the conductive side of the trigger, the drop in potential causes the trigger to shift to the opposite side from which it is presently set.

A negative shift input circuit is composed of a differentiating circuit, including a 15 micro-microfarad capacitor and a 27K ohm resistor, and an isolating diode.

More than one negative shift input circuit may be used at either or both input terminals of a trigger, the only restriction being that only one diode shall be connected to the input terminal of the trigger. Consequently, Fig. 61 shows a block symbol of a multiple negative shift input circuit and also the details of the circuit within the block.

Referring now to Fig. 62, there is illustrated a block symbol of a self-gated binary input circuit and also the details of the circuit within the block. A self-gated binary input circuit is recognized by the fact that the trigger has a lead entering the center of the bottom line of the block symbol.

A self-gated binary input circuit consists of a differentiating circuit $a$ and two diode gates $e$ and $f$. Normally, the voltage at the junction $d$ is about plus 135 volts, but when a 30 volt negative shift of potential is applied to the self-gated binary input circuit, the voltage at the junction $b$ drops to plus 105 volts. When the trigger is in the OFF state, the potential at the junction $c$ is about plus 132 volts while the potential at the junction $d$ is about 94 volts. Therefore, the diode associated with the diode gate $e$ cannot conduct while the diode associated with the diode gate $f$ will conduct. Thus, a negative shift of potential is applied to the grid of the right-hand conducting tube causing it to be cut off and the trigger to shift to the ON state. The conditions of the diode gates are now reversed and the next pulse applied to the self-gated binary input circuit causes the trigger to shift back to the OFF state. Thus, a self-gated binary input circuit allows a trigger to be shifted with each negative input pulse regardless of its previous state.

Referring now to Fig. 63, there is illustrated a block symbol of a single positive D.C. input circuit and also the details of the circuit within the block.

A single input circuit is composed of a one-way AND circuit, which is clamped to ground, and an isolating diode. The input terminal of the single input circuit is normally at a negative potential, and, therefore, the diode to which it is connected is in a conductive state. If a negative shift of potential is applied to the one-way AND circuit, conduction through the diode increases causing the potential at the output of the one-way AND circuit to drop, which drop in potential is applied to the anode of the isolating diode and is of such a magnitude as to maintain the isolating diode cut off, thereby isolating the input terminal of the trigger from negative shifts of potential. However, if a positive shift of potential is applied to the one-way AND circuit, its diode is cut off and the potential at the output of the one-way AND circuit and at the anode of the isolating diode starts to rise toward ground potential. When the potential reaches a value corresponding to that existing at the cathode of the isolating diode, the isolating diode conducts and the potential at the input terminal of the trigger, which is connected to the cathode of the isolating diode, then follows the rise in potential occurring at the anode of the isolating diode. If the input circuit is connected to the conductive side of the trigger, the rise in potential has no effect thereon as the tube associated therewith is in a conductive state. However, if the input circuit is connected to the non-conductive side of the trigger, the rise in potential causes the trigger to shift to the opposite state from which it is presently set.

A single input circuit is composed of two diodes D1 and D2, the cathode of the diode D1 being connected to the input terminal IN while the cathode of the diode D2 is connected directly to ground. The anodes are coupled via a common resistor R to a plus 140 volt source and via an isolating diode D3 to either terminal of the trigger.

Referring now to Fig. 64, there is illustrated a block symbol of a plus AND positive D.C. input circuit and also the details of the circuit within the block.

A plus AND positive D.C. input circuit consists of a two-way positive AND circuit, which is clamped to ground, and an isolating diode. It operates in a similar manner as the single input circuit except that it requires a coincidence of positive signals at the inputs of the two-way positive AND circuit before it passes a positive shift of potential to cause the trigger to shift from its present state to its opposite state.

Referring now to Fig. 65, there is illustrated a block symbol of a plus OR positive D.C. input circuit consisting of a two-way positive OR circuit and two clamping diodes. Such an arrangement permits the trigger to be turned ON when a positive signal is applied to either or both of the inputs thereof.

Referring now to Fig. 66, there is illustrated a block symbol arrangement of a positive D.C. input circuit, consisting of a positive OR circuit fed by a single input and positive AND circuit, and also the details of the circuit within the block. The operation of these individual units has been described hereinbefore. Consequently, no detailed description of this type of positive D.C. input circuit is believed necessary.

START

The details of the Start Functional block are illustrated in Fig. 21, which shows a Power ON input lead 390 connected to the input of a 75 microsecond single shot multivibrator 392, the output of which is connected to a Y Reset lead 394 and through an OR circuit 396 to an X Reset lead 398. The Power ON lead 390 may be shifted positive when the machine is turned ON to signify that the power supply voltages are ON, in any well known manner, to produce both an X and Y reset of the triggers in the machine. +48 volts is connected via the Start Button ST. BT. and the Start relay R106 to ground. The energization of Start relay R106 causes the completion of a circuit for energizing a Ready relay R102 from the +48 volts via the normally closed Stop button STP. BT., the now closed Start relay contacts R106-1, the normally closed Tape Break relay contacts R104-2, and the Ready relay R102 to ground. Ready relay contacts R102-3 are closed to short out Start relay contacts R106-1 and act as a holding circuit for Ready relay 102. A circuit is also completed from the +48 volts via now closed Ready relay contacts R102-1, and the now closed normally open contacts of Start relay R106-2 to the right-hand input of a contact operated trigger 404, the left-hand output of which then has a positive potential thereon. The positive potential produces no external effects. However, when the Start button ST. BT. is released, Start relay R106 is deenergized and a circuit is now completed from the +48 volts via the now closed normally closed contacts of Start relay R106-2 to the left-hand input of trigger 404, its left-hand output terminal to shift negative. This negative shift is applied to a 75 microsecond single shot multivibrator 406, which applies a 75 microsecond positive pulse to one input of an AND circuit 408, the other input of which is the PT Stopped lead 256. Since PT Stopped lead 256 is normally positive when the paper tape is not being fed, a 75 microsecond positive pulse will appear on the Start lead 104 output of AND circuit 408. The Start lead 104 is also fed to one input of OR circuit 396 to provide an X reset pulse each time there is a Start pulse.

The machine may be stopped by pressing Stop button STP. BT. to deenergize Ready relay R102, which effects the stopping of the machine in a manner to be described hereinafter in conjunction with the description of the End of File functional block 346.

MT GO AND PT GO

In the MT Go details shown in Fig. 33, the closing of the head switch 96 completes a circuit from +48 volts via the closed head switch 96 to the Write Status lead 100. Thus, as soon as the Read/Write head cover 64 is lowered, the Write Status lead 100 is conditioned positive.

The closing of the head switch 96 also completes a circuit between the +48 volt supply via the closed head switch 96, the normally closed Tape Break contacts R104–3, and a lead 409, to one of the inputs of each of the AND circuits 410 and 412. The other input of AND circuit 410 is the $\overline{TM}$ lead 340 which is normally positive at the start of operation. The output lead 414 of AND circuit 410 is therefore positive and this positive shift is applied to the resistance input of diode gate 416. The diode input of diode gate 416 is connected to the start lead 104 which, as previously described, has a positive pulse of 75 microseconds duration applied to it when the start button is actuated. The negative shift of the 75 microsecond positive start pulse causes a negative pulse output from diode gate 416 via lead 418 to the right-hand input of an MT Go-Stop trigger 420, thereby turning it ON. The left-hand output of trigger 420 thus goes negative removing the positive potential on the MT Stop lead 107 to which it is connected. The right-hand output of trigger 420 is connected via a lead 422 to one of the inputs of each of the AND circuits 424 and 426. The second input to AND circuit 424 is the lead 428 connected to the left-hand output of an MT Fast-No Fast trigger 430, and the second input to AND circuit 426 is the lead 432 connected to the right-hand output of trigger 430. Since the X on the right-hand side of trigger 430 signifies that it is reset OFF, lead 432 will be reset negative while lead 428 is positive. In this condition of trigger 430, when lead 422 goes positive, there will be a positive potential on the two inputs to AND circuit 424, and the output lead, which is MT Fast Fwd lead 108, will go positive to cause a MT Fast Fwd operation.

To get an MT Fwd operation, MT Fast-No Fast trigger 430 is turned ON, making lead 428 negative and lead 432 positive. The coincidence of a positive potential on leads 422 and 432 causes a positive output from AND circuit 426 on the MT Fwd lead 118.

The turning ON of MT Go-Stop trigger 420 by a positive pulse on start lead 104 has been described. Trigger 420 may also be turned ON by a positive shift on TM EOR lead 338 which along with lead 409 are connected to the input of AND circuit 412. A coincidence of positive pulses on leads 338 and 409 will cause a positive pulse at the output of AND circuit 412 which is fed via a lead 434 to an inverter 436, the output of which is a negative pulse which is fed via lead 418 to the right-hand input of MT Go-Stop trigger 420, thereby turning it ON and causing the magnetic tape to move. This TM EOR pulse is used in the special case where it is desired to manually write a tape mark designation on the tape, as will be more fully described hereinafter.

In order to be able to turn OFF the MT Go-Stop trigger 420, its left-hand input is connected via a lead 440 to the output of a diode gate 442, and via a lead 444 to the output of a diode gate 446. In ordinary operation, the magnetic tape is stopped after a Tape Mark indication, at the end of the EOR Gap following the 300 millisecond TM EOR pulse. This is accomplished by connecting the TM lead 336 and the $\overline{TM\ EOR}$ lead 338 to the inputs of an AND circuit 448, the output of which is connected to the resistance input of diode gate 446.

As can be seen from Fig. 9, the $\overline{TM\ EOR}$ lead 338 goes negative when the Tape Mark is sensed and does not go positive for 300 milliseconds. At this time, the output of AND circuit 448 is positive and diode gate 446 is conditioned. The next negative shift on the EOR Gap lead 258 which is connected to the diode input of diode gate 446, produces a negative output therefrom which turns OFF the MT Go-Stop trigger 420 causing the magnetic tape to stop.

When there is an abnormal condition such as a check stop, no sprocket holes, simulated end of file or a $\overline{ready}$ condition, the magnetic tape is stopped at the end of LRC delay time. This is accomplished by connecting the Check Stop lead 306, the No Sprocket Holes lead 354, the EOF lead 348 and the $\overline{ready}$ lead 356 to the inputs of an OR circuit 450, the output of which is connected to the resistance input of diode gate 442, thereby conditioning it. Then, at the end of the LRC delay, the negative pulse on LRC delay lead 252 produces a negative pulse on lead 440 to turn OFF MT Go-Stop trigger 420.

The MT Fast-No Fast trigger 430 may be turned ON for putting the magnetic tape drive in the Fwd mode by either the negative shift of the EOR Gap pulse or the negative shift of the LP delay pulse (see Fig. 9) because EOR Gap lead 258 (Fig. 34) and LP delay lead 116 are both connected to the right-hand input of trigger 430 via a negative shift input circuit 460. The MT Fast-No Fast trigger 430 may be turned OFF for putting the magnetic tape drive in the Fast Fwd mode by either the negative shift of the LRC delay pulse or the negative shift of the Start pulse because LRC delay lead 252 and Start lead 104 are both connected to the left-hand input of trigger 430 via a negative shift input circuit 462.

The EOR Gap lead 258 and the LP delay lead 116 are both connected via a negative shift input circuit 464 to the input of an (8K microsecond) eight millisecond negative single shot multivibrator 466. Thus, either the negative shift of the EOR Gap pulse or the LP delay pulse will turn ON single shot multivibrator 466 and produce a positive pulse of eight milliseconds duration on its right-hand output which is connected to the Start PT lead 120.

In the PT Go details shown in Fig. 25, a PT Go-Stop trigger 470 controls the paper tape drive, because when it is OFF, its left-hand output, which is connected to the PT Stopped lead 256, is positive and the paper tape drive is in the Stopped mode. When trigger 470 is ON, its right-hand output, which is connected to the PT Go lead 124, is positive and the paper tape drive is in the Go mode. PT Go-Stop trigger 470 may only be turned ON by a negative shift on the Start PT lead 120 connected to its right-hand input.

PT Go-Stop trigger 470 may be turned OFF to stop the paper tape during normal operation by a negative shift of the first character pulse because first character lead 228 is connected to its left-hand input.

A positive shift on the MT Stop lead 107, the no sprocket holes lead 354, or TM lead 336, respectively, will prevent PT Go-Stop trigger 470 from turning ON because all three leads are connected via on OR circuit 474 and a lead 476 to the right-hand input of PT Go-Stop trigger 470. As previously described, the TM lead 336 does not go positive as soon as the tape mark is sensed, but rather it goes positive at the end of a record when the EOR Gap lead 258 goes positive. Thus, the presence of a tape mark per se does not stop the paper tape, but prevents it from being started by a positive shift on the Start PT lead 120.

LOAD POINT

The details of the LP functional block is shown in

Fig. 33. An LP trigger 478 has its right-hand output connected to the LP lead 114 and its left-hand output connected to the $\overline{LP}$ lead 115. The Y at the right-hand side of the trigger 478 indicates that it is reset OFF by the Y reset lead when the power is turned ON. At this time, the left-hand output and $\overline{LP}$ lead 115 are positive. When LP trigger 478 is turned ON, LP lead 114 goes positive. Lead 114 is also connected to a positive single shot multivibrator 480, and the positive shift on lead 114 produces a 600 millisecond positive pulse on the single shot multivibrator output LP delay lead 116.

The LP trigger 478 is turned ON by a positive pulse on LP photocell lead 110 which is inverted to a negative pulse by inverter 482. The negative pulse is fed to a Schmidt trigger 484, the right-hand output of which is the LP Reset lead 113 which goes negative. This negative pulse is fed via the lead 113 to the right-hand input of LP trigger 478, turning it ON. This LP Reset lead 113 is used for resetting the Write Triggers as will be more fully described hereinafter.

The LP trigger 478 is turned OFF during normal operation at the end of a tape by a positive pulse on the EOF photocell 332. When a manual Tape Mark is written, LP trigger 478 is turned OFF by a negative shift of the TM EOR lead 338. The positive pulse on EOF photocell lead 332 is inverted to a negative pulse by an inverter 486 and reinverted to a positive pulse by an inverter 488. This positive pulse is fed to a Schmidt trigger 490, the left-hand output of which, at a lead 492, then goes negative. Lead 492 and TM EOR lead 338 are connected to a negative shift input circuit 494, the output of which is connected to the left-hand input of LP trigger 478, and either input going negative turns OFF LP trigger 478.

DECODER INVERTER AND DECODER CIRCUITS

The details of the Decoder Inverter 132 and the Decoder Circuits 134 are shown in Fig. 10. The $a$ lead is shown entering an inverter 500, the output of which is a lead that will have signals of opposite polarity to lead $a$ and is referred to as lead $\bar{a}$, which in turn, is fed through an inverter 502. The output of inverter 502 will therefore have the same polarity signals as that on input lead $a$ and will also be called lead $a$. The other inputs leads $b$, $c$ and $d$ are similarly fed through the same type of inverter circuits to produce representations of $\bar{b}$, $b$, $\bar{c}$, $c$ $\bar{d}$, and $d$.

Four AND circuits 504 to 507 are utilized to produce the four possible combinations of $a$ and $b$ viz. $\overline{ab}$, $\overline{a}b$, $a\overline{b}$, and $ab$, by having their inputs connected to the proper pair of the leads $\bar{a}$, $a$, $\bar{b}$, and $b$. AND circuits 508 to 511 produce the combinations $\overline{cd}$, $\overline{c}d$, $c\overline{d}$, and $cd$ in a similar manner from the leads $\bar{c}$, $c$, $\bar{d}$, and $d$. Each of the four different $a$ and $b$ combinations and the four $c$ and $d$ combinations is combined in the AND circuits 512 to 527 to give the sixteen different combinations of four, of $a$, $b$, $c$, $d$, $\bar{a}$, $\bar{b}$, $\bar{c}$, and $\bar{d}$, as is fairly obvious from Fig. 10. The CP1 lead 166 is connected to the third input of each of the AND circuits 504 to 511 to thus provide an output only during CP1 time.

The Decoder Inverter 138 and Decoder Circuits 140 operate similarly to those of Fig. 10 for the input leads $e$, $f$, $g$, and $h$ and therefore no further description is believed necessary.

The Compare Decoder circuitry of Fig. 8C is exactly the same as the Decoder circuitry just described and need not be further described.

CODER

The details of the Coder functional block 42 is shown in Figs. 11A and 11B. As previously described, the Coder operates to produce a different combination of outputs on leads B, A, 8, 4, 2 and 1 for writing on magnetic tape for each pair of Write Entry hubs energized. In Fig. 11A the pair of Write Entry leads 8 are connected to the inputs of an AND circuit 530, the output of which is one lead 532 representing the Write Entry 8. There are 63 other AND circuits; one for each of the pair of Write Entry leads 0 to 63, only a few of which are shown in Figs. 11A and 11B. The Write Entry leads 0 to 63 are connected in groups of eight to the inputs of OR circuits 534 through 547 inclusive in Figs. 11A and 11B. To understand the interconnections between the Write Entry leads and OR circuits 534 to 547 and the output connections therefrom, one particular case, namely the case for producing a B bit, will be described. From Fig. 5 it can be seen that there is no B bit for any of the Write Entries between 0 and 31. Each of the Write Entries 32 to 63 has a B bit. Thus, on Fig. 11A it can be seen that Write Entry leads 32 to 39 are connected to OR circuit 537, the output of which is connected to one input of an OR circuit 548, the output of which is the output lead B. Similarly, Write Entry leads 40 to 47 are connected through OR circuit 539 to an input of OR circuit 548; Write Entry leads 48 through 55 are connected via OR circuit 534 to an input of OR circuit 548; and Write Entry leads 56 through 63 are connected through OR circuit 540 to the fourth input of OR circuit 548. Thus, any one of the Write Entry leads 32 to 63 going positive produces an output from OR circuit 548 effecting a positive output on the B lead to cause a B to be written on the magnetic tape. Similar circuitry is shown in Figs. 11A and 11B for the A, 8, 4, 2, and 1 bits, which operate in substantially the same manner and therefore need not be further described.

The Compare Coder 156 (Fig. 8C) is similar to the Coder 142 except that the leads to the OR circuits are so connected as to produce not ( $\overline{\phantom{a}}$ ) output bits. For example, to produce a $\overline{B}$ bit output, the Compare Write Entry leads 0 through 31 will be connected through OR circuits to produce the $\overline{B}$ while write outputs 32 through 63 will not produce a $\overline{B}$ output.

PANELBOARDS

The details of the two panelboards are indicated in Figs. 12A and 12B. Each of the circles on the panelboards represents a plug hub that is adapted to be connected to other plug hubs on the panelboard by suitable plug wire connections. As an example, in Fig. 12A, the bottom of the panelboard indicates the paper tape reader exit hubs 126 and the Decoder Entry hubs 128. In normal eight channel operation, the hubs 126 attached to the leads $a$ to $h$ and SP are connected by plug wires to the corresponding leads attached to the hubs 128.

In Fig. 12A, the 16 hubs at the left in the top row are all internally electrically connected together by leads 550 and are labeled as Decoder Row 0. Every alternate panel row below Decoder Row 0 has its hubs interconnected by leads in the same manner, and are labeled Decoder Rows 1 through 15 respectively. The extreme left-hand hub of the row between Decoder Row 0 and Decoder Row 1 is connected to the left-hand hubs of the panel rows between the other Decoder Rows 1 through 15 and below Decoder Row 15. This column of hubs is labeled Decoder Col. 0. Decoder Columns 1 through 15 proceed to the right and are otherwise connected in a manner similar to Decoder Col. 0.

The upper right-hand corner of the panelboard 136 contains the sixty-four pair of Write Entry hubs 0 to 63. Thus, in making connections for a particular code, as previously described, the particular Decoder Row and Decoder Column hubs are plug wired to the proper Write Entry hubs. For instance, from Fig. 2, a figure (numeral) six in the eight channel code is obtained by connecting Col. 1 Row 6 to the Write Entry 6 hubs. Thus,

31 plug wire lead 552 is shown connecting one of the Decoder Row 6 hubs to one of the pair of Write Entry 6 hubs, and a plug wire lead 554 is shown connecting an adjacent one of the Decoder Col. 1 hubs to the other of the pair of Write Entry 6 hubs.

The Compare Panelboard 154 is shown in Fig. 12B and the Compare Decoder Exit hubs and the Compare and Write Entry hubs are substantially the same as the Decoder and Writer Entry hubs of Fig. 12, except that the Compare Write Entry hubs are at the left of the panelboard. Thus, a numeral six besides being wired on the Panelboard of Fig. 12A would be wired on Fig. 12B by connecting Compare Decoder Row 6 hubs to one of the Write Compare Entry hubs 6 by a plug wire 556 and Compare Decoder Col. 1 hubs to one of the Write Compare Entry hubs 6 by a plug wire 558.

The other hubs and connections on the panelboards will be described hereinafter in conjunction with the description of their functions.

TIMING PULSE GENERATOR

The details of the Timing Pulse Generator 160 is shown in Fig. 15. The sprocket holes lead 158 is connected to the input of a Schmidt trigger 560 which is flipped ON and OFF with the positive and negative shifts developed on the sprocket holes lead 158 by the moving sprocket holes passing the photocells. The rate of feeding of the paper tape produces a 500 microsecond positive output pulse from trigger 560 on the Ungated CP lead 164. The Ungated CP lead 164 is also fed to the input of an AND circuit 562, the other two inputs of which are the $\overline{TM}$ lead 168 and the Clock Gate lead 170 and the output of which is CP1 lead 166. Thus, the output on CP1 lead 166 will follow the Ungated CP lead 164 except when either $\overline{TM}$ lead 168 or Clock Gate lead 170 goes negative.

As previously described, the Clock Gate lead 170 goes negative only when a special character is to be written.

The $\overline{TM}$ lead 168 is connected thusly because if a manual tape mark is desired, the paper tape holes of some character after the last character which was read might be under the photocells, and to prevent this character from being written on the magnetic tape, the $\overline{TM}$ lead 168 is made negative. Ungated CP lead 164 is also fed to a 180 microsecond single shot multivibrator 564. When single shot multivibrator 564 goes negative after 180 microseconds, it turns ON a 100 microsecond single shot multivibrator 566, the left-hand output of which is the CP2 lead 162. Thus, the CP2 pulse is a 100 microsecond pulse starting 180 microseconds after the start of the Ungated CP and CP1 pulses.

"C" BIT GENERATOR

The "C" Bit Generator which generates both a C and a $\overline{C}$ bit is shown in detail in Fig. 14. Basically, the circuit for generating the C bit has two three-input full adders 570 and 572 feeding a half adder 574. The three-input full adder 570 has as inputs the leads B, A, and 8 from the Coder 142. It operates to produce a positive potential on its output lead 576 only when the sum of the B, A, and 8 bits that are present on the input leads are odd. Three-input full adder 572 has as inputs, the leads 4, 2, and 1 from the Coder 142 and operates similarly to produce a positive potential on lead 578 when the sum of the three bits 4, 2 and 1 present on the input leads are odd.

At this point, it need be understood that if the output of the full adders 570 and 572 are both indicative of even conditions, the sum of the six input bits present must evidently, of necessity, be even. Similarly, since any two odd numbers added together produce an even number, if the output of the full adders 570 and 572 are both indicative of odd conditions, the sum of the six input bits present must, of necessity, be even. However, if the voltage on leads 576 and 578 indicate an odd and even, respectively, or even and odd conditions respectively, the sum of the six input bits are odd. Leads 576 and 578 are fed to the half adder 574, the output of which goes positive, only when the potentials on lead 576 and 578 are of opposite polarity. Thus, the output of half adder 574 at "C" Write Bus lead 174 will go positive to generate a "C" Bit only when the sum of the six input bits present are odd.

The full adder 570 operates like a conventional full adder except that instead of having both a Sum and Carry output, it has no Carry output. Lead B is connected to the input of an AND circuit 580, the other input of which is lead A. The output lead 582 from AND circuit 580 represents an A and B condition. Lead 582 is fed to one input of an AND circuit 584, the other input of which is Coder lead 8. The output of AND circuit 584, on a lead 586, therefore represents a condition of A and B and 8. Lead 586 is connected via an OR circuit 588 and a lead 589 to one input of an AND circuit 590. Leads B and A are also connected via an OR circuit 592 and a lead 593 to one input of an OR circuit 594, the other input of which is lead 8 from the Coder. The output lead 596 of OR circuit 594 therefore represents the conditions of either B or A or 8. It is obvious that if lead 586 is positive then lead 596 must be positive and the output of AND circuit 590 at lead 574 is positive.

To insure that there is no output on lead 576 when two input leads (an even number) are positive, viz. the even conditions B and A, A and 8, 8 and B exist, the lead 593 which represents a B or an A is fed to one input of an AND circuit 598, the other input of which is lead 8 from Coder 142. The output of AND circuit 598 at a lead 600 therefore represents the condition A and 8, or 8 and B, and lead 600 is connected to one input of an OR circuit 602, the other input of which is lead 582 which, as previously described, represents B and A. Thus, the output of OR circuit 602 at a lead 604 goes positive when one of the three conditions B and A, or A and 8, or 8 and B are present. A positive voltage on lead 604 is inverted by an inverter 606 and this negative voltage is fed through OR circuit 588 to AND circuit 590 to prevent an output on lead 576 unless the A and B and 8 lead 586 is positive. Thus, we have all the conditions met for obtaining a positive output on lead 576 when the sum of the bits present on input leads B, A and 8 are odd.

Full adder 572 operates in a similar manner to the full adder 570 to produce a positive output on the lead 578 indicative of an odd condition of the sum of the bits on input leads 4, 2, and 1.

In order to describe the operation of half adder 574, an example will first be described, a case where the sum of the leads B, A, and 8 are odd and the sum of leads 4, 2, and 1 are odd to place a positive potential on both of the leads 576 and 578. The positive potential on leads 576 and 578, which are fed to the input of an AND circuit 608, will cause the production of a positive output on a lead 610 and this positive potential will be inverted by an inverter 612 and appear on a lead 614 as a negative potential. This negative potential is fed to one input of an AND circuit 616, which will not have an output on its output lead Gen. C Bit lead 174.

Similarly, if the leads 576 and 578 are both negative, indicative of even conditions, there will be a negative output on the output lead 518 of an OR circuit 620 to which they are fed. The negative potential on lead 618 will then prevent an output from appearing on Gen. C Bit 174.

However, if the potential appearing on leads 576 and 578 are of opposite polarity, one of the leads will be positive and a positive potential will appear on lead 618, the output of OR circuit 620. Also, since only one of the leads to AND circuit 608 is positive, lead 610 will be negative and lead 614 will be positive. With two positive potentials on its input leads, AND circuit 616 will produce a positive output on the Gen. C Bit lead 174 to cause the writing of a "C" bit.

To produce a $\overline{C}$ indication, the leads $\overline{B}$, $\overline{A}$ and $\overline{8}$ from Compare Coder 156 are connected into a full adder 622 which operates to produce a positive potential on its output lead 624 only when the sum of the $\overline{B}$, $\overline{A}$ and $\overline{8}$ bits that are present on the input leads are odd. Three-input full adder 626 has as inputs, the leads $\overline{4}$, $\overline{2}$, and $\overline{1}$ from Compare Coder 156 and operates to produce a positive potential on a lead 628 when the sum of the three bits $\overline{4}$, $\overline{2}$, and $\overline{1}$ present on the input leads are odd. The exact same circuit is used for producing a positive potential on the C Write Bus lead 174 from the leads B, A, 8, 4, 2, and 1 may not be used for producing a positive potential on the $\overline{C}$ Write Bus lead from the lead $\overline{B}$, $\overline{A}$, $\overline{8}$, $\overline{4}$, $\overline{2}$, and $\overline{1}$ because since there are six input leads, if there were an even number of positive input leads to the circuit for developing a C bit, there would then be an even number of positive input leads to the circuit for developing a $\overline{C}$ bit, and both lead 174 and 176 would be of the same polarity. In order to make the potential on the $\overline{C}$ Write Bus of opposite polarity to the potential on the C Write Bus 174, the leads 624 and 628 are fed to a circuit 630, the output of which goes positive, only when the potentials on lead 624 and 628 are of similar polarity. Thus, the output of circuit 630 at the $\overline{C}$ Write Bus lead 176 will go positive to generate a $\overline{C}$ bit only when the sum of the six input bits present are even.

In order to describe the operation of circuit 630, an example will first be described of an odd condition on both of the leads 624 and 628. In this case, leads 624 and 628, which are fed to the input of AND circuit 632, will produce a positive output on a lead 634 and this positive potential will be fed through an OR circuit 636 to its output lead $\overline{C}$ Write Bus 176. Similarly, if the leads 624 and 628 are both negative, indicative of even conditions, there will be a negative output on the output lead 638 of an OR circuit 640 to which they are fed. The negative potential on lead 638 will be inverted by an inverter 640 and produce a positive potential on its output lead 642 which will be fed via OR circuit 636 to its $\overline{C}$ Write Bus lead 176.

However, if the potential appearing on the leads 624 and 628 are of opposite polarity, there will be a negative output from AND circuit 632 because only one of these input leads is positive, and there will be a positive output on lead 638 which is inverted to a negative output on lead 642. Since both leads 634 and 642 are negative, the potential on the $\overline{C}$ Write Bus lead 176 is negative. Thus, circuits have been shown for producing a C and a $\overline{C}$ bit.

WRITE CIRCUITS

The details of the Write Circuit for the C Bit channel is shown in Fig. 16, and it is understood that the other channels of the magnetic tape have similar circuitry and thus with a description of the Write Circuit for the C Bit channel, a description of the Write Circuits for the other channels will not be necessary. In an inverter 644, which is of the type $I_{WR}$ shown in Fig. 46 and previously described, the left-hand output is connected through the C bit Write lead 194a, one-half of Write coil 65C, to ground, and the right-hand output of which is connected through the C Bit Write lead 194b, the other half of Write coil 65C, to ground.

As hereinbefore described, the outputs of an $I_{WR}$ type inverter such as inverter 644 will alternately shift from a negative potential to ground and back to negative with shifts on the leads 648 and 649 which are connected to the right-hand and left-hand G-IN terminals respectively, of inverter 644. This output voltage variation is only obtained if the lead 650 connected to the K-IN input of inverter 644 is conditioned negative, as described hereinbefore in relation to the Write Inverter $I_{WR}$. This negative condition on lead 650 is obtained from the output of an inverter 652, the input of which is connected to the Write Status lead 100. Thus, a positive condition is required on the Write Status lead 100 before it is possible to get voltage variations on the outputs of inverter 644.

The type of magnetic tape writing contemplated is known as a form of Non-Return to Zero Writing and is described in greater detail in a patent application on a Tape Feed Machine, Serial No. 468,832 to Walter S. Buslik et al. in conjunction with the Fig. 37 therein. It need only be understood at this point that a one bit is written by a reversal of current flow through the Write coil and a zero is written by the absence of a reversal of current at the bit time. Thus, the shifting of trigger 654 from one state to the other results in the shifting in voltage at its right-hand output leads 648 and 649 and in lead 194 of inverter 644 as described hereinbefore, stopping the current flow in the half of the Write coil having current and causing current flow in the other half of the Write coil. This results in the writing of a one bit. The absence of a shift at the bit time results in the writing of a 0 bit. Trigger 654 has a self-gated binary input as recognized by the fact that a lead 656 enters the center of the bottom line of its block symbol. As previously stated, a self-gated binary input circuit allows a trigger to be shifted with each negative input pulse regardless of its previous state. Lead 656 is connected from the output of a diode gate 658, the resistor supply terminal of which is the C Write Bus lead 174 and the diode input terminal of which is the Write Sample lead 192. Thus, if the C Write Bus lead 174 is positive, the negative shift of Write Sample lead 192 produces an output from diode gate 658 and causes the writing of a 1 bit on the magnetic tape. If the Write Sample lead 192 goes negative when the C Write Bus lead 174 is negative, there is no output from diode gate 658, and a 0 bit is effectively placed on the magnetic tape.

Each time the trigger 654 reverses an output voltage shift also appears on the lead 660 connected to the K-OUT terminal of inverter 644. This shift is inverted by an inverter 662, the output of which is the Write Echo Bus C lead 198, utilized in the Write Check circuits.

The Write Status lead 100 is also connected to the input of an inverter 664, within the Erase functional block 214, the output of which is the Erase lead 196. As long as the Write Status lead 100 is positive, inverter 664 is conducting through the Erase lead 196 and the Erase Head 66. This has the effect of magnetically aligning the magnetic coating of the tape, effectively placing all 0 bits upon it. This is therefore an effective erasure of the tape.

The LRC character is written, as previously described, by applying a positive pulse on the Write Trigger Reset lead 260.

This lead 260 is connected to the right-hand input of trigger 654 and the positive pulse will turn the trigger 654 OFF if it is ON (writing a one bit as the LRC character). It can be remembered that the Write Trigger Reset lead 260 also goes positive when the load point is reached to reset trigger 654 before any writing is done on the magnetic tape.

WRITE SAMPLE

Since it is the Write Sample pulse which initiates the writing on the magnetic tape, the details of the development of the Write Sample pulse will now be described in conjunction with Fig. 27. The Write Sample lead 192 is connected from the output of an OR circuit 666 which has three different input leads 668, 670, and the TM EOR lead 338. Lead 668 will normally be brought positive for producing the Write Sample with the exception of when the very first character of a record or a tape mark is written. Lead 668 is connected from the output of an AND circuit 672, the inputs of which are the Write Gate lead 226 and the CP2 lead 162. Since the Write Gate lead 222 is up all during normal writing, it is the negative shift of the CP2 lead 162 which causes a negative output from AND circuit 668 which is fed through OR circuit 666 onto the Write Sample lead 192.

As previously described, after the paper tape has stopped, if the momentum of the paper tape has carried it so that the holes representative of the next character are under the photocells, the next character being the first character of a record and not an Initial Code character, it is desirable to be able to write this character when the paper tape is started up again, even though no CP2 pulse will be developed. This is accomplished by the negative shift on the lead 670 which is connected to the output of an AND circuit 673, the inputs of which are the first character lead 228 and the Start PT lead 120. The first character lead 228 would be positive in this condition, and when the Start PT lead 120 goes negative, a negative signal passed through AND circuit 673 to become a Write Sample pulse.

The TM EOR lead 338, which is the third input to OR circuit 666, causes a Write Sample pulse when a tape mark is being written. This is necessary because, at this time, the Write Gate lead 226 is not positive (see Fig. 9).

A Write Sample Delay pulse is required for use in the Write Check circuit, and to produce it the Write Sample lead 192 is connected to the input of a four microsecond single shot multivibrator 674, the right-hand input of which is connected to a peaker 675, the output of which is the Write Sample Delay lead 231. The negative Write Sample pulse turns the single shot multivibrator ON for four microseconds and when it goes OFF, the negative shift on its right-hand output terminal is applied to a peaker 675, which puts a short duration positive pulse on its output which is the Write Sample Delay lead 231.

FIRST CHARACTER

The details of the first character functional block is shown in Fig. 23. As previously described, the Initial Code hubs 224 and 226 are plug wired so that each pair of hubs is connected to the particular Decoder Exit hubs which are being used as the Initial Code. The Initial Code leads 220 and 222 that are connected to the hubs 224 and 226 respectively, are in turn connected to the input of AND circuits 676 and 678 respectively. The outputs of AND circuit 676 and AND circuit 678 is connected via an OR circuit 680 to the input of an inverter 682, the output of which is connected to one input of an AND circuit 684. The failure to get any Initial Code character will prevent leads 220 and 222 from going positive and therefore, the output of AND circuits 676 and 678 respectively, will be negative and so will the output of OR circuit 680. This negative condition is inverted by inverter 682 and applied as a positive pulse to AND circuit 684. The other input of AND circuit 684 is connected to the CP2 lead 162 via an OR circuit 686. Thus, with no Initial Code character, at the time a CP2 pulse goes positive, a positive output will be developed from AND circuit 684, which is fed to the left-hand input of a trigger 688, turning it ON. The right-hand output of trigger 688 is the first character lead 228.

Again, in the case where the paper tape is started with the first character of a record under the photocells, and the first character is not an Initial Code character, no CP2 will develop and no signal would develop on the first character lead 228 except that it is developed by the other input of OR circuit 686, which is connected from an AND circuit 690, the inputs of which are the ungated CP lead 164 and the start PT lead 120. From Fig. 9B, it can be seen that in this case, the ungated CP remains positive during the time that the next character is under the photocells when the paper tape is stopped. Now, a positive start paper tape signal on lead 120 goes through AND circuit 690, OR circuit 686, and AND circuit 684 to turn ON the first character trigger 688 and provide the first character pulse on lead 228. The first character lead 228 is made negative by the turning OFF of trigger 688 at the end of a record by a positive pulse on the right-hand input which is connected to the LRC delay lead 252.

The Write Gate lead 226 is connected from an OR circuit 691 which has three input leads, the first character lead 228, the EOR lead 240, and the special character lead 280. Thus, each time the first character lead 228 goes positive, the Write Gate lead 226 goes positive. From Fig. 9A, it can be observed that the first character lead 228 will go negative at the end of a record when the LRC Delay lead goes positive. However, it is still necessary to write the EOR character. Therefore, the EOR lead 240 has also been brought in as an input to OR circuit 691, and the fact that it remains positive permits the Write Gate lead 226 to be positive so that an end of record character may be written. The third input to OR circuit 691, the special lead character 280, is used where the end of record character itself may be in error (for instance, if there were a compare error of the end of record character). If this were true, both the first character lead 228 and the end of record lead 240 would be negative, and there would be no Write Gate pulse. Therefore, the special character lead 280 which will be positive, in this event, is used to produce the positive condition on the Write Gate lead 226.

Illustrated in Fig. 12B is the panel wiring necessary for recognizing a character as an Initial Code character. A pair of leads 692 are connected from the Decoder Comparing Exit Row 0 Col.1 hubs (indicative of a space in the 8 channel code of Fig. 2) to the Initial Code hubs 224 to prevent trigger 680 from being turned ON until the absence of the Initial Code character. However, during the record it may be desired to utilize the Initial Code character. This is accomplished by wiring the Initial Code hubs 224, which are plug wired to the Row 0 Col. 1 hubs via leads 693, to the Write Compare Entry 44 to cause the writing of an * on the magnetic tape during a record. To prevent a Compare error, the Decoder Exit Row 0 Col. 1 hubs of Fig. 12A are connected via leads 694 to Write Entry hubs 44.

The voltage level on the No Sprocket Holes lead 354 is used as an indication of the presence of Sprocket Holes in the paper tape, when said paper tape is moving. Thus, if the No Sprocket Holes lead 354 is positive, an end of record indication will stop the magnetic tape, as previously described.

The No Sprocket Holes lead 354 is connected to the output of a trigger 695, the right-hand input of which comes from the output of a diode gate 696. The resistance input of the diode gate is connected to PT Go lead 124 and the diode gate 696 will only be conditioned when PT Go lead 124 is positive. The diode input of diode gate 696 is connected to a lead 698 from the output of a 3 millisecond hold over single shot multivibrator 700. The right-hand output hold over single shot multivibrator 700 will only provide a negative output when it has been turned ON and then goes OFF. However, each time a negative pulse is fed to the input of the hold over single shot multivibrator, the three millisecond ON time will be renewed. The input of hold over single shot multivibrator 700 is connected to the output of an inverter 702, the input of which is connected to AND circuit 704. The inputs of AND circuit 704 are the first character leads 228 and CP2 lead 162. Thus, a coincidence of the first character pulse and the CP2 pulse will cause a positive output from AND circuit 704 which will be inverted by the inverter 702 to turn ON hold over single shot multivibrator 700. As long as the CP2 pulses continue, the hold over single shot multivibrator 700 will remain ON. However, if there are no CP2 pulses for three milliseconds, the single shot multivibrator 700 will turn OFF and a negative shift will appear on lead 698 which will pass through the diode gate 696, to turn ON trigger 695 and produce a No Sprocket Hole indication which effects a stopping of the machine.

When the PT Go lead 124 fails, when the paper tape has stopped, no further pulses to diode gate 696 are permitted to pass through to turn ON the trigger 695 and so No Sprocket Holes indication is produced on lead 354. This latter occurs because it is not desirable to have a No Sprocket Hole indication to stop the machine, due only to the fact that the paper tape is not moving during the course of normal operation.

READ PARITY CHECK

The details of the Read Parity Check are shown in Fig. 18. The output leads $a$, $b$, $c$, and $d$, and $\bar{a}$, $\bar{b}$, $\bar{c}$, and $\bar{d}$, from the Compare Decoder Inverters 146 are brought in and connected to the inputs of the AND circuits 706 through 713 in a particular manner to be now described. Each of the eight AND circuits 706 through 713 have as inputs, leads representing one of the eight possible odd variations of the input viz. one of the four input leads being positive, or three of the input leads being positive. For example, the output of AND circuit 706 is $\bar{a}, \bar{b}, \bar{c}, d$ and will be positive when the $d$ lead and the $d$ lead only is positive. Similarly, the output of AND circuits 707, 708, and 709 also produce an output only when one of their four leads are positive. The AND circuits 710, 711, 712, and 713, however, will only produce an output when three of the four leads are positive. The eight leads from AND circuits 706 through 713 are fed to the input of an OR circuit 714 which will therefore only have a positive output on a lead 716 if there are an odd number of inputs (1 or 3) of $a$, $b$, $c$, and $d$, but not if there are an even number of inputs. The leads $e$, $f$, $g$, and $h$, and leads $\bar{e}$, $\bar{f}$, $\bar{g}$, and $\bar{h}$ are connected via AND circuits 718 to 725 to the input of an OR circuit 726 which produces an output on lead 728 only if there is an odd number of inputs of $e$, $f$, $g$, and $h$ because the connections are similar to those for the $a$, $b$, $c$, and $d$, inputs at the top of Fig. 18.

The leads 716 and 728 are then fed to a half adder 730 which operates in the same manner as the half adder previously described in conjunction with the half adder of the "C" Bit Generator of Fig. 14, to produce an output on the Read Even Check NG lead 264 when the sum of the bits is not even. The Read Even Check NG lead 262 is fed via an inverter 732 to the Read Odd Check NG lead 268 which then will go positive only when the sum of the input bits is not odd.

The Read Parity Check only has an output at CP2 time, because the CP2 lead 162 is fed to an AND circuit 734 in the half adder 730, and the AND circuit 734 will then only provide an output when CP2 lead 162 is positive.

In Fig. 12B is shown an example of the wiring of an even parity check. The Read Even Check NG hub 262 is shown connected via a lead 735 to the Read Check NG lead 264 which, as hereinbefore described, in connected to the Special Character functional block 276 and the Check Triggers functional block 292.

COMPARE CHECK

The details of the Compare Check circuit shown in Fig. 19 indicate that the lead B from the Coder 142 and the lead $\bar{B}$ from the Compare Coder 156 are the two inputs of an AND circuit 736, the output lead 738 of which is connected to the input of an OR circuit 740. It is evident that if both the leads B and $\bar{B}$ were positive, there would be a compare error and this would be indicated by the lead 737 being positive, and the resulting positive condition on lead 738 would be fed via OR circuit 740 and an OR circuit 742 to one of the inputs of an AND circuit 744, the other input of which is CP2 lead 162. When the CP2 lead 162 goes positive, an output will then appear on the output of AND circuit 744, the Compare Check NG lead 276 to indicate the Compare error.

The other leads from the Coder and Decoder are fed via AND circuits 745 to 749 inclusive, to the OR circuit 740, which operates to only produce an output if there is a positive condition on any bit lead from the Coder 142 coincident with a positive condition on the equivalent $\overline{bit}$ lead from the Compare Coder 156.

It is obvious that besides the presence of both a B and a $\bar{B}$ being an error, if there was neither a B or a $\bar{B}$ present, there would be an error. This condition is taken care of by having the leads B and $\bar{B}$ connected to the two inputs of an OR circuit 750, the output of which is connected via a lead 752 to an AND circuit 754. If both leads B and $\bar{B}$ are negative, the lead 752 will be negative and the output of the AND circuit 754 will be negative. This negative potential is inverted by an inverter 756 and the now positive potential is fed via OR circuit 742 to the AND circuit 744 to produce, at CP2 time, an output on Compare Check NG lead 276 indicative of a compare error. Similarly, the other leads from the Coder 142 and Compare Coder 156 are fed to the input of AND circuit 754 via OR circuits 757 through 761. If any one of the AND circuit 754 inputs is not positive due to the absence of a positive signal on a lead from the Coder 142 and its complement lead from the Compare Coder 156, the output of AND circuit 754 will be negative and a Compare error will be indicated.

VALIDITY CHECK

The details of the Validity Check circuit are shown in Fig. 17. The Validity Check circuit, as hereinbefore described, determines if a character being read has not been plug wired on the Panelboard. The output leads from the Coder 142, leads B, A, 8, 4, 2, and 1 are connected to the inputs of an OR circuit 761, the output of which is connected via an inverter 762 to one input of an AND circuit 763, the other input of which is the CP2 lead 162. If any of the leads from the Coder 142 are positive, a positive output will be obtained from OR circuit 761 to provide a negative output from inverter 762 to the AND circuit 763. If none of the output leads from the Coder are positive then the output of inverter 762 will be positive and when CP2 lead 162 goes positive, a positive output is produced on the Validity Check NG lead 272. This produces a Validity Error signal, which is recognized, as previously described.

If the Decoder Exit Row 0, Col. 0 leads are positive (and this could be a Validity Character) there would be no output from the Decoder 142. To prevent a Validity error if there is a sprocket hole but no coded perforations, the Decoder Exit Row 0, Col. 0 leads are connected to the inputs of an AND circuit 764, the output of which is connected to another input of Col. 761. The Row 0, Col. 0 leads going positive will produce a positive output from AND circuit 764 which is fed to OR circuit 761 and no validity error will be indicated. Thus, if any Decoder Exit hubs except Row 0, Col. 0 were positive, and a sprocket hole initiated the generation of a CP2 pulse, it would be an indication that some character being read by the paper tape reader is not appearing at the output of the Coder and therefore is an invalid character.

WRITE CHECK

The Write Check functional block 276 is shown in detail in Fig. 20. In the Write Check circuit, each of the output leads $\bar{B}$, $\bar{A}$, $\bar{8}$, $\bar{4}$, $\bar{2}$, and $\bar{1}$ from the compare Coder 142 and the $\bar{C}$ lead from the C bit generator 172 is compared with the equivalent complement Write Echo leads 198 and 212 through 217 from the Write Circuits. The Write Check circuits operate in a manner similar to the operation of the Compare Check circuits of Fig. 19, and so no detail explanation is believed necessary.

The only difference in the operation is that an AND circuit 768, the output of which is the Write Check NG lead 279, has as one of its inputs the Write Sample Delay lead 231, instead of CP2 lead 162. The Write Sample Delay lead 231 comes 4 microseconds after the CP2 pulse to insure that the echo pulses are on the echo leads when the Write Check is made.

The only other difference to be noted is the additional comparison in the Write Check of a seventh bit, i. e., the $\overline{C}$ bit and the C bit echo.

SPECIAL CHARACTER

The details of the Special Character functional block 267 is shown in Fig. 29. This functional block acts to cause a special character to be written if there is an error and to prevent the character in error from being written. The input to the special character functional block 267 is one of the three Check NG leads, Read Check NG lead 266, Compare Check NG lead 276 and Validity Check NG lead 272, all three of which are fed to the input of an OR circuit 770, and any one of which, or combination of which, going positive will produce a positive output on a lead 772, which is fed to the left-hand input of a 400 microsecond single shot multivibrator 773. The right-hand output of single shot multivibrator 773 is the Special Character lead 280, which is connected to the Special Character hubs 281, which goes via the plug wiring on the panelboard to the Write Entry leads of the Special Character to be written. Lead 280 goes to the First Character functional block 218 to generate a Write Gate pulse which writes a Special Character in place of the End of Record Character if there is an error in the End of Record Character itself, as has been described hereinbefore. The left-hand output of the single shot multivibrator 773 is the clock gate lead 170 which as previously described, causes the CP1 pulse to go negative when a Special Character is written to prevent the character in error from being written.

Figs. 12A and 12B illustrate the manner in which the Special Character hubs 281 are plug wired to write the Special Character on the tape. The Special Character hubs 281 (Fig. 12B) are shown plug wired via leads 774 to the Write Compare Entry hubs 48, and via leads 775 to the Write Entry hubs 48 to cause the writing of an & as the Special Character.

EOR

The details of the EOR functional block 232 are shown in Fig. 26. The EOR character hubs 237 and 238 are plug wired to Decoder Comparing Exit Row and Column hubs for the character selected as the End of Record character. In EOR functional block 232, the hubs 237 and 238 are connected via the leads 234 and 236 respectively, to inputs of AND circuits 776 and 778, the outputs of which are connected to an OR circuit 780. The Row and Column hubs of the decoder exit connected to hubs 237 going positive, will produce a positive output from AND circuit 776, which will be fed through OR circuit 780 to the EOR lead 240. This positive shift on EOR lead 240 initiates the performance of all the End of Record functions. AND circuit 776, which is connected to the Decoder Exit hubs 238 will produce a positive output which may also produce an End of Record pulse if a second character is selected as an End of Record character.

In Fig. 12B, the Decoder Comparing Exit hubs Row 12 Col. 2 are shown plug wired via leads 781 to the EOR hubs 237. The Row 12 Col. 2 hubs go positive when a % is sensed on the paper tape (see Fig. 2) to indicate the end of record.

An End of Record signal may be simulated by a No Sprocket Holes condition and delayed EOR signal. When a No Sprocket Holes condition is present, there will be a positive pulse on lead 354 to produce a positive pulse on EOR lead 240.

The delayed EOR lead 352 goes positive when the tape is broken for reasons which will be described more fully in conjunction with the description of the End of File functional block 346.

EOR CHARACTER

The details of the EOR character functional block 242 is shown in detail in Fig. 30. A trigger 782 has its right-hand input connected to the output of a negative shift input circuit 784, one input of which is the clock gate lead 170 and the other input of which is the Write Check NG lead 279. When a special character is written, the clock gate lead 170 goes negative and trigger 782 is turned ON. As can be recalled, the special character can only be written when one of the three checks, validity, compare, and read, show an error. To insure that an error End of Record (E–EOR) character is written when there is a write check error, the Write Check NG lead 279 goes negative to turn ON trigger 782.

When trigger 784 is in the OFF condition, its right-hand output at a lead 786 is negative and its left-hand output at a lead 788 is positive. Lead 786 is connected to one input of an AND circuit 790, while lead 788 is connected to one input of an AND circuit 791. Both AND circuits 790 and 791 have their other inputs connected to the EOR lead 240. Thus, when a positive EOR pulse is produced, only one of the AND circuits 790 or 791 will have a positive output. If there has been no error during the record, the trigger 782 will be in its OFF condition and lead 786 will be ON, causing the EOR pulse on lead 240 to produce a positive pulse on the N–EOR character lead 246 and hubs 247. The hubs 247 are plug wired to Write Entry hubs to produce the normal End of Record Character N–EOR previously described. However, if an error has been sensed, trigger 782 will be ON and lead 788 will be positive, and so the EOR pulse on lead 240 will cause AND circuit 791 to produce a positive output on the E–EOR character lead 244 and hubs 245 and thereby write an error End of Record E–EOR character on the magnetic tape.

In Figs. 12A and 12B, the N–EOR hubs 247 are shown connected via plug wires 792 to the Write Entry hubs 28 (Fig. 12A) and via plug wires 793 to the Write Compare Entry hubs 28 (Fig. 12B) to cause the writing on the magnetic tape of a % as the N–EOR character. The E–EOR hubs 245 are shown connected via plug wires 794 to the Write Entry hubs 43 (Fig. 12A) and via plug wires 795 to the Write Compare Entry hubs 43 (Fig. 12B) to cause the writing of a $ as the E–EOR character.

EOR GAP AND LRC

The details of the EOR Gap and LRC functional block 250 are shown in Fig. 32. As previously described, a longitudinal redundancy character (LRC) is produced after an End of Record character is written, at the beginning of the End of Record gap, which is provided between records.

The EOR lead 240 is connected to an inverter 796, the output of which is connected to the input of a negative shift input circuit 797. When the EOR lead 240 goes positive to signify an End of Record, a negative output is obtained from the inverter 796 which passes through the negative shift input circuit 797 to turn ON a nine millisecond single shot multivibrator 798. The right-hand output of this nine millisecond single shot multivibrator 798 is connected to the LRC delay lead 252. The right-hand output of single shot multivibrator 798 and therefore the LRC delay lead 252, will go negative after nine milliseconds, and this negative pulse is fed to the input of an OR circuit 800, the other input of which is the LP reset lead 113. Since the LP reset lead 113 is always negative, except at load point, the positive potential of the LRC delay lead 252 shifting negative will produce a negative shift at the output of OR circuit 800 which is fed to a peaker 802 to produce a positive pulse.

The positive pulse which appears on the write trigger reset lead 260 at the output of peaker 802 resets the write triggers. The resetting of the Write Triggers writes the Longitudinal Redundancy character LRC as described hereinbefore. It can also be seen at this point that at a load point, when the LP reset lead 113 shifts negative, it causes peaker 802 to reset the write triggers.

As can be remembered from the previous description, after a tape mark is written, an LRC character must also be written. Since the EOR lead 240 will not be positive at that time, the TM EOR lead 338 is used to provide this LRC. A negative shift on the TM EOR lead 338 is applied to the other input of the negative shift input circuit 797, the output of which is the single shot multivibrator 798 which provides the LRC delay pulse that causes the LRC to be written.

The LRC delay lead 252 is also connected to one input of a negative shift input circuit 804, the other input of which is connected to the output of a diode gate 806. The output of the negative shift input circuit 804 is connected to the right-hand input of a 30 millisecond single shot multivibrator 808, the right-hand output of which is the EOR gap lead 258. Thus, a negative shift on the LRC delay lead 252 at the end of the LRC delay, starts the 30 millisecond EOR Gap. The EOR Gap may also be started by the diode gate 806 producing an output when the load point lead 114 is positive, and a negative shift appears on the start lead 104. This circuit is used in the event the tape is stopped before the End of File. In this case, the load point lead 114 would be positive and when the start button is actuated, the negative shift on start lead 104 will produce the End of Record Gap which will start the paper tape for the next record, after the EOR Gap has ended.

CHECK TRIGGERS

The output leads from all four of the Check circuits described are fed to the Check Triggers functional block 292, the details of which are shown in Fig. 24. The Check Trigger functional block 292 acts to store the presence of an error and indicates the type of error sensed. Write Check NG lead 279 is fed to the left-hand input of a trigger 810, the right-hand output of which is a Write Check NG Exit lead 294 connected to the hub 299. If there is a write check error, trigger 810 will be turned ON and make the write check NG exit lead 294 positive, and this positive condition will remain until reset at X reset time when the start button is pressed. If this hub is wired to a check stop hub, as described hereinbefore, the machine will stop, and then trigger 810 will be reset when the start button is pressed. If hub 298 is not wired to the check stop, the trigger will remain on until the End of File. The triggers 812, 814 and 816 operate respectively to give an indication of a Validity Check error, Compare Check error and Read Check error in a manner similar to that described for the Write Check trigger 810. Each of the Check triggers may be connected to its own neon indicator, which is lit when its respective trigger is ON, in a well-known manner to give an indication of the type of error found.

CHECK STOP

The details of the check stop circuit are shown in Fig. 28 and consist of an OR circuit 818, the inputs of which are the four Check Stop leads 302 connected to the stop leads 400, and the output of which is the Check Stop lead 306. It is to be remembered that if a stopping action is desired when an error is sensed, at least one of the four check NG exit hubs 298 through 301 must be wired to one of the Check stop hubs 302. Any one of the Check Stop hubs 302 going positive will cause the Check Stop lead 306 to go positive at the end of the record.

SHIFT—AND/OR CONTROL

The details of the Shift functional block are shown in Fig. 31. The Shift circuit comprises a trigger 820, the left-hand output of which is the Shift Output Figures (F) lead 290, and a right-hand output of which is the shift output Letters (L) lead 288. When trigger 820 is in the ON condition, the Shift Output Letters hubs 289 is positive. This positive potential is applied to the proper Write Entry hubs to write a Letter Shift Character (see Fig. 3) on the magnetic tape. The Shift Output Figure (F) hubs 291 cause a Figures Character to be written on the magnetic tape. The trigger 820 may be turned ON by a positive pulse from an AND circuit 822, the inputs of which are the leads 284 from the Letters Shift input hubs 285. Trigger 820 may be turned OFF by a positive pulse on the right-hand input from an AND circuit 824, the input leads of which are Figures Shift leads 286, connected to the hubs 287.

In the usual five channel tape operation, one of the Shift Output (F) hubs 291 is connected to the $f$ channel of the decoder input and a positive condition thereon, simulates a bit of the $f$ channel to allow for thirty-two more characters in the code, as described hereinbefore. This connection will be illustrated presently.

Trigger 820 is reset at the end of each record by the EOR lead 240 which is applied to the right-hand terminal.

The AND control functional block 308 is shown in Fig. 36A. The pair of input hubs 312 are connected via leads 210 to one input of an AND circuit 826, the other input of which is connected from the pair of hubs 313 via leads 311. It operates so that if the pair of hubs 312 and the pair of hubs 313 go positive simultaneously, a positive output is transmitted via lead 316 to the hubs 318.

The OR Control functional block 309 is shown in Fig. 36B. A pair of input hubs 321 are connected via the leads 319 to an AND circuit 828, the output of which is connected to one of the inputs of an OR circuit 830. A pair of input hubs 322 are connected via leads 320 to the inputs of an AND circuit 832, the output of which is another input of OR circuit 830. The OR control circuit operates so that if the pair of hubs 321 or the pair of hubs 313 go positive, a positive output is transmitted via lead 324 to the hubs 326. Fig. 13 illustrates some of the panelboard connections necessary to read five channel paper tape code and to provide a stopping of the machine only if there is an error in a figure character. This circuit which makes use of the Shift functional block 282 and the AND and OR Control functional blocks 308 and 309, is very often used in situations where a mistake in translation of a letter will not effect the further operation of the Electronic Data Processing Machine used in conjunction therewith, but a mistake in the translation of a figure (numeral) may effect the further operation thereof.

From Fig. 2, it can be seen that a Letters character is sensed when the Decoder Exit Row 15 Col 1 hubs go positive. The sensing of the Letters Shift Character means, as described hereinbefore, that all characters that follow it are letters. This Letters Shift Character must write a character on magnetic tape signifying a Letters Shift character, and also operate the Shift functional block 282 to indicate a Letters Shift condition. However, since the Shift functional block is reset at the end of record to the Letters Shift condition it is not necessary that the presence of a Letter Shift character at the beginning of a record place the Shift functional block 282 in Letters Shift condition. Thus, Decoder Exit hubs Row 15 Col 1 are wired via plug wires 834 to the Coder Write Entry 12; and Decoder Compare Exit hubs Row 15 Col 1 are plug wired via plug wires 836 to the Write Compare Entry 12, in order to produce an @ on the magnetic tape as the symbol of a Letters Shift character.

The Figures Shift character is sensed as a positive output on the Decoder Exit hubs Row 11 Col 1 which are connected via plug wires 838 to the Figures Shift hubs 285 which operates the Shift functional block 282 to produce a positive potential on the Shift Output (F) hubs 291. One of the hubs 291 is plug wired via a plug wire 840 to the $f$ channel Decoder Entry hub 128. With the $f$ channel Decoder Entry hub 128 positive, the Decoder Exit hubs Col 3 will go positive instead of Decoder Exit hubs Col 1, as described hereinbefore. Therefore, the Decoder Exit hubs Row 11 Col 3 are plug wired via wires 842 to the Write Entry hubs 11; and the Decoder Compare Exit hubs Row 11 Col 3 are plug wired via wires 844 to the Write Compare Entry hubs 11, in order to produce a # on the magnetic tape as the symbol of a Figures Shift character.

The shift output (F) hubs 291 are also wired via plug wires 846 to the input hubs 313 of the AND control functional block 308; while the other input hubs 312 of the AND control functional block 308 is plug wired via plug wires 848 to the Compare Check NG exit hub 300. The output of AND control 308 at hubs 318 are plug wired via wires 850 to the input hubs 237 of the EOR functional block 232. It is only a simultaneous positive condition on the shift output (F) hubs 291 and the Compare Check NG exit hubs 300 which produce an output on hubs 318 to actuate the EOR functional block 232 and produces an end of record signal on the EOR lead 240. Thus, a Compare error while reading letters will not stop the machine, but the machine will be stopped by a Compare error while reading figures.

To take care of the regular end of record operation, the OR control functional block 309 is utilized. As an example, the carriage return symbol of the five channel code, which is obtained by a positive condition on the Decoder exit hubs Row 2 Col. 0 indicates the normal end of record. Since it is necessary to recognize the selected end of record character after both a Letters Shift character and a Figures Shift character, the Decoder exit hubs Row 2 Col 2 must also be utilized. Decoder exit hubs Row 2 Col 0 are connected via plug wires 852 to the OR control inputs 321 and Decoder exit hubs Row 2 Col 1 are connected via plug wires 854 to the OR control inputs 322. Either pair of inputs going positive produces an output on the hubs 326, which are plug wired via wires 856 to EOR character hubs 238 to actuate the EOR functional block and produce the normal end of record operation.

If a Letters Shift character appears at a position other than as the first character in a record, the Decoder exit hubs Row 10 Col 3 will go positive. Decoder exit hubs Row 15 Col. 3 are plug wired via wires 858 to the Letters Shift hubs 283 to place the shift functional block in the Letters shift status. In this Letters Shift status, there will no longer be a signal produced on the $f$ channel of the Decoder Entry hubs 128, and the Col 1 hubs will be positive while the Col 3 hubs will again go negative. In this condition, the Decoder exit hubs Row 15 Col 1 and the Decoder Compare exit hubs Row 15 Col 1 going positive will produce the @ symbol representing the Letters Shift character.

TAPE MARK

The details of the Tape Mark functional block are shown in Fig. 34. As previously described, an indication of a Tape Mark is obtained when the $\overline{LP}$ lead 115 goes positive. To insure that this indication is not just the LP triggers going ON when the Load Point is sensed, the $\overline{LP}$ lead 115 and the EOR Gap lead 258 are connected as inputs of an AND circuit 860. Thus, at the end of the first record after the Load Point trigger goes OFF, an output is obtained from AND circuit 860 which is fed via OR circuit 862 to turn ON a 300 millisecond single shot multivibrator 864, the right-hand output of which, (the TM EOR lead 338) goes positive. The left-hand output of single shot multivibrator 864 is the $\overline{TM\ EOR}$ lead 342. At the end of this 300 millisecond delay, which is used to allow the magnetic tape to move approximately three quarters of an inch, the TM EOR lead 338 shifts negative to cause a tape mark character to be written as previously described, and the $\overline{TM\ EOR}$ lead 342 goes positive to condition the diode gate 446 in the MT Go circuit, as previously described, to permit the negative shift on EOR Gap lead 258 to cause the magnetic tape to stop at the end of the EOR gap. The TM EOR lead 338 is also connected to the left-hand input of a trigger 866. The right-hand output of trigger 866 is the $\overline{TM}$ lead 336 and the left-hand output is the $\overline{TM}$ lead 340. It is the TM lead 336 which is connected to the TM hubs 337 that are plug wired to the write entry hubs that produce the desired tape mark indication, as previously described.

In Figs. 12A and 12B, the TM hubs 337 are shown connected via plug wires 868 to the Write Entry hubs 15 and via plug wires 870 the Write Compare Entry hubs 15, to cause the writing of a TM symbol on the magnetic tape. To take care of the possibility that there might be some initial code characters on the paper tape, after the tape mark, and that the initial code character may move under the read photocells before the paper tape has fully stopped, the $\overline{TM}$ lead 168 is fed back to the timing pulse generator 160 to prevent the CP1 from being a complete pulse and prevent the initial code character from being written.

It is possible to produce a tape mark manually by closing switch 344 which is connected to the left-hand input of a trigger 872, the right-hand output of which is connected to an AND circuit 874. Since, as previously described, the paper tape must be stopped, and a tape mark indication may not already exist in manually writing a tape mark, the PT Stop lead 256 and the $\overline{TM}$ lead 340 are also connected to the inputs of AND circuit 874. The output of AND circuit 874 is connected via the OR circuit 862 to the input of the single shot multivibrator 864. Therefore, a coincidence on the inputs of AND circuit 874 of a PT stopped signal, a $\overline{TM}$ signal, and the signal of the closed TM SW 344 will cause a tape mark to be written.

END OF FILE

The details of the End of File are shown in Fig. 22. As described hereinbefore in conjunction with the Start functional block, when the ready relay R102 is deenergized, a relay contact R102–2 in the End of File circuit 346 opens and causes the $\overline{Ready}$ lead 356 to go negative. As previously described, this $\overline{Ready}$ lead 356 going negative, causes the magnetic tape to stop.

The main purpose for the End of File circuit 346 is to provide a simulated End of File signal (EOF) when either a magnetic or paper tape break occurs. If the paper tape breaks, the paper tape break switch 56 closes to complete a circuit from +48 volts via the now closed paper tape break switch 56 and the tape break relay R104 to ground, thereby energizing relay R104. The tape break relay R104 may also be energized by a magnetic tape break which as previously described, causes a light to shine on photocell 81 which effectively causes the output of an inverter 876 to become positive and cause conduction through relay R201. This will cause the relay contacts R201–1 to close and complete a circuit from +48 volts through contacts R201–1 and the tape break relay R104 to ground. Thus in either a magnetic or paper tape break, the R104–4 contacts will close to provide a holding circuit for the tape break relay R104 through the start relay contacts R106–3 and the R104–4 contacts. At the same time, tape break contacts R104–1 close to apply the +48 volts to the left-hand input of a trigger 878. One of the right-hand outputs of trigger 878 is the simulated EOF lead 348 which as previously described, conditions the diode gate 442 and the MT Go circuit to allow the LRC delay pulse which comes at the End of Record to stop the magnetic tape. However, if the break in the tape reaches the head before the End of Record character is sensed, other provisions are made for stopping the machine. This is done by providing a fixed time of approximately one second for the tape to search for an End of Record character, after which time the magnetic tape will be stopped because there will be a simulated End of Record, which will cause an LRC delay signal. This is obtained by connecting the other output of trigger 878 to the input of the one second single shot multivibrator 880, the right-hand output of which is connected via a lead 882 to the right-hand input of a 75 microsecond single shot multivibrator 884 the right-hand output of which is connected to the delayed EOR lead 352, which is the simulated End of Record signal that causes the longitudinal redundancy character to stop the magnetic tape.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a machine for transferring a series of characters from a first to a second medium, each said first medium series ending with a normal end of series character, transfer means for serially transferring the characters, means for checking for the presence of an error during the transfer of each character, said checking means operative for producing an indication of the error, means under control of said checking means for storing the error indication until the end of each series of characters and means under control of said storing means for blocking the transfer to the second medium of the normal end of series character when said storing means contains an error indication, said blocking means operative to cause said transfer means to place an error end of series character on the second medium in substitution for normal end of series character when said storing means contains an error indication.

2. In a machine for transferring a series of characters from a first to a second medium, each said first medium series ending with a normal end of series character, transfer means for serially transferring the characters, means for checking for the presence of an error during the transfer of each character, said checking means operative for producing an indication of the error, means under control of said checking means for blocking the transfer to the second medium of the indicated character in error, means under control of said checking means for placing a special character representative of the presence of an error on the second medium in substitution for the indicated character in error, means under control of said checking means for storing the error indication until each end of the series of characters, means under control of said storing means for blocking the transfer to the second medium of the normal end of series character when said storing means contains an error indication, and means operative to place an error end of series character on the second medium in substitution for the normal end of series character when said storing means contains an error indication.

3. In a machine for transferring, character by character, a series of characters in a first code on a first medium to an equivalent series of characters in a second code on a second medium, means for reading the characters from said first medium, said reading means producing first coded signals representative of the character being read, a pair of translating means connected to said reading means operative simultaneously for converting from said first coded signals to said second coded signals, means connected to said translating means for comparing the converted second coded signals of said pair of translate means, said compare means producing an error signal indication of a difference for a character between the converted second coded signals from the pair of translate means, means under control of said compare means for placing the translated second coded character signals onto the second medium when no error signal is indicated, and means under control of the compare means and operative for placing special second coded character signals representative of the presence of an error signal on to the second medium in place of the indicated character in error.

4. In a machine for transferring, character by character, a series of characters in a first code on a first medium to an equivalent series of characters in a second code on a second medium, each said first medium series ending with a normal end of series character, means for reading the characters from the first medium, said reading means producing first coded signals representative of the character being read, a pair of translating means connected to said reading means for converting from said first coded signals to said coded signals, means connected to said translating means for comparing the converted second coded signals of said pair of translate means, said compare means producing an error signal indication of a difference between the converted second coded signals from the pair of translate means, means under control of said compare means for placing the translated second coded character signals on to the second medium when no error signal is indicated, means under control of the compare means for storing the error signal indication until the end of the series, and means under control of said storing means to prevent the placing on the second medium of the normal end of series character signals when said storing means contains an error indication, and means operative under control of said storing means for causing said placing means to place error end of series character signals on the second medium in place of the normal end of series character when said storing means contains an error indication.

5. In a machine for transferring, character by character, a series of characters in a first code on a first medium to an equivalent series of characters in a second code on a second medium, each said first medium series ending with a normal end of series character, means for reading the characters from the first medium, said reading means producing first coded signals representative of the character being read, a pair of translating means connected to said reading means for converting from said first coded signals to said second coded signals, means connected to said translating means for comparing the converted second coded signals of said pair of translate means, said compare means producing an error signal indication of a difference for a character between the converted second coded signals from the pair of translate means, means under control of said compare means for placing the translated second coded character signals on to the second medium when no error signal is indicated, said last mentioned means operative for placing special second coded character signals representative of the presence of an error signal on the second medium in place of the indicated character in error, means for storing the error signal indication until the end of the series, means under control of said storing means to prevent the placing on the second medium of the normal end of series character signals when said storing means contains an error indication, and means operative under control of said storing means for causing said placing means to place error end of series second coded character signals on the second medium in place of the normal end of series character when said storing means contains an error indication.

6. In a machine for transferring, character by character, a series of characters in a first code on a first medium to an equivalent series of characters in a second code on a second medium, said first medium series ending with a normal end of series character, means for reading the characters from the first medium, said reading means producing first coded signals representative of the character being read, a pair of translating means connected to said reading means for converting from said first coded signals to said second coded signals, means connected to said translating means for comparing the converted second coded signals of said pair of translate means, said compare means producing an error signal indication of a difference for a character between the converted second coded signals from said pair of translate means, means for placing the characters translated on to the second medium when no error signal is indicated, said last mentioned means operative for placing a special second coded character representative of the presence of an error signal on the second medium in place of the indicated character in error, means for storing the error signal indication until the end of the series, and means under control of said storing means for blocking the transfer of the normal end of series character when said storing means contains an error indication, said placing means selectively operable under control of said storing means for placing an error end of series second coded character on the second medium in place of the blocked normal end of series character, said placing means selectively operable under control of said compare means for placing said special second coded character on the second medium in place of the blocked normal end of series character when said compare means produces an error signal during the translation of the normal end of series character.

7. In a machine for transferring character by character, a series of characters, in the form of rows of coded bits across an $m$ channel first tape, to an $n$ unit code second tape, a plurality of sensing devices positioned to sense a row of coded bits, means for moving said first tape past said sensing devices, means under control of said coded bit sensing devices for generating signals indicative of the bits present in the rows sensed, means for checking said signals for parity, said checking means generating an error signal representative of incorrect parity in a character being sensed, translate means connected to said coded bit signal generating means for converting from said $m$ channel coded signals to $n$ unit coded signals, and means under control of said checking means for placing the character signals translated on to the second tape when no error signal is generated, and means under control of the checking means operative for placing special $n$ unit coded character signals representative of the presence of the error signal on to the second tape in place of the indicated character in error.

8. In a machine for transferring character by character, a series of characters in the form of rows of coded bits across an $m$ channel first tape to an $n$ unit code second tape, each said first tape series ending with a normal end of series character, a plurality of sensing devices positioned to sense a row of coded bits, means for moving said first tape past said sensing devices, means under control of said coded bit sensing devices for generating signals indicative of the bits present in the rows sensed, means for checking said signals for parity, said checking means generating an error signal representative of incorrect parity in a character being sensed, translate means connected to said coded bit signal generating means for converting from said $m$ channel coded signals to the $n$ unit coded signals, means under control of said checking means for placing the character signals translated on to the second tape, means for storing the indication of the generation of an error signal until the end of the series, and means under control of said storing means for blocking the transfer of the normal end of series character signals when said storing means contains an error indication, said placing means operative under control of said storing means for placing error end of series $n$ unit coded character signals on the second tape in place of the blocked normal end of series character.

9. In a machine for transferring, character by character, a series of characters in the form of rows of coded bits across an $m$ channel first tape to an $n$ unit code second tape, each said first tape series ending with a normal end of series character, a plurality of sensing devices positioned to sense a row of coded bits, means for moving said first tape past said sensing devices, means under control of said coded bit sensing devices for generating signals indicative of the bits present in the rows sensed, means for checking said signals for parity, said checking means generating an error signal representative of incorrect parity in a character being sensed, translate means connected to said coded bit signal generating means for converting from said $m$ channel coded signals to the $n$ unit coded signals, means under control of said checking means for placing signals representative of the characters translated on to the second tape when no error signal is generated, said last mentioned means operative for placing special $n$ unit coded character signals representative of the presence of the error signal on to the second tape in place of the indicated character in error, means for storing the indication of the generation of an error signal until the end of the series, and means under control of said storing means for blocking the transfer of the normal end of series character signals when said storing means contains an error indication, said placing means operative under control of said storing means for placing error end of series $n$ unit coded character signals on the second tape in place of the blocked normal end of series character.

10. In a machine for transferring, character by character, a series of coded bit characters in an $m$ unit code on a first medium to an equivalent series of coded bit characters in an $n$ unit code on a second medium, each said first medium series ending with a normal end of series character, means for sequentially sensing the $m$ unit coded characters from the first medium, means under control of said sensing means for generating signals indicative of the $m$ unit coded bits present in the character sensed, translating means connected to said reading means for converting from said $m$ unit coded signals to $n$ unit coded signals, means for selectively placing the translated $m$ unit coded character signals on to the second medium, echo means connected to said placing circuit for generating signals representative of the coded signals placed on said second medium, echo compare means connected to said translate means and said echo means for comparing the respective coded signal outputs, said echo compare means producing an error signal indication of a difference between said translate means $n$ unit coded signals and said echo means $n$ unit coded signals, means for storing the error signal indication until the end of the series, and means under control of said storing means for blocking the transfer of the normal end of series character when said storing means contains an error indication, said placing means operative under control of said storing means for placing an error end of series character on the second medium in place of the blocked normal end of series character.

11. In a machine for transferring characters, in the form of rows of coded perforations across an $m$ channel tape, to an $n$ unit coded record, said perforated tape having an extra timing channel comprising perforations of a relatively smaller size than said coded perforations and located at intervals along the length of the perforated tape, a line through each row along the centers of the coded perforation substantially aligned with the center of a timing perforation, a plurality of sensing devices positioned to sense a row of perforations, means for moving said $m$ channel tape past said sensing devices, means under control of said coded perforation sensing devices for generating signals indicative of the $m$ channel coded perforations in the tape, means under control of said timing perforation sensing device for generating timing signals, translating means under control of said timing signal generating means for converting said $m$ channel coded signals into $n$ unit coded signals, and means under control of said timing signal generating means for placing the translated $n$ unit coded signals on to the $n$ unit coded record.

12. In a machine for transferring characters, in the form of rows of coded perforations across an $m$ channel tape, to an $n$ unit code record, said perforated tape having an extra channel comprising timing perforations located at intervals along the length of said perforated tape, each row of coded perforations aligned with a timing perforation, a plurality of sensing devices positioned to sense a row of perforations, means for moving said $m$ channel tape past said sensing devices, means under control of said coded perforation sensing devices for generating signals indicative of the coded perforations present in the rows sensed, means under control of said timing perforation sensing devices for generating timing signals, translating means under control of said timing signals for converting from said $m$ channel coded signals to predetermined $n$ unit coded signals, validity check means connected to said sensing devices and said translate means and operative to produce a validity error signal if there are no predetermined $n$ unit coded signals produced in the translate means when a character is sensed by the sensing devices, and means under control of said timing signal generating means and said validity check means for placing the translated $n$ unit coded signals on to the $n$ unit coded record when no validity error signal is produced.

13. In a machine for transferring characters, in the form of rows of coded perforations across an $m$ channel first tape, to an $n$ unit coded record, a plurality of sensing devices positioned to sense a row of perforations from said first tape means for moving said first tape past said sensing devices, means under control of said coded perforation sensing devices for generating signals indicative of the coded perforations present in the rows sensed, translating means settably connected for converting from said $m$ channel coded signals to predetermined $n$ unit coded signals, validity check means connected to said sensing devices and said translate means and operative to produce a validity error signal if there are no predetermined $n$ unit coded signals produced by the translate means when a character is sensed by the sensing devices, and means under control of said translating means and said validity check means for placing the translated $n$ unit coded signals on to the $n$ unit coded record when no validity error signal is produced.

14. In a machine for transferring, character by character, a series of characters in the form of rows of coded bits across an $m$ channel first tape, to an $n$ unit coded record, said first tape having an extra channel comprising timing bits located at intervals along the length of said first tape, each row of coded bits aligned with a timing bit, a plurality of sensing devices positioned to sense a row of bits, means for moving said first tape past said sensing devices, means under control of said bit sensing devices for generating a timing signal and signals indicative of the $m$ channel coded bits present in the rows sensed, translating means for converting from said $m$ channel coded signals to predetermined $n$ unit coded signals, validity check means under control of said timing signal generating means and connected to said sensing devices and said translate means and operative to produce a validity error signal if there are no predetermined $n$ unit coded signals produced by the translate means when a character is sensed by said sensing devices, and means under control of said timing signal generating means and said validity check means for placing the translated $n$ unit coded signals on to the $n$ unit coded record when no validity error signal is produced, said last mentioned means operative for placing a special character representative of the presence of the error signal on the $n$ unit coded record in place of the indicated character in error.

15. In a machine for transferring, character by character, a series of characters in the form of rows of coded bits across an $m$ channel first medium, to an $n$ unit coded second medium, said first medium having an extra channel comprising timing bits located at intervals along the length of said first medium, each row of coded bits aligned with a timing bit, each said first medium series ending with a normal end of series character, a plurality of sensing devices positioned to sense a row of bits, means for moving said first medium past said sensing devices, means under control of said bit sensing devices for generating a timing signal and signals indicative of the $m$ channel coded bits present in the rows sensed, translating means for converting from said $m$ channel coded signals to predetermined $n$ unit coded signals, validity check means connected to said sensing devices and said translate means and operative to produce a validity error signal if there are no predetermined $n$ unit coded signals produced by the translate means when a character is sensed by said sensing devices, and means under control of said timing signal generating means and said validity check means for placing the translated $n$ unit coded signals on to the second medium when no validity error signal is produced, means for storing the indication of the production of a validity error signal until the end of the series, and means under control of said storing means for blocking the transfer of the normal end of series character signals when said storing means contains an error indication, said placing means operative under control of said storing means for placing error end of series $n$ unit coded character signals on the second medium in place of the blocked normal end of series character.

16. In a machine for transferring, character by character, a series of characters in the form of rows of coded bits across an $m$ channel first medium, to an $n$ unit coded second medium, said first medium having an extra channel comprising timing bits located at intervals along the length of said first medium, each row of coded bits aligned with a timing bit, said each first medium series ending with a normal end of series character, a plurality of sensing devices positioned to sense a row of bits, means for moving said first medium past said sensing devices, means under control of said bit sensing devices for generating a timing signal and signals indicative of the $m$ channel coded bits present in the rows sensed, translating means for converting from said $m$ channel coded signals to predetermined $n$ unit coded signals, validity check means connected to said sensing devices and said translate means and operative to produce a validity error signal if there are no predetermined $n$ unit coded signals produced by the translate means when a character is sensed by said sensing devices, and means under control of said timing signal generating means and said validity check means for placing the translated $n$ unit coded signals as to the second medium when no validity error signal is produced, said last mentioned means operative for placing special character signals representative of the presence of the validity error signal on the second medium in place of the indicated character in error, means for storing the indication of the production of a validity error signal until the end of the series, and means under control of said storing means for blocking the transfer of the normal end of series character signals when said storing means contains an error indication, said placing means operative under control of said storing means for placing error end of series $n$ unit coded character signals on the second medium in place of the blocked normal end of series character.

17. In a machine for transferring, character by character, a series of characters in the form of rows of coded bits across an $m$ channel tape, to an $n$ unit coded record, said perforated tape having an extra channel comprising timing bits located at intervals along the length of said perforated tape, each row of $m$ channel coded bits aligned with a timing bit, a plurality of sensing devices positioned to sense a row of bits, means under control of said timing bit sensing devices for generating a first timing signal upon the sensing of said timing perforations, means under control of said timing signal generating means for generating a delayed second timing signal, translating means conditioned by said first timing signal for converting from said $m$ channel coded signals to said $n$ unit coded signals, means under control of said second timing signal operative on the conditioned translating means to place the translated $n$ unit coded signals on to the $n$ unit coded record, and means for checking for the presence of an error in the translation of each character, said checking means operative for producing an error indication signal which removes said first timing signal from said translating means, said last mentioned means operative on said unconditioned translating means for placing a special character representative of the presence of the error signal on the $n$ unit coded record in place of the indicated character in error.

18. In a machine for transferring first coded characters on a first medium to equivalent second coded characters on a second medium, coded sensing means for sensing said first coded characters on said first medium, means under control of said sensing means for generating signals indicative of the first coded characters, translating means settably connected for converting from said first coded signals to predetermined second coded signals, validity check means connected to said sensing means and said translate means and operative to produce a validity error signal if there are no predetermined second coded signals produced by the translate means when a character is sensed by the sensing means, and means under control of said translating means and said validity check means for placing the translated second coded signals on to the second medium when no validity error signal is produced.

19. In a machine for transferring, character by character, a series of coded bit characters in an $m$ unit code on a first medium to an equivalent series of coded bit characters in an $n$ unit code on a second medium, each said first medium series ending with a normal end of series character means for sequentially sensing the $m$ unit coded characters from the first medium, means under control of said sensing means for generating the signals indicative of the $m$ unit coded bits present in the character sensed, translating means connected to said reading means for converting from said $m$ unit coded signals to $n$ unit coded signals, means for selectively placing the translated $n$ unit coded character signals on to the second medium, echo means connected to said placing circuit for generating signals representative of the coded signals placed on said second medium, echo compare means connected to said translate means and said echo means for comparing the respective coded signal outputs, said echo compare means producing an error signal indication of a difference between said translate means $n$ unit coded signals and said echo means $n$ unit coded signals, and means controlling said placing means and under control of said echo compare means for placing errror end of series $n$ unit coded character signals on the second medium instead of translated normal end of series character signals when said echo compare means produces an error signal indication during a series.

20. In a decoder for translating coded bit characters from an $m$ channel tape, character by character, means for simultaneously reading a bit in each of the $m$ channels, translating means for translating the coded bits read by said reading means, means under control of the reading means operative for sensing a control character on said $m$ channel tape, means connected to said last mentioned means for producing a signal of the presence of the control character, means for storing said signal, and means for feeding said stored signal to a simulated $m+1$ channel in said translating means, said translating means being modified by the stored signal appearing on said simulated $m+1$ channel.

21. In a decoder for translating coded bit characters from an $m$ channel tape, character by character, means for simultaneously reading a bit in each of the $m$ channels, said reading means producing $m$ channel coded signals representative of the character being read, means under control of the reading means operative for sensing a first and second control character on said $m$ channel tape, means connected to said last mentioned means for selectively producing signals of the presence of the first or second control character, storing means for producing a signal indicative of the last one of the two control character signals present, means for translating the coded signals produced by said reading means, and means under control of said storing means for feeding the signal indicating the last presence of the second control character signal to a simulated $m+1$ channel in said reading means, said translating means being modified by the signal appearing on said simulated $m+1$ channel.

22. In a machine for transferring, character by character, a series of coded bit characters in an $m$ unit code on a first medium to an equivalent series of coded bit characters in an $n$ unit code on a second medium, means for sequentially sensing the $m$ unit coded characters from the first medium, means under control of said sensing means for generating signals indicative of the $m$ unit coded bits present in a character sensed, translating means connected to said reading means for converting from said $m$ unit coded signals to $n$ unit coded signals, means under control of the sensing means for detecting a control character on said first medium, means connected to said last mentioned means for producing a control signal of the last presence of the control character, and means for feeding said control signal to a simulated $m+1$ channel in said translating means, said translating means being modified by the control signal appearing on said simulated $m+1$ channel so as to convert from said $m+1$ unit coded signals to $n$ unit coded signals.

23. In a machine for transferring, character by character, a series of coded bit characters in an $m$ unit code on a first medium to an equivalent series of coded bit characters in an $n$ unit code on a second medium, means for sequentially sensing the $m$ unit coded characters from the first medium, means under control of said sensing means for generating signals indicative of the $m$ unit coded bits present in a character sensed, translating means connected to said reading means for converting said from said $m$ unit coded signals to $n$ unit coded signals, means under control of the sensing means for detecting a first and second control character on said first medium, said detecting means storing different control signals indicative of the last one of the first or second control characters detected, and means for feeding stored control signals indicative of the second control character to a simulated $m+1$ channel in said translating means, said translating means being modified by the signal appearing on said simulated $m+1$ channel so as to convert from said $m+1$ coded signals to $n$ unit coded signals.

24. In a decoder for translating coded bit characters from an $m$ channel tape, character by character, means for simultaneously reading a bit in each of the $m$ channels, said reading means producing $m$ channel coded signals representative of the character being read, means under control of the reading means operative for sensing a first and second control character on said $m$ channel tape, means connected to said last mentioned means for selectively producing signals of the presence of the first or second control character, storing means for producing a signal indicative of the last one of the two control character signals present, a pair of translating means for translating the *m* channel coded signals produced by said reading means into *n* unit coded signals, means for comparing the converted *n* unit coded signals of said translate means, means for signalling a difference between the translated *n* unit coded signals from the pair of translate means, and means under control of said storing means for feeding the signal indicating the last presence of the second control character signal to a simulated $m+1$ channel in said reading means, said translating means being modified by the signal appearing on said simulated $m+1$ channel, means under control of said signalling means and said storing means for stopping both tape feeds only when there is a difference signal at the time said storing means indicates the last presence of the second control character signal.

25. In a machine for transferring characters in seriatim from a first to a second tape, whereon a plurality of characters in a series comprise a record, each first tape containing a plurality of records, each record ending in an end of record character, means for reading the characters from the first tape, means for writing the characters on the second tape, means for moving the first tape past the reading means, means for moving the second tape past the writing means, means for transferring the characters from the reading to the writing means, means operative for detecting an end of record character on said first tape, means to sense a break in either the first or the second tape, means for detecting the end of either the first or the second tape, means under control of said end of tape detecting means and said end of record character detecting means for normally stopping the movement of said first and second tape, said last mentioned means operative for stopping the first and second tape under control of the tape break sensing means by the first end of record character detected after a tape break is sensed, and means operative on said last mentioned means for stopping the movement of said first and second tapes when the anticipated end of record character is not detected within a predetermined time interval after the tape break.

26. In a machine for transferring, character by character, series of characters, in the form of rows of coded bits across an *m* channel first tape, to an *n* unit coded second tape, whereon a plurality of characters in a series comprise a record, each first tape containing a plurality of records, each record ending in an end of record character, a plurality of sensing devices positioned to sense a row of coded bits, means for moving said first tape past said sensing devices, means under control of said coded bit sensing devices for generating *m* channel coded signals indicative of the bits present in the rows sensed, translating means connected to said sensing means for converting from said *m* channel coded signals to *n* unit coded signals, means for placing the *n* unit coded signal characters translated onto the second tape, means for selectively moving said second tape at different speeds, means operative for detecting an end of record character, on said first tape means to sense a break in either the first or the second tape, and means under control of said tape break sensing means and said end of record character detecting means for stopping the movement of said first and second tapes when the first end of record character is detected after a tape break is sensed, said stopping means operative to stop the movement of said first and second tapes when the end of record character is not detected within a predetermined time interval after the tape break.

27. In a machine for transferring characters in seriatim from a first to a second tape, whereon a plurality of characters in a series comprise a record, each first tape containing a plurality of records, each record ending in an end of record character, means for reading the characters from the first tape, means for writing the characters on the second tape, means for moving the first tape past the reading means, means for selectively moving the second tape past the writing means at a first and second speed, means for transferring the characters from the reading to the writing means, means operative for detecting an end of record character on said first tape, means under control of said end of record character detecting means for normally stopping the movement of said first tape and moving the second tape at the second speed for a predetermined time interval to provide an end of record gap on said second tape, and means connected to said last mentioned means and operative at the end of the predetermined time interval for causing the first tape moving means to move the first tape and to cause the second tape moving means to move the second tape at the first speed.

28. In a machine for transferring characters in the form of rows of coded perforations across an *m* channel paper tape, to an equivalent series of characters in an *n* unit coded magnetic tape, said paper tape having an extra timing channel comprising perforations of a relatively smaller size than said coded perforations and located at intervals along the length of the perforated tape, each row of coded perforations aligned with a timing perforation, a plurality of characters on said paper tape comprising a record, each paper tape containing a plurality of records, each record ending in an end of record character, a plurality of sensing devices positioned to sense a row of perforations, means for moving said paper tape past said sensing devices, means under control of said coded perforation sensing devices for generating signals indicative of the *m* channel coded perforations in the paper tape, means under control of said timing perforation sensing devices for generating timing signals, a pair of translating means under control of said timing signals for converting from said *m* channel coded signals into *n* unit coded signals, means connected to said pair of translating means for comparing the converted *n* unit coded signals of said pair of translate means, said compare means producing a compare error signal indication of a difference for a character between the converted *n* unit coded signals from the pair of translate means, means for checking said *m* unit coded signals for parity, said checking means generating a parity error signal representative of incorrect parity in a character being sensed, validity check means connected to said sensing devices and said translate means and operative to produce a validity error signal if there are no *n* unit coded signals produced by the translate means when a character is sensed by said sensing devices, means for writing the *n* unit coded characters on the magnetic tape when no one of the error signals is produced, means for selectively moving the second tape past the writing means at a first and second speed echo means connected to said writing means for generating signals representative of the *n* unit coded signals placed on said magnetic tape, echo compare means connected to said translate means and said echo means for comparing the respective coded signal outputs, said echo compare means producing an echo compare error signal indication of a difference between said translate means *n* unit coded signals and said echo means *n* unit coded signals, said writing means operative under control of said compare check means, said validity check means, and said parity check means for writing a special *n* unit coded character representative of the presence of an error signal on the magnetic tape in place of the indicated character in error, means for storing error signal indications from the compare check means, validity check means, parity check means and echo compare means, until the end of the record, means under control of said storing means for blocking the transfer of the normal end of record character when said storing means contains an error indication, said writing means operative under control of said storing means for writing an error end of record *n* unit coded character on the magnetic tape in place of the blocked normal end of record character, means under control of said end of record character detecting means for normally stopping the movement of said first tape and moving the second tape at the second speed for a predetermined time interval to provide an end of record gap on said second tape, means connected to said last mentioned means and operative at the end of the predetermined time interval for causing the first tape moving means to move the first tape and to cause the second tape moving means to move the second tape at the first speed, means for detecting the end of either the first or the second tape, means under control of said end of tape detecting means and said end of record character detecting means for normally stopping the movement of said first and second tape, said last mentioned means operative for stopping the first and second tape under control of the tape break sensing means by the first end of record character detected after a tape break is sensed, and means operative on said last mentioned means for stopping the movement of said first and second tapes when the anticipated end of record character is not detected within a predetermined time interval after the tape break.

29. In a machine of claim 28 wherein said paper tape records begin with a variable number of meaningless initial code characters, means for detecting the presence of the initial code characters, means operatively connected to said detecting means for blocking the transfer of characters until no further initial code characters are detected by said detecting means, means connected to said translating means and under control of said detecting means for placing the $n$ unit coded signal characters on to the magnetic tape, said translating means translating said initial coded characters during the records, means under control of the paper tape sensing means operative for sensing a first and second control character on said paper tape, means connected to said last mentioned means for selectively producing signals of the presence of the first or second control character, storing means for producing a signal indicative of the last one of the two control character signals present, and means under control of said storing means for feeding the signal indicating the last presence of the second control character signal to a simulated $m+1$ channel in said reading means, said translating means being modified by the signal appearing on said simulated $m+1$ channel, and means under control of said signalling means and said storing means for stopping both tape feeds only when there is an error signal at the time said storing means indicates the last presence of the second control character signal.

30. In a machine for transferring a plurality of series of characters, character by character, from a first to a second medium, said first medium series beginning with a variable number of meaningless initial code characters and ending with an end of series character, means for recognizing the presence of the initial code characters and the end of series character, means operably connected to said recognizing means for blocking the transfer of characters from the time an initial code character is recognized until a first non-initial code character is recognized by said recognizing means, said last mentioned means operable for transferring initial code characters from the time the first non-initial code character is recognized until an end of series character is recognized by said recognizing means.

31. In a machine for transferring, character by character a series of characters, in the form of rows of coded bits across an $m$ channel first tape, to an $n$ unit coded second tape, said first tape series beginning with a variable number of initial code characters and ending with an end of series character, a plurality of sensing devices positioned to sense a row of coded bits, means for moving said $m$ channel first tape past said sensing devices, means under control of said coded bit sensing devices for generating $m$ channel coded signals indicative of the character bit present in the rows sensed, translate means settably connected to said signal generating means for converting said $m$ channel coded signals to $n$ unit coded signals, means for recognizing the presence of the initial code characters and the end of series character, means operably connected to said recognizing means for blocking the transmission of the signal from the signal generator means to said translate means from the time an initial code character is recognized until a first non-initial code character is recognized by said recognizing means, said last mentioned means operative for permitting the transmission to the translate means of initial code characters from the time the first non-initial code character is recognized until an end of series character is recognized by said recognizing means.

32. In a machine for transferring, character by character, a series of characters, in the form of $m$ unit coded characters on a first medium to an $n$ unit code second medium, means for sensing the coded characters on the first medium, means under control of said coded character sensing means for generating signals indicative of the characters being sensed, translate means connected to said signal generating means for converting from said $m$ unit coded signals to $n$ unit coded signals, checking means for checking the correctness of the conversion in the translate means, said checking means generating an error signal when there is an incorrect conversion, means under control of said checking means for placing the translated character signals onto the second medium when no error signal is generated, means under control of the checking means for blocking the placing of the incorrectly translated character signals when an error signal is generated, and means under control of said checking means operative to cause said translate means to produce special $n$ unit coded signals representative of the presence of the error signal and to cause said placing means to place said special $n$ unit coded signals onto the second medium in place of the indicated character in error when an error signal is generated.

33. A machine for transferring characters, comprising an $m$ channel tape having characters in the form of rows of coded perforations across the tape, a second medium, said perforated tape having an extra timing channel comprising perforations of a relatively smaller size than said coded perforations and located at intervals along the length of the perforated tape, each row of coded perforations aligned with a timing perforation, the leading and trailing edges of the timing perforations being positioned inside the leading and trailing edges of the coded perforations, a plurality of sensing devices positioned to sense a row of perforations, means for moving said $m$ channel tape past said sensing devices, means under control of said coded perforation sensing devices for generating signals indicative of the $m$ channel coded perforations in the tape, means under control of said timing perforation sensing device for generating timing signals, and means under control of said timing signal generating means for simultaneously transferring all of said coded signals generated to said second medium.

References Cited in the file of this patent

UNITED STATES PATENTS

| | | |
|---|---|---|
| 2,518,405 | Van Duuren | Aug. 8, 1950 |
| 2,549,071 | Dusek et al. | Apr. 17, 1951 |
| 2,628,346 | Burkhart | Feb. 10, 1953 |
| 2,641,641 | Edgar | June 9, 1953 |
| 2,657,261 | Rea | Oct. 27, 1953 |
| 2,672,507 | Cragg | Mar. 16, 1954 |
| 2,702,380 | Brustmann | Feb. 15, 1955 |
| 2,793,344 | Reynolds | May 21, 1957 |

FOREIGN PATENTS

| | | |
|---|---|---|
| 737,149 | Great Britain | Sept. 21, 1955 |

UNITED STATES PATENT OFFICE
CERTIFICATION OF CORRECTION

Patent No. 2,939,116                          May 31, 1960

William E. Burns et al.

It is hereby certified that error appears in the above numbered patent requiring correction and that the said Letters Patent should read as corrected below.

Column 46, line 23, after "said", first occurrence, insert -- second --; column 50, line 58, for "as" read -- on --; column 52, line 52, strike out "said", first occurrence.

Signed and sealed this 6th day of June 1961.

(SEAL)
Attest:

ERNEST W. SWIDER
Attesting Officer

DAVID L. LADD
Commissioner of Patents